US012132896B2

United States Patent
Filippov et al.

(10) Patent No.: US 12,132,896 B2
(45) Date of Patent: Oct. 29, 2024

(54) METHOD AND APPARATUS OF HIGH-LEVEL SYNTAX FOR SMOOTHING INTRA-PREDICTION TECHNIQUES

(71) Applicant: Huawei Technologies Co., Ltd., Guangdong (CN)

(72) Inventors: Alexey Konstantinovich Filippov, Moscow (RU); Vasily Alexeevich Rufitskiy, Moscow (RU); Elena Alexandrovna Alshina, Munich (DE)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 56 days.

(21) Appl. No.: 18/058,139

(22) Filed: Nov. 22, 2022

(65) Prior Publication Data

US 2023/0087640 A1    Mar. 23, 2023

Related U.S. Application Data

(63) Continuation of application No. PCT/RU2021/050136, filed on May 25, 2021.
(Continued)

(51) Int. Cl.
*H04N 19/117* (2014.01)
*H04N 19/159* (2014.01)
(Continued)

(52) U.S. Cl.
CPC ......... *H04N 19/117* (2014.11); *H04N 19/159* (2014.11); *H04N 19/176* (2014.11); *H04N 19/186* (2014.11); *H04N 19/82* (2014.11)

(58) Field of Classification Search
CPC .. H04N 19/117; H04N 19/159; H04N 19/174; H04N 19/176; H04N 19/186; H04N 19/70; H04N 19/82
See application file for complete search history.

(56) References Cited

U.S. PATENT DOCUMENTS

2018/0176587 A1* 6/2018 Panusopone ......... H04N 19/186
2018/0184123 A1* 6/2018 Terada ................... G06T 9/002
(Continued)

OTHER PUBLICATIONS

Document: JVET-S0150-v1, Alexey Filippov et al, AHG9: On high-level syntax for smoothing intra prediction tools, Joint Video Experts Team (JVET) of ITU-T SG 16 WP 3 and ISO/IEC JTC 1/SC 29/WG 11, 19th Meeting: by teleconference, Jun. 22-Jul. 1, 2020, 4 pages.
(Continued)

*Primary Examiner* — Md N Haque
(74) *Attorney, Agent, or Firm* — WOMBLE BOND DICKINSON (US) LLP

(57) ABSTRACT

A method comprising: signaling a set of low-level indicators for a predicted block, wherein each of the indicators of the set enables or disables an intra prediction smoothing mechanism for the predicted block; signaling a first set of high-level indicators on a slice-level or a higher level, wherein each of the high-level indicators of the first set determines signaling for an intra prediction smoothing mechanism which is enabled or disabled by an indicator of the set of low-level indicators; and signaling a second set of high-level indicators, wherein each of the high-level indicators of the second set determines the presence of at least one of the corresponding high-level indicators of the first set, and wherein the values of corresponding high-level indicators of the first set are inferred to be zero when the value signaled by high-level indicator of the second set is zero.

20 Claims, 17 Drawing Sheets

Related U.S. Application Data

(60) Provisional application No. 63/030,911, filed on May 27, 2020, provisional application No. 63/030,293, filed on May 26, 2020.

(51) Int. Cl.
 *H04N 19/176* (2014.01)
 *H04N 19/186* (2014.01)
 *H04N 19/82* (2014.01)

(56) References Cited

U.S. PATENT DOCUMENTS

| | | | |
|---|---|---|---|
| 2018/0262756 A1* | 9/2018 | Filippov | H04N 19/593 |
| 2019/0166380 A1* | 5/2019 | Chen | H04N 19/117 |
| 2021/0092372 A1* | 3/2021 | Misra | H04N 19/70 |
| 2022/0086486 A1* | 3/2022 | Lim | H04N 19/51 |

OTHER PUBLICATIONS

Document: JVET-S0072-v1, Mohammed Golam Sarwer et al, AHG9: On PDPC and reference sample filtering of non-420 sequences, Joint Video Experts Team (JVET) of ITU-T SG 16 WP 3 and ISO/IEC JTC 1/SC 29/WG11, 19th Meeting: by teleconference, Jun. 22-Jul. 1, 2020, 7 pages.

* cited by examiner

METHOD AND APPARATUS OF HIGH-LEVEL SYNTAX FOR SMOOTHING INTRA-PREDICTION TECHNIQUES

CROSS-REFERENCE TO RELATED APPLICATIONS

This application is a continuation of International Application No. PCT/RU2021/050136, filed on May 25, 2021, which claims priority to U.S. provisional patent Application No. 63/030,293, filed on May 26, 2020, and patent Application No. 63/030,911, filed on May 27, 2020. All of the aforementioned applications are hereby incorporated by reference in their entireties.

TECHNICAL FIELD

Embodiments of the present application (disclosure) generally relate to the field of high-level signaling for enabling or disabling intra smoothing prediction methods.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications. The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever-increasing demands of higher video quality, improved compression and decompression techniques that improve compression ratio with little to no sacrifice in picture quality are desirable.

SUMMARY

Embodiments of the present application provide apparatuses and methods for encoding and decoding according to the independent claims. The present disclosure discloses:

A method of high-level signaling for a video coding method with intra-prediction of a block, the method comprising:
  signaling a set of low-level indicators for the predicted block, wherein each of the indicators of the set enables or disables an intra prediction smoothing mechanism for the predicted block;
  signaling a first set of high-level indicators on a slice-level or a higher level, wherein each of the high-level indicators of the first set determines signaling for an intra prediction smoothing mechanism which is enabled or disabled by an indicator of the set of low-level indicators; and
  signaling a second set of high-level indicators, wherein each of the high-level indicators of the second set determines the presence of at least one of the corresponding high-level indicators of the first set, and wherein the values of corresponding high-level indicators of the first set are inferred to be zero when the value signaled by high-level indicator of the second set is zero.

Thus, a signaling mechanism is proposed that is suitable for handling mixed content, i.e. both computer- and sensor-generated, using multi-level HLS flags. The central idea is to introduce level-dependent HLS signaling. For a syntax level (e.g. slice header, picture header, picture parameter set (PPS), sequence parameter set (SPS)), an indicator is signaled that specifies whether a smoothing mechanism is disabled completely for the slices referring to this syntax level or whether indication of smoothing mechanism presence is performed on syntax levels that are lower that the syntax level comprising the indicator being signaled.

In the method as described above, the intra prediction smoothing mechanism may comprise any combination of: a smoothing reference sample filter; a smoothing interpolation filter; and position-dependent intra prediction sample, PDPC, filtering.

In the method as described above, the smoothing interpolation filter is one element of a set of interpolation filters, wherein the set of interpolation filters comprises two 4-tap filters.

In the method as described above the one of the 4-tap filters may be a smoothing filter and the other one of the 4-tap filters may be a Discrete Cosine Transform Interpolation Filter, DCT-IF; wherein using the smoothing filter or else using the DCT-IF filter may be decided upon the value of a corresponding flag being 0 or one.

In the method as described above, each of the low-level indicators of the set of low-level indicators or the high-level indicators of the first set or the second set may enable or may disable position-dependent intra prediction sample filtering only for luma samples of the block, but may not disable position-dependent intra prediction sample filtering for at least one chroma component of the block.

In the method as described above, the determining of the signaling for an intra prediction smoothing mechanism may comprise: indicating presence of the corresponding low-level indicators for the predicted block in dependence on the value of the high-level indicator; and inferring the value of low-level indicator to disable corresponding intra prediction smoothing mechanism for all the predicted blocks of the level of the high-level indicator, when the value signaled by high-level indicator is zero.

In the method as described above, determining of the signaling for an intra prediction smoothing mechanism may comprise: inferring the value of low-level indicator to disable corresponding intra prediction smoothing mechanism for all the predicted blocks of the level of the high-level indicator, when the value signaled by high-level indicator is zero.

In the method as described above, the values of high-level indicators of the first set and the second set may be inferred to zero in case chroma format of the coded picture is equal to YUV422.

In the method as described above, the high level indicators may be high level syntax, HLS, flags, wherein the first set of HLS flags may comprise one or more of SPS, PPS and PH and slice-level flags.

In the method as described above, the second set of HLS flags may comprise one or more of SPS, PPS and PH and slice-level flags.

The present disclosure further provides a method of coding implemented by a decoding device, comprising: obtaining a first flag by parsing a video bitstream, wherein the first flag enables or disables an intra prediction smoothing mechanism for the predicted block; performing the intra prediction smoothing mechanism for the predicted block on condition that the first flag does not disable the intra prediction smoothing mechanism for the predicted block.

In the method as described above, the value of first flag may be inferred to 0 when chroma format of the coded picture is equal to YUV422.

In the method as described above, the first flag may be a SPS-level or PPS level flag, the performing the intra prediction smoothing mechanism for the predicted block on condition that the first flag does not disable the intra prediction smoothing mechanism for the predicted block may comprise: obtaining a second flag by parsing a video bitstream on condition that the first flag does not disable the intra prediction smoothing mechanism for the predicted block, wherein the second flag determines the presence of a third flag, wherein the third flag enables or disables an intra prediction smoothing mechanism for the predicted block and the third flag is at slice header level or picture header level; obtaining the third flag by parsing a video bitstream on condition that the second flag determines the third flag is present in the video bitstream; performing the intra prediction smoothing mechanism for the predicted block on condition that the third flag does not disable the intra prediction smoothing mechanism for the predicted block.

The present disclosure further provides an encoder comprising processing circuitry for carrying out the method as described above.

The present disclosure further provides a computer program product comprising program code for performing the method as described above when executed on a computer or a processor.

The present disclosure further provides a decoder, comprising: one or more processors; and a non-transitory computer-readable storage medium coupled to the processors and storing programming for execution by the processors, wherein the programming, when executed by the processors, configures the decoder to carry out the method as described above.

The present disclosure further provides a non-transitory computer-readable medium carrying a program code which, when executed by a computer device, causes the computer device to perform the method as described above.

The present disclosure further provides a non-transitory storage medium which includes an encoded bitstream decoded by an image decoding device, the bit stream being generated by dividing a frame of a video signal or an image signal into a plurality blocks, and including a plurality of syntax elements, wherein the plurality of syntax elements comprises a first flag, a second flag or a third flag according to the method as described above.

The present disclosure further provides an apparatus for decoding a video bitstream for high-level signaling with intra-prediction of a block, the apparatus comprising: a first signaling unit configured to signal a set of low-level indicators for the predicted block, wherein each of the indicators of the set enables or disables an intra prediction smoothing mechanism for the predicted block; a second signaling unit configured to signal a first set of high-level indicators on a slice-level or a higher level, wherein each of the high-level indicators of the first set determines signaling for an intra prediction smoothing mechanism which is enabled or disabled by an indicator of the set of low-level indicators; and a third signaling unit configured to signal a second set of high-level indicators, wherein each of the high-level indicators of the second set determines the presence of at least one of the corresponding high-level indicators of the first set, and wherein the values of corresponding high-level indicators of the first set are inferred to be zero when the value signaled by high-level indicator of the second set is zero.

The present disclosure further provides an apparatus for encoding a video bitstream for high-level signaling with intra-prediction of a block, the apparatus comprising: a first signaling unit configured to signal a set of low-level indicators for the predicted block, wherein each of the indicators of the set enables or disables an intra prediction smoothing mechanism for the predicted block; a second signaling unit configured to signal a first set of high-level indicators on a slice-level or a higher level, wherein each of the high-level indicators of the first set determines signaling for an intra prediction smoothing mechanism which is enabled or disabled by an indicator of the set of low-level indicators; and a third signaling unit configured to signal a second set of high-level indicators, wherein each of the high-level indicators of the second set determines the presence of at least one of the corresponding high-level indicators of the first set, and wherein the values of corresponding high-level indicators of the first set are inferred to be zero when the value signaled by high-level indicator of the second set is zero.

In other words, the foregoing and other objects are achieved by the subject matter of the independent claims. Further implementation forms are apparent from the dependent claims, the description and the figures.

Particular embodiments are outlined in the attached independent claims, with other embodiments in the dependent claims.

According to a first aspect the disclosure relates to a method for intra predicting process of a video (or picture, frame) block, the method comprising: obtaining a predicted sample value for a sample of the block (in an example, the predicted sample value is obtained from one or more reference sample values, by using an intra prediction mode which is selected from one of a DC intra-prediction mode, a planar intra prediction mode, and an angular intra-prediction mode); obtaining a scaling factor value according to an intra prediction mode for the current coding block, and according to a height of the current coding block or a width of the current coding block (in an example, both of the height and the width are used to obtain the scaling factor); determining a first weight value based on the scaling factor value; determining a second weight value based on the scaling factor value; calculating an additional value as a weighted sum of a top reference sample value and a left reference sample value, by weighting the top reference sample value with the first weight and the left reference sample value with the second weight; obtaining a modified predicted sample value according to the additional value and the predicted sample value (in some embodiments, the predicted sample value is processed by using a sample weighting factor to obtain a weighted predicted value, the modified predicted sample value is obtained according to the additional value and the weighted predicted sample value) (in an example, the method further comprises: normalizing the modified predicted sample value, by an arithmetic right shift of an integer representation of the modified predicted sample value, resulting in a normalized modified predicted sample value).

In an embodiment, wherein the height of the current coding block is equal to a value of refH−nTbH, the variable refH indicates height of reference samples, and the variable nTbH indicates height of transform block.

In an embodiment, wherein the width of the current coding block is equal to a value of refW−nTbW, the variable refW indicates width of reference samples, and variable nTbW indicates width of transform block.

According to a second aspect the disclosure relates to a method for intra predicting process of a video (or picture, frame) block, the method comprising: obtaining a predicted sample value for a sample of the block (in an example, the predicted sample value is obtained from one or more reference sample values, by using an intra prediction mode which is selected from one of a DC intra-prediction mode, a planar intra prediction mode, and an angular intra-prediction mode); obtaining a scaling factor value according to an intra prediction mode for the current coding block, and according to a height of the current coding block or a width of the current coding block (in an example, both of the height and the width are used to obtain the scaling factor); when the scaling factor value is greater than or equal to 0, performing the following processes: determining a first weight value based on the scaling factor value; determining a second weight value based on the scaling factor value; calculating an additional value as a weighted sum of a top reference sample value and a left reference sample value, by weighting the top reference sample value with the first weight and the left reference sample value with the second weight; obtaining a modified predicted sample value according to the additional value and the predicted sample value (in some embodiments, the predicted sample value is processed by using a sample weighting factor to obtain a weighted predicted value, the modified predicted sample value is obtained according to the additional value and the weighted predicted sample value) (in an example, the method further comprises: normalizing the modified predicted sample value, by an arithmetic right shift of an integer representation of the modified predicted sample value, resulting in a normalized modified predicted sample value).

In an embodiment, wherein the method further comprises: When the scaling factor value is less than 0, output the predicted sample value.

According to a third aspect the disclosure relates to a method for intra predicting process of a video (or picture, frame) block, the method comprising: obtaining a predicted sample value for a sample of the block (in an example, the predicted sample value is obtained from one or more reference sample values, by using an intra prediction mode which is selected from one of a DC intra-prediction mode, a planar intra prediction mode, and an angular intra-prediction mode); obtaining a scaling factor value according to an intra prediction mode for the current coding block, and according to a height of the current coding block or a width of the current coding block (in an example, both of the height and the width are used to obtain the scaling factor); when the intra prediction mode for the current coding block is angular mode (but the intra prediction mode for the current coding block is not a horizontal mode and is not a vertical mode), and when the scaling factor value is less than 0, output the predicted sample value; otherwise (the intra prediction mode for the current coding block is not angular mode, or the intra prediction mode for the current coding block is a horizontal mode, or the intra prediction mode for the current coding block is a vertical mode, or the scaling factor value is greater than or equal to 0), performing the following processes: determining a first weight value based on the scaling factor value, determining a second weight value based on the scaling factor value, calculating an additional value as a weighted sum of a top reference sample value and a left reference sample value, by weighting the top reference sample value with the first weight and the left reference sample value with the second weight, obtaining a modified predicted sample value according to the additional value and the predicted sample value (in some embodiments, the predicted sample value is processed by using a sample weighting factor to obtain a weighted predicted value, the modified predicted sample value is obtained according to the additional value and the weighted predicted sample value) (in an example, the method further comprises: normalizing the modified predicted sample value, by an arithmetic right shift of an integer representation of the modified predicted sample value, resulting in a normalized modified predicted sample value).

In an embodiment, wherein the height of the current coding block is equal to a value of refH−nTbH, the variable refH indicates height of reference samples, and the variable nTbH indicates height of transform block.

In an embodiment, wherein the width of the current coding block is equal to a value of refW−nTbW, the variable refW indicates width of reference samples, and variable nTbW indicates width of transform block.

According to a fourth aspect the disclosure relates to an encoder (20), which comprising processing circuitry for carrying out the method according to method embodiments.

According to a fifth aspect the disclosure relates to a decoder (30), which comprising processing circuitry for carrying out the method according to method embodiments.

According to a sixth aspect the disclosure relates to a computer program product comprising program code for performing the method according to any one of the preceding embodiments when executed on a computer or a processor.

According to a seventh aspect the disclosure relates to a decoder, comprising: one or more processors; and a non-transitory computer-readable storage medium coupled to the processors and storing programming for execution by the processors, wherein the programming, when executed by the processors, configures the decoder to carry out the method according to any one of the preceding embodiments.

According to an eighth aspect the disclosure relates to an encoder, comprising: One or more processors; and a non-transitory computer-readable storage medium coupled to the processors and storing programming for execution by the processors, wherein the programming, when executed by the processors, configures the encoder to carry out the method according to any one of the preceding claims.

According to a ninth aspect the disclosure relates to a non-transitory computer-readable medium carrying a program code which, when executed by a computer device, causes the computer device to perform the method of any one of the preceding claims.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the disclosure are described in more detail with reference to the attached figures and drawings, in which.

Figure 1A:
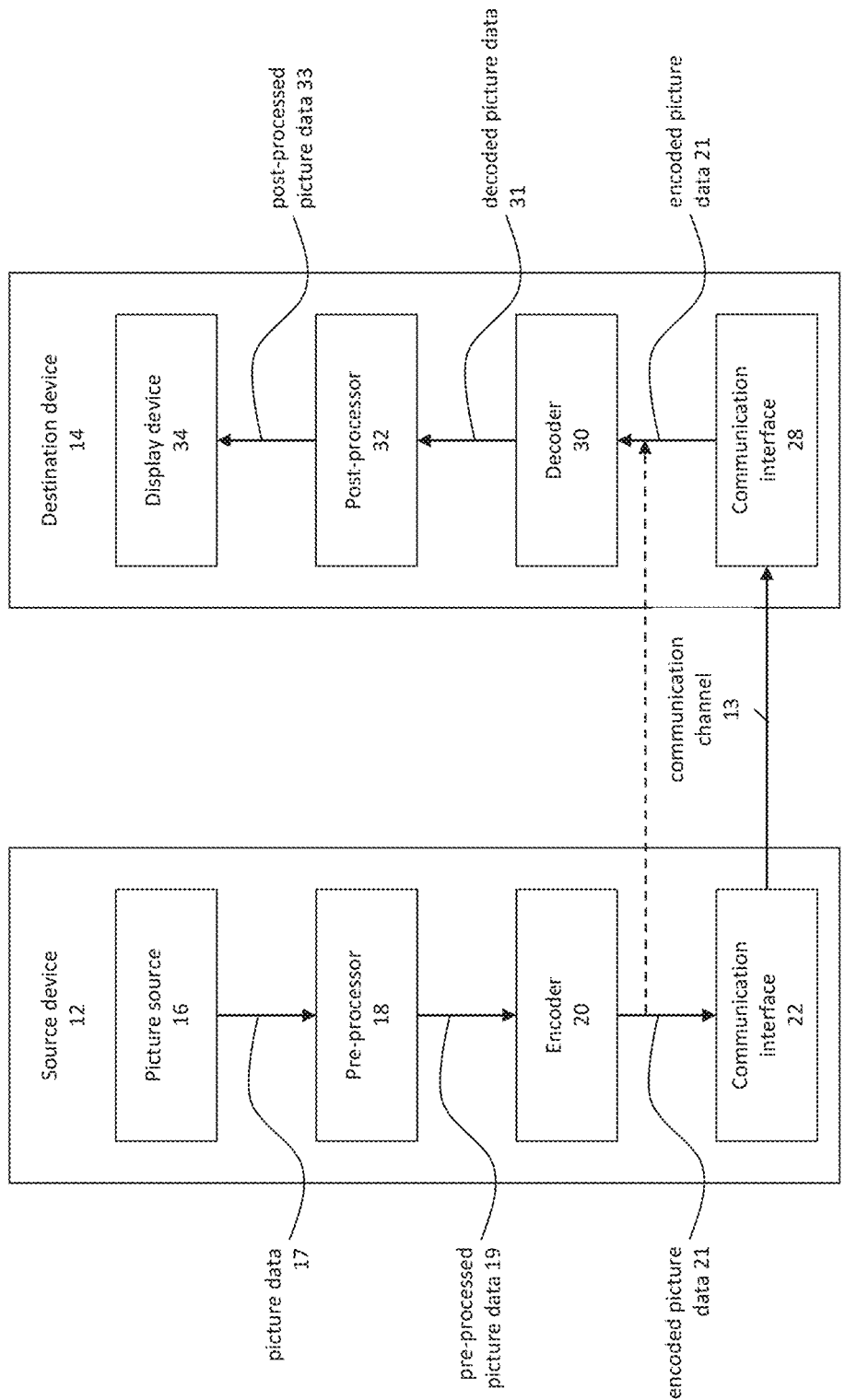
FIG. 1A is a block diagram showing an example of a video coding system configured to implement embodiments of the disclosure.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method operations are described, a corresponding device may include one or a plurality of units, e.g. functional units, to perform the described one or plurality of method operations (e.g. one unit performing the one or plurality of operations, or a plurality of units each performing one or more of the plurality of operations), even if such one or more units are not explicitly described or illustrated in the figures. On the other hand, for example, if a specific apparatus is described based on one or a plurality of units, e.g. functional units, a corresponding method may include one operation to perform the functionality of the one or plurality of units (e.g. one operation performing the functionality of the one or plurality of units, or a plurality of operations each performing the functionality of one or more of the plurality of units), even if such one or plurality of operations are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture", the term "frame" or "image" may be used as synonyms in the field of video coding. Video coding (or coding in general) comprises two parts video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g. to a destination device 14 for decoding the encoded picture data 13. The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17. Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2). Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34. The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30. The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

Figure 1B:
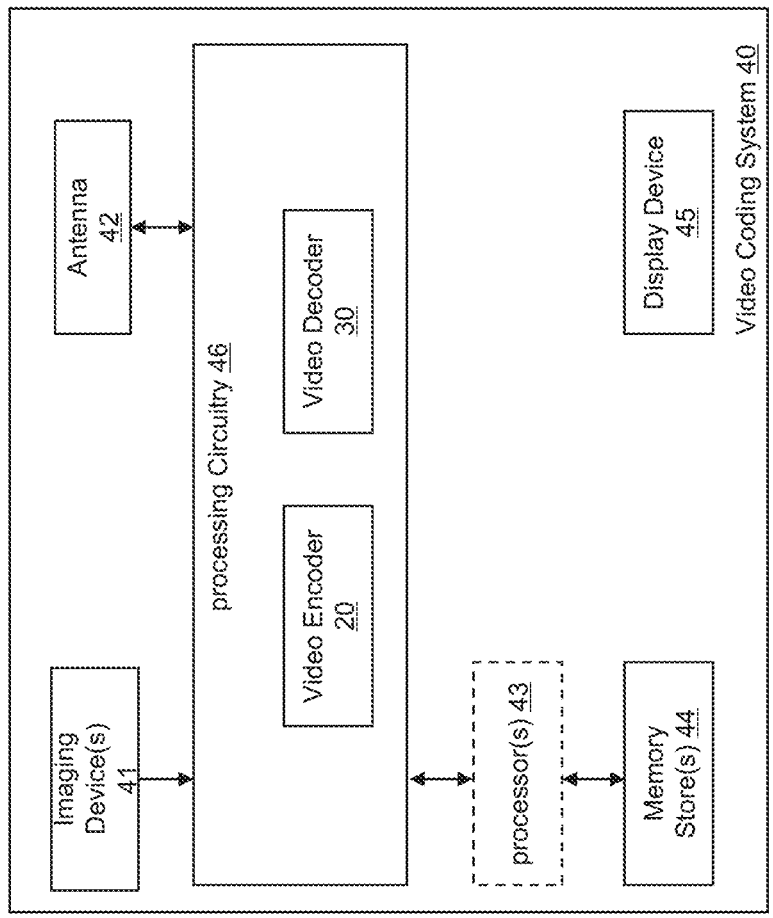
FIG. 1B is a block diagram showing another example of a video coding system configured to implement embodiments of the disclosure.

As will be apparent for the skilled person based on the description, the existence and (exact) split of functionalities of the different units or functionalities within the source device 12 and/or destination device 14 as shown in FIG. 1A may vary depending on the actual device and application. The encoder 20 (e.g. a video encoder 20) or the decoder 30 (e.g. a video decoder 30) or both encoder 20 and decoder 30 may be implemented via processing circuitry as shown in FIG. 1B, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC.

Encoder and Encoding Method

Figure 2:
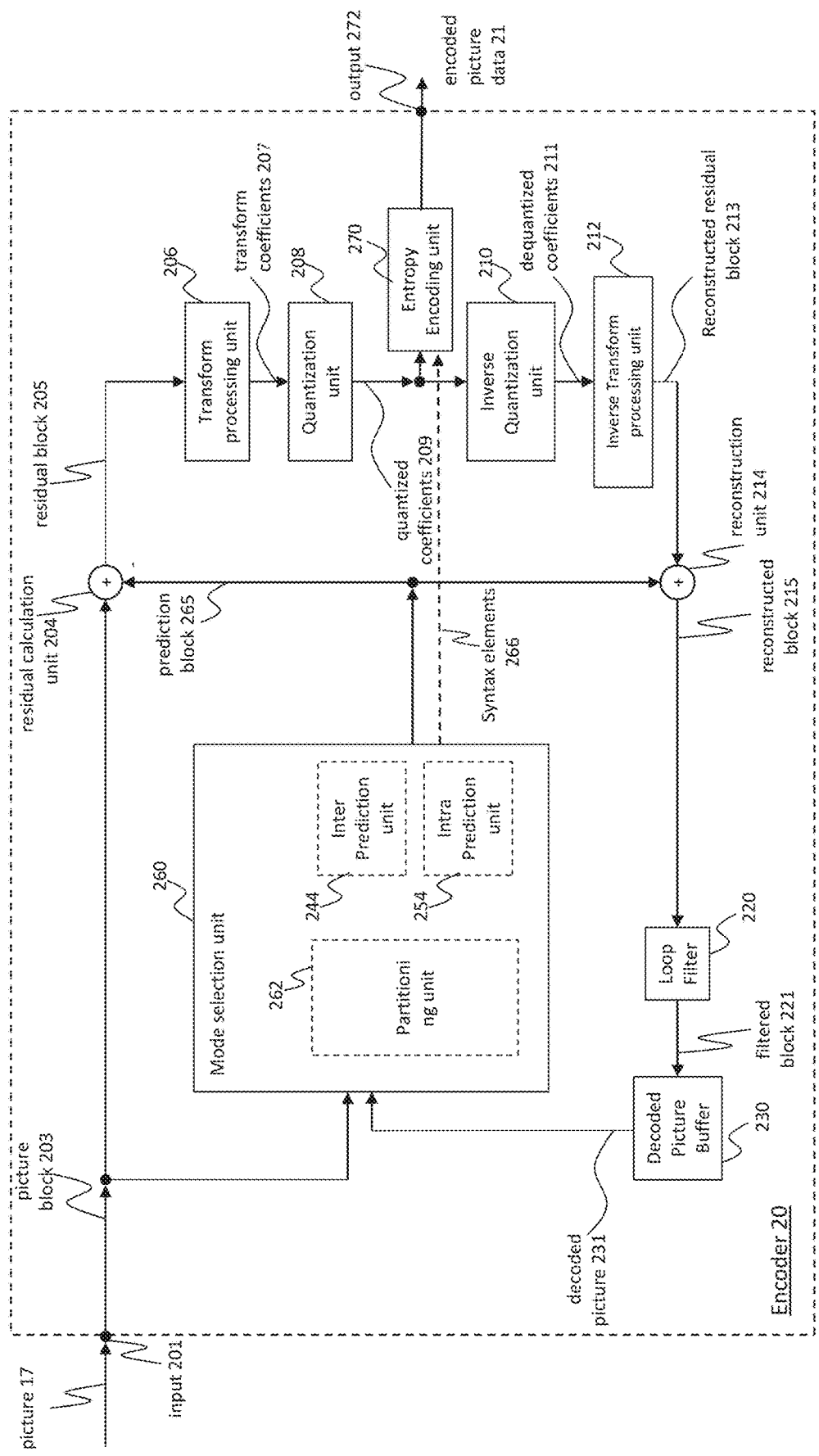
FIG. 2 is a block diagram showing an example of a video encoder configured to implement embodiments of the disclosure.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
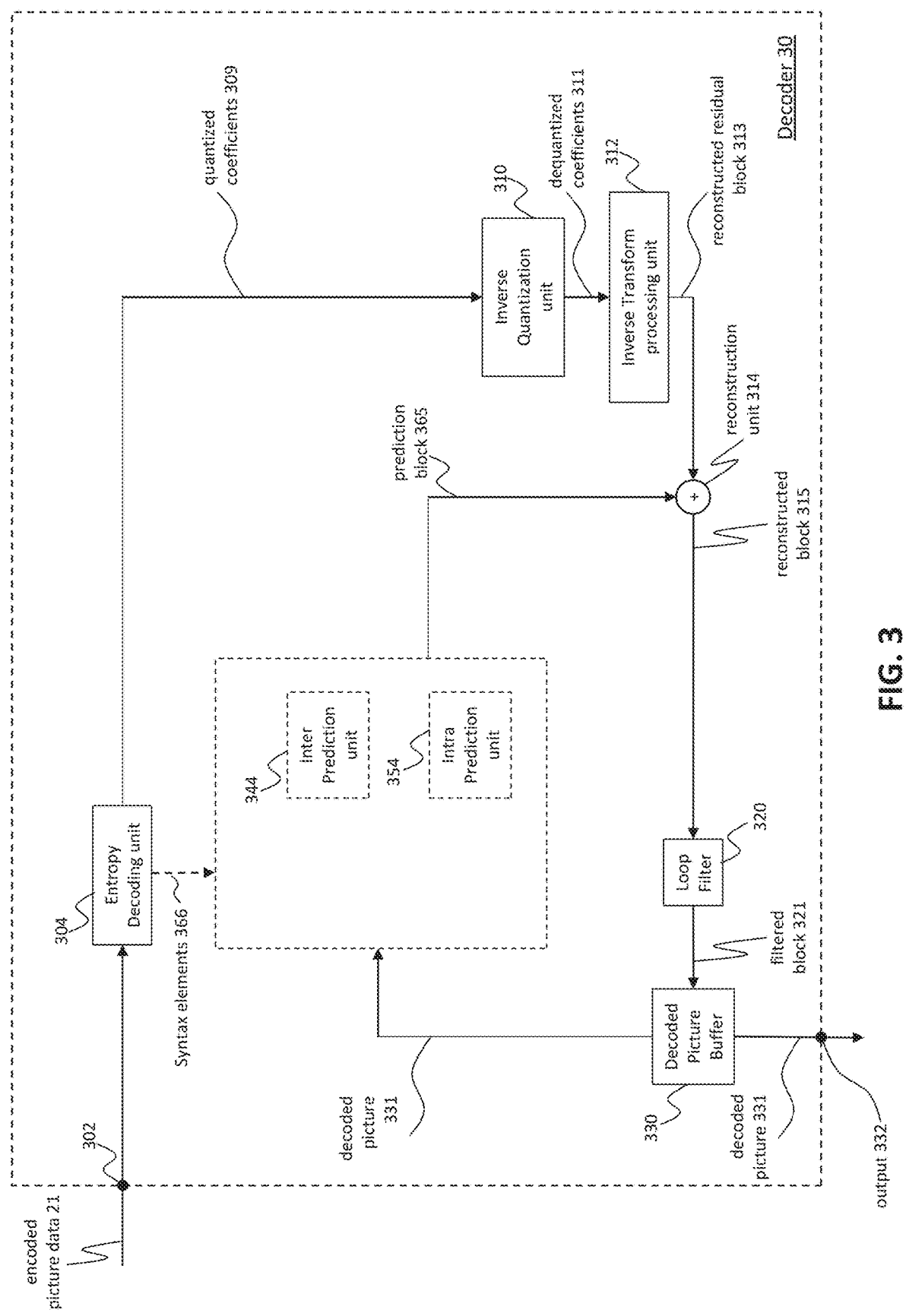
FIG. 3 is a block diagram showing an example structure of a video decoder configured to implement embodiments of the disclosure.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g. via input 201, a picture 17 (or picture data 17), e.g. picture of a sequence of pictures forming a video or video sequence. The received picture or picture data may also be a pre-processed picture 19 (or pre-processed picture data 19). For sake of simplicity, the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g. one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g. a luma array in case of a monochrome picture 17, or a luma or chroma array in case of a color picture) or three sample arrays (e.g. a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured to encode the picture 17 block by block, e.g. the encoding and prediction is performed per block 203.

Embodiments of the video encoder 20 as shown in FIG. 2 may be further configured to partition and/or encode the picture by using slices (also referred to as video slices), wherein a picture may be partitioned into or encoded using one or more slices (typically non-overlapping), and each slice may comprise one or more blocks (e.g. CTUs).

Embodiments of the video encoder 20 as shown in FIG. 2 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Residual Calculation

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed-point approximation of an equation including division. Additional scaling factors may be introduced for quantization and dequantization to restore the norm of the residual block, which might be modified because of the scaling used in the fixed-point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

Embodiments of the video encoder 20 (respectively quantization unit 208) may be configured to output quantization parameters (QP), e.g. directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g. an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g. adder or summer 214) is configured to add the transform block 213 (i.e. reconstructed residual block 213) to the prediction block 265 to obtain a reconstructed block 215 in the sample domain, e.g. by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g. directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g. if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g. an original block 203 (current block 203 of the current picture 17), and reconstructed picture data, e.g. filtered and/or unfiltered reconstructed samples or blocks of the same (current) picture and/or from one or a plurality of previously decoded pictures, e.g. from decoded picture buffer 230 or other buffers (e.g. line buffer, not shown). The reconstructed picture data is used as reference picture data for prediction, e.g. inter-prediction or intra-prediction, to obtain a prediction block 265 or predictor 265.

Mode selection unit 260 may be configured to determine or select a partitioning for a current block prediction mode (including no partitioning) and a prediction mode (e.g. an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g. from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode, which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a"sub-optimum selection" but reducing complexity and processing time.

In other words, the partitioning unit 262 may be configured to partition the block 203 into smaller block partitions or sub-blocks (which form again blocks), e.g. iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g. by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g. smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g. at root tree-level 0 (hierarchy-level 0, depth 0), may be recursively partitioned, e.g. partitioned into two or more blocks of a next lower tree-level, e.g. nodes at tree-level 1 (hierarchy-level 1, depth 1), wherein these blocks may be again partitioned into two or more blocks of a next lower level, e.g. tree-level 2 (hierarchy-level 2, depth 2), etc. until the partitioning is terminated, e.g. because a termination criterion is fulfilled, e.g. a maximum tree depth or minimum block size is reached. Blocks, which are not further partitioned, are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g. a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly, a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), a combined Quad-tree and binary tree (QTBT) partitioning is for example used to partition a coding block. In the QTBT block structure, a CU can have either a square or a rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for prediction and transform processing without any further partitioning. This means that the CU, PU and TU have the same block size in the QTBT coding block structure. In parallel, multiple partition, for example, triple tree partition may be used together with the QTBT block structure.

In one example, the mode selection unit 260 of video encoder 20 may be configured to perform any combination of the partitioning techniques described herein. As described above, the video encoder 20 is configured to determine or select the best or an optimum prediction mode from a set of (e.g. pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g. non-directional modes like DC (or mean) mode and planar mode, or directional modes, e.g. as defined in HEVC, or may comprise 67 different intra-prediction modes, e.g. non-directional modes like DC (or mean) mode and planar mode, or directional modes, e.g. as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied. The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g. reconstructed blocks of one or a plurality of other/different previously decoded pictures 231, for motion estimation. E.g., a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g. receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

The motion compensation unit may also generate syntax elements associated with the blocks and video slices for use by video decoder 30 in decoding the picture blocks of the video slice. In addition or as an alternative to slices and respective syntax elements, tile groups and/or tiles and respective syntax elements may be generated or used.

Entropy Coding

The entropy encoding unit 270 is configured to apply, for example, an entropy encoding algorithm or scheme (e.g. a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g. in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 3, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g. any or all of inter prediction parameters (e.g. reference picture index and motion vector), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

Inverse Quantization

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

Reconstruction

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g. by parsing and/or decoding, e.g. by entropy decoding unit 304). Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Embodiments of the video decoder 30 as shown in FIG. 3 may be configured to partition and/or decode the picture by using slices (also referred to as video slices), wherein a picture may be partitioned into or decoded using one or more slices (typically non-overlapping), and each slice may comprise one or more blocks (e.g. CTUs).

Embodiments of the video decoder 30 as shown in FIG. 3 may be configured to partition and/or decode the picture by using tile groups (also referred to as video tile groups) and/or tiles (also referred to as video tiles), wherein a picture may be partitioned into or decoded using one or more tile groups (typically non-overlapping), and each tile group may comprise, e.g. one or more blocks (e.g. CTUs) or one or more tiles, wherein each tile, e.g. may be of rectangular shape and may comprise one or more blocks (e.g. CTUs), e.g. complete or fractional blocks.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current operation might be further processed and then output to the next operation. For example, after interpolation filtering, motion vector derivation or loop filtering, a further operation, such as Clip or shift, may be performed on the processing result of the interpolation filtering, motion vector derivation or loop filtering.

It should be noted that further operations might be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{\wedge}(\text{bitDepth}-1)\sim 2(\text{bitDepth}-1)-1$, where "^" means exponentiation. For example, if bitDepth is set equal to 16, the range is $-32768\sim 32767$; if bitDepth is set equal to 18, the range is $-131072\sim 131071$. For example, the value of the derived motion vector (e.g. the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Method 1: remove the overflow MSB (most significant bit) by flowing operations $$ux=(mvx+2^{bitDepth})\%2^{bitDepth} \quad (1)$$

$$mvx=(ux>=2^{bitDepth-1})?(ux-2^{bitDepth}):ux \quad (2)$$

$$uy=(mvy+2^{bitDepth})\%2^{bitDepth} \quad (3)$$

$$mvy=(uy>=2^{bitDepth-1})?(uy-2^{bitDepth}):uy \quad (4)$$

where mvx is a horizontal component of a motion vector of an image block or a sub-block, mvy is a vertical component of a motion vector of an image block or a sub-block, and ux and uy indicates an intermediate value;

For example, if the value of mvx is −32769, after applying formula (1) and (2), the resulting value is 32767. In computer system, decimal numbers are stored as two's complement. The two's complement of −32769 is 1,0111,1111,1111,1111 (17 bits), then the MSB is discarded, so the resulting two's complement is 0111,1111,1111,1111 (decimal number is 32767), which is same as the output by applying formula (1) and (2).

$$ux=(mvpx+mvdx+2^{bitDepth})\%2^{bitDepth} \quad (5)$$

$$mvx=(ux>=2^{bitDepth-1})?(ux-2^{bitDepth}):ux \quad (6)$$

$$uy=(mvpy+mvdy+2^{bitDepth})\%2^{bitDepth} \quad (7)$$

$$mvy=(uy>=2^{bitDepth-1})?(uy-2^{bitDepth}):uy \quad (8)$$

The operations may be applied during the sum of mvp and mvd, as shown in formula (5) to (8).

Method 2: remove the overflow MSB by clipping the value $$vx=\text{Clip3}(-2^{bitDepth-1},2^{bitDepth-1}-1,vx)$$

$$vy=\text{Clip3}(-2^{bitDepth-1},2^{bitDepth-1}-1,vy)$$

where vx is a horizontal component of a motion vector of an image block or a sub-block, vy is a vertical component of a motion vector of an image block or a sub-block; x, y and z respectively correspond to three input value of the MV clipping process, and the definition of function Clip3 is as follow:

$$\text{Clip3}(x, y, z) = \begin{cases} x; & z < x \\ y; & z > y \\ z; & \text{otherwise} \end{cases}$$

Figure 4:
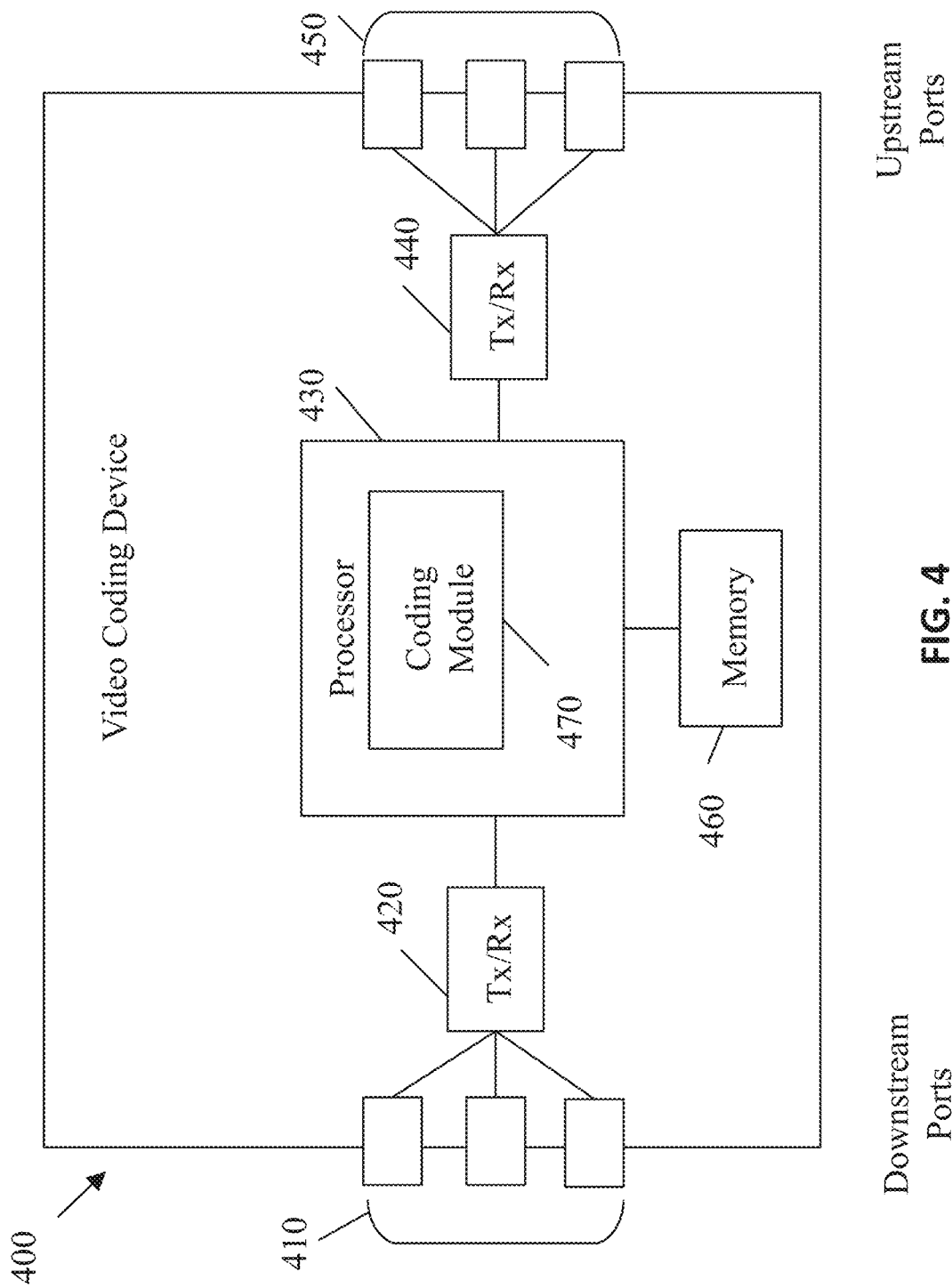
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
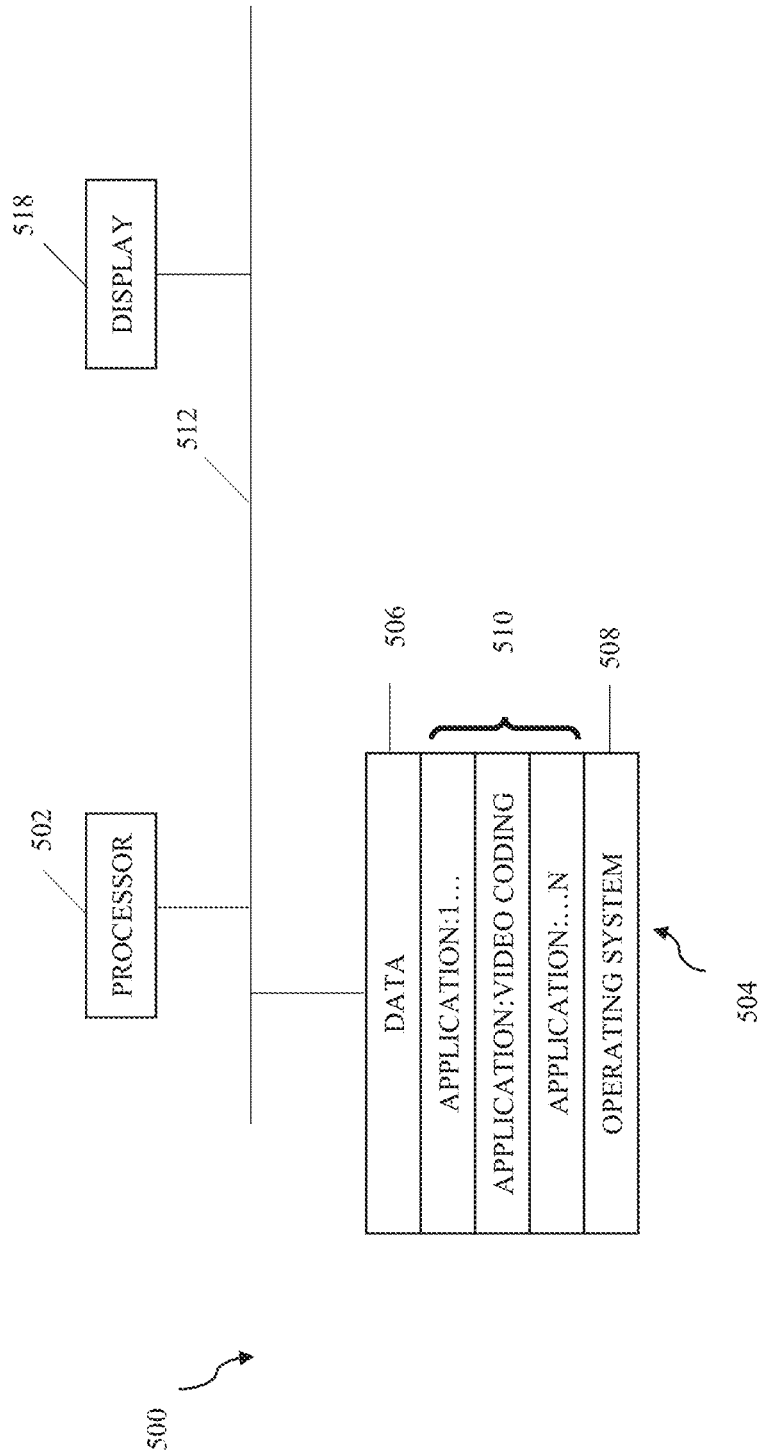
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Position-dependent intra prediction combination, PDPC, (also known as position-dependent intra prediction sample filtering process) is a post-prediction filtering process applied to predicted blocks; these predicted blocks are generated according to intra prediction modes such as DC mode (INTRA_DC), planer mode (INTRA_PLANAR), and a subset of directional (angular) modes including horizontal (INTRA_ANGULAR18) mode and vertical (INTRA_ANGULAR50) mode. Directional modes excluding horizontal (INTRA_ANGULAR18) and vertical (INTRA_ANGULAR50) are referred to as oblique directional (angular) modes or skew directional (angular) modes. The current version of the VVC specification draft (document JVET-P2001-vE: B. Bross, J. Chen, S. Liu, Y.-K. Wang, "Versatile Video Coding (Draft 7)," output document JVET-P2001 of the 16$^{th}$ JVET meeting, Geneva, Switzerland; this document is contained in file JVET-P2001-v14: http://phenix.it-sud-paris.eu/jvet/doc_end_user/documents/16_Geneva/wg11/JVET-P2001-v14.zip) prescribes the following sequence of operations in Section 8.4.5.2.14 "Position-dependent intra prediction sample filtering process" to perform PDPC:

Specification of INTRA_ANGULAR2 . . . INTRA_ANGULAR66 Intra Prediction Modes

Inputs to this process are:
the intra prediction mode predModeIntra,
a variable nTbW specifying the transform block width,
a variable nTbH specifying the transform block height,
a variable refW specifying the reference samples width,
a variable refH specifying the reference samples height,
the predicted samples predSamples[x][y], with x=0 . . . nTbW−1, y=0 . . . nTbH−1,
the neighbouring samples p[x][y], with x=−1, y=−1 and x=0 . . . refW−1, y=−1.

Outputs of this process are the modified predicted samples predSamples[x][y] with x=0 . . . nTbW−1, y=0 . . . nTbH−1.

The variable nScale is derived as follows:
If predModeIntra is greater than INTRA_ANGULAR50, nScale is set equal to Min(2, Log 2(nTbH)−Floor(Log 2(3*invAngle−2))+8), using invAngle as specified in clause 8.4.5.2.12.
Otherwise, if predModeIntra is less than INTRA_ANGULAR18, not equal to INTRA_PLANAR and not equal to INTRA_DC, nScale is set equal to Min(2, Log 2(nTbW)−Floor(Log 2(3*invAngle−2))+8), using invAngle as specified in clause 8.4.5.2.12.
Otherwise, nScale is set to ((Log 2(nTbW)+Log 2(nTbH)−2)>>2).

The reference sample arrays mainRef[x] and sideRef[y], with x=0 . . . refW−1 and y=0 . . . refH−1 are derived as follows:

mainRef[$x$]=$p$[$x$][−1]

sideRef[$y$]=$p$[−1][$y$]

The variables refL[x][y], refT[x][y], wT[y], and wL[x] with x=0 . . . nTbW−1, y=0 . . . nTbH−1 are derived as follows:
If predModeIntra is equal to INTRA_PLANAR or INTRA_DC, the following applies:

refL[$x$][$y$]=$p$[−1][$y$]

refT[$x$][$y$]=$p$[$x$][−1]

wT[$y$]=32>>(($y$<<1)>>$n$Scale)

wL[$x$]=32>>(($x$<<1)>>$n$Scale)

Otherwise, if predModeIntra is equal to INTRA_ANGULAR18 or INTRA_ANGULAR50, the following applies:

refL[$x$][$y$]=$p$[−1][$y$]−$p$[−1][−1]+predSamples[$x$][$y$]

refT[$x$][$y$]=$p$[$x$][−1]−$p$[−1][−1]+predSamples[$x$][$y$]

wT[$y$]=(predModeIntra==INTRA_ANGULAR18)?32>>(($y$<<1)>>$n$Scale):0 wL[$x$]=(predModeIntra==INTRA_ANGULAR50)?32>>(($x$<<1)>>$n$Scale):0

Otherwise, if predModeIntra is less than INTRA_ANGULAR18 and nScale is equal to or greater than 0, the following ordered operations apply:
1. The variables dXInt[y] and dX[x][y] are derived as follows using invAngle as specified in clause 8.4.5.2.12 depending on intraPredMode:

dXInt[$y$]=(($y$+1)*invAngle+256)>>9 dX[$x$][$y$]=$x$+dXInt[$y$]

2. The variables refL[x][y], refT[x][y], wT[y], and wL[x] are derived as follows:

refL[$x$][$y$]=0 refT[$x$][$y$]=($y$<(3<<$n$Scale)?mainRef[dX[$x$][$y$]]:0 wT[$y$]=32>>(($y$<<1)>>$n$Scale)

wL[$x$]=0

Otherwise, if predModeIntra is greater than INTRA_ANGULAR50 and nScale is equal to or greater than 0, the following ordered operations apply:
1. The variables dYInt[x] and dY[x][y] are derived as follows using invAngle as specified in clause 8.4.5.2.12 depending on intraPredMode:

dYInt[$x$]=(($x$+1)*invAngle+256)>>9 dY[$x$][$y$]=$y$+dYInt[$x$]

2. The variables refL[x][y], refT[x][y], wT[y], and wL[x] are derived as follows:

refL[$x$][$y$]=($x$<(3<<$n$Scale)?sideRef[dY[$x$][$y$]]: 0 refT[x][y]=0 wT[y]=0 wL[x]=32>>((x<<1)>>nScale)

Otherwise, refL[x][y], refT[x][y], wT[y], and wL[x] are all set equal to 0.

The values of the modified predicted samples predSamples[x][y], with x=0 . . . nTbW−1, y=0 . . . nTbH−1 are derived as follows:

predSamples[x][y]=Clip1((refL[x][y]*wL[x]+refT[x][y]*wT[y]+(64−wL[x]−wT[y])*predSamples[x][y]+32)>>6)

Clause 8.4.5.2.12 "Specification of INTRA_ANGULAR2 . . . INTRA_ANGULAR66 intra prediction modes" of the current VVC specification draft (document JVET-P2001-vE: B. Bross, J. Chen, S. Liu, Y.-K. Wang, "Versatile Video Coding (Draft 7)," output document JVET-P2001 of the 16th JVET meeting, Geneva, Switzerland) is given below:

Specification of INTRA_ANGULAR2 . . . INTRA_ANGULAR66 Intra Prediction Modes

Inputs to this process are:
the intra prediction mode predModeIntra,
a variable refIdx specifying the intra prediction reference line index,
a variable nTbW specifying the transform block width,
a variable nTbH specifying the transform block height,
a variable refW specifying the reference samples width,
a variable refH specifying the reference samples height,
a variable nCbW specifying the coding block width,
a variable nCbH specifying the coding block height,
a variable refFilterFlag specifying the value of reference filter flag,
a variable cIdx specifying the colour component of the current block,
the neighbouring samples p[x][y], with x=−1−refIdx, y=−1−refIdx . . . refH−1 and x=−refIdx . . . refW−1, y=−1−refIdx.

Outputs of this process are the predicted samples predSamples[x][y], with x=0 . . . nTbW−1, y=0 . . . nTbH−1.

The variable nTbS is set equal to (Log 2 (nTbW)+Log 2 (nTbH))>>1.

The variable filterFlag is derived as follows:
If one or more of the following conditions is true, filterFlag is set equal to 0:
refFilterFlag is equal to 1;
refIdx is not equal to 0;
IntraSubPartitionsSplitType is not equal to ISP_NO_SPLIT.
Otherwise, the following applies:
The variable minDistVerHor is set equal to Min(Abs(predModeIntra−50), Abs(predModeIntra−18)).
The variable intraHorVerDistThres[nTbS] is specified in Table 1.
The variable filterFlag is derived as follows:
If minDistVerHor is greater than intraHorVerDistThres[nTbS], filterFlag is set equal to 1.
Otherwise, filterFlag is set equal to 0.

TABLE 1

Specification of intraHorVerDistThres[ nTbS ]
for various transform block sizes nTbS

| | nTbS = 2 | nTbS = 3 | nTbS = 4 | nTbS = 5 | nTbS = 6 | nTbS = 7 |
|---|---|---|---|---|---|---|
| intraHorVerDistThres[ nTbS ] | 24 | 14 | 2 | 0 | 0 | 0 |

Figure 6:
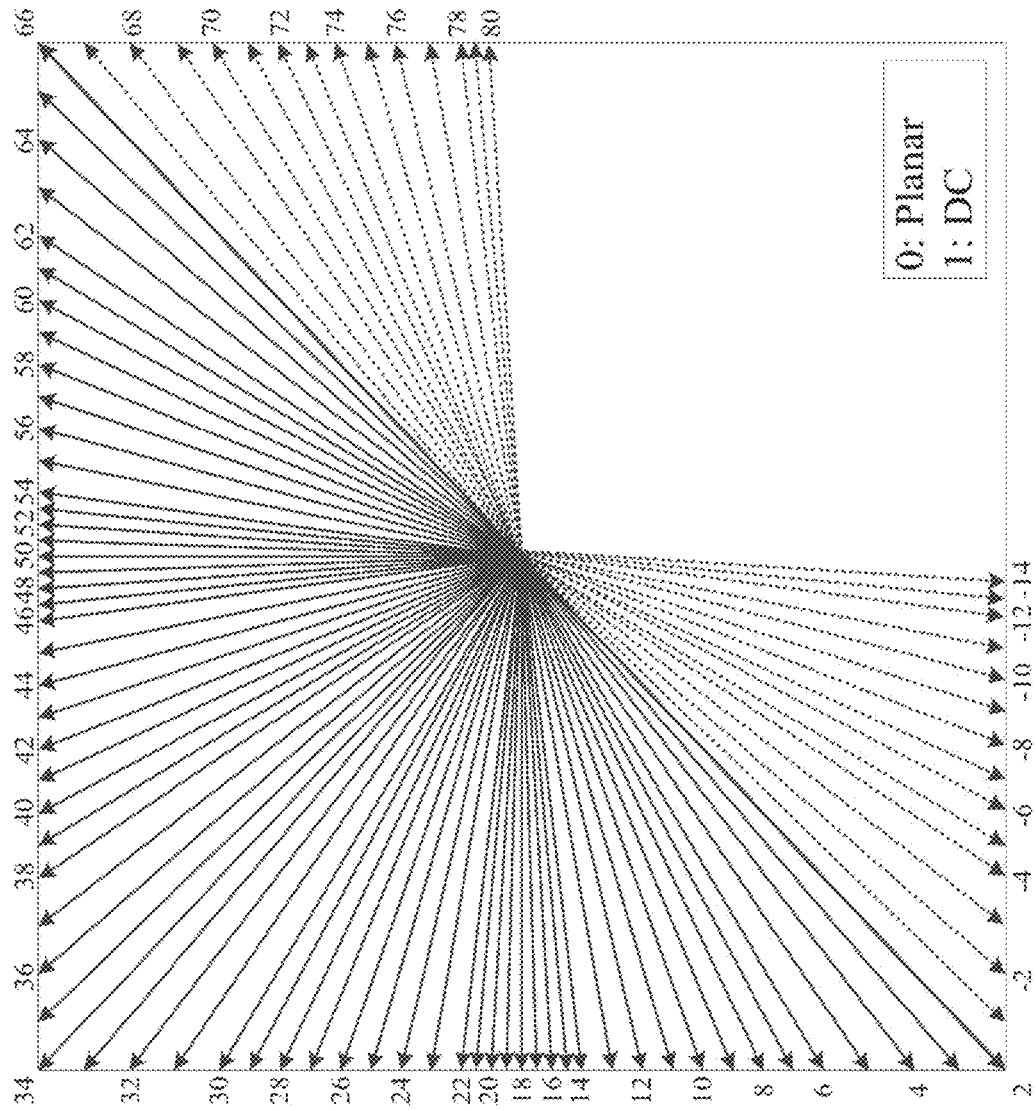
FIG. 6 is an illustration of the 93 prediction directions, where the dashed directions are associated with the wide-angle modes that are applied to non-square blocks.

FIG. 6 illustrates the 93 prediction directions, where the dashed directions are associated with the wide-angle modes that are only applied to non-square blocks. Table 2 specifies the mapping table between predModeIntra and the angle parameter intraPredAngle.

TABLE 2

Specification of intraPredAngle

| predModeIntra | −14 | −13 | −12 | −11 | −10 | −9 | −8 | −7 | −6 | −5 | −4 | −3 | −2 | −1 | 2 | 3 | 4 |
|---|---|---|---|---|---|---|---|---|---|---|---|---|---|---|---|---|---|
| intraPredAngle | 512 | 341 | 256 | 171 | 128 | 102 | 86 | 73 | 64 | 57 | 51 | 45 | 39 | 35 | 32 | 29 | 26 |
| predModeIntra | 5 | 6 | 7 | 8 | 9 | 10 | 11 | 12 | 13 | 14 | 15 | 16 | 17 | 18 | 19 | 20 | 21 |
| intraPredAngle | 23 | 20 | 18 | 16 | 14 | 12 | 10 | 8 | 6 | 4 | 3 | 2 | 1 | 0 | −1 | −2 | −3 |
| predModeIntra | 22 | 23 | 24 | 25 | 26 | 27 | 28 | 29 | 30 | 31 | 32 | 33 | 34 | 35 | 36 | 37 | 38 |
| intraPredAngle | −4 | −6 | −8 | −10 | −12 | −14 | −16 | −18 | −20 | −23 | −26 | −29 | −32 | −29 | −26 | −23 | −20 |
| predModeIntra | 39 | 40 | 41 | 42 | 43 | 44 | 45 | 46 | 47 | 48 | 49 | 50 | 51 | 52 | 53 | 54 | 55 |
| intraPredAngle | −18 | −16 | −14 | −12 | −10 | −8 | −6 | −4 | −3 | −2 | −1 | 0 | 1 | 2 | 3 | 4 | 6 |

TABLE 2-continued

Specification of intraPredAngle

| predModeIntra | 56 | 57 | 58 | 59 | 60 | 61 | 62 | 63 | 64 | 65 | 66 | 67 | 68 | 69 | 70 | 71 | 72 |
|---|---|---|---|---|---|---|---|---|---|---|---|---|---|---|---|---|---|
| intraPredAngle | 8 | 10 | 12 | 14 | 16 | 18 | 20 | 23 | 26 | 29 | 32 | 35 | 39 | 45 | 51 | 57 | 64 |
| predModeIntra | 73 | 74 | 75 | 76 | 77 | 78 | 79 | 80 | | | | | | | | | |
| intraPredAngle | 73 | 86 | 102 | 128 | 171 | 256 | 341 | 512 | | | | | | | | | |

The inverse angle parameter invAngle is derived based on intraPredAngle as follows:

invAngle=Round

The interpolation filter coefficients fC[phase][j] and fG[phase][j] with phase=0 . . . 31 and j=0 . . . 3 are specified in Table 3.

TABLE 3

Specification of interpolation filter coefficients fC and fG

| Fractional sample position p | fC interpolation filter coefficients | | | | fG interpolation filter coefficients | | | |
|---|---|---|---|---|---|---|---|---|
| | $f_C[p][0]$ | $f_C[p][1]$ | $f_C[p][2]$ | $f_C[p][3]$ | fG[p][0] | fG[p][1] | fG[p][2] | fG[p][3] |
| 0 | 0 | 64 | 0 | 0 | 16 | 32 | 16 | 0 |
| 1 | −1 | 63 | 2 | 0 | 16 | 32 | 16 | 0 |
| 2 | −2 | 62 | 4 | 0 | 15 | 31 | 17 | 1 |
| 3 | −2 | 60 | 7 | −1 | 15 | 31 | 17 | 1 |
| 4 | −2 | 58 | 10 | −2 | 14 | 30 | 18 | 2 |
| 5 | −3 | 57 | 12 | −2 | 14 | 30 | 18 | 2 |
| 6 | −4 | 56 | 14 | −2 | 13 | 29 | 19 | 3 |
| 7 | −4 | 55 | 15 | −2 | 13 | 29 | 19 | 3 |
| 8 | −4 | 54 | 16 | −2 | 12 | 28 | 20 | 4 |
| 9 | −5 | 53 | 18 | −2 | 12 | 28 | 20 | 4 |
| 10 | −6 | 52 | 20 | −2 | 11 | 27 | 21 | 5 |
| 11 | −6 | 49 | 24 | −3 | 11 | 27 | 21 | 5 |
| 12 | −6 | 46 | 28 | −4 | 10 | 26 | 22 | 6 |
| 13 | −5 | 44 | 29 | −4 | 10 | 26 | 22 | 6 |
| 14 | −4 | 42 | 30 | −4 | 9 | 25 | 23 | 7 |
| 15 | −4 | 39 | 33 | −4 | 9 | 25 | 23 | 7 |
| 16 | −4 | 36 | 36 | −4 | 8 | 24 | 24 | 8 |
| 17 | −4 | 33 | 39 | −4 | 8 | 24 | 24 | 8 |
| 18 | −4 | 30 | 42 | −4 | 7 | 23 | 25 | 9 |
| 19 | −4 | 29 | 44 | −5 | 7 | 23 | 25 | 9 |
| 20 | −4 | 28 | 46 | −6 | 6 | 22 | 26 | 10 |
| 21 | −3 | 24 | 49 | −6 | 6 | 22 | 26 | 10 |
| 22 | −2 | 20 | 52 | −6 | 5 | 21 | 27 | 11 |
| 23 | −2 | 18 | 53 | −5 | 5 | 21 | 27 | 11 |
| 24 | −2 | 16 | 54 | −4 | 4 | 20 | 28 | 12 |
| 25 | −2 | 15 | 55 | −4 | 4 | 20 | 28 | 12 |
| 26 | −2 | 14 | 56 | −4 | 3 | 19 | 29 | 13 |
| 27 | −2 | 12 | 57 | −3 | 3 | 19 | 29 | 13 |
| 28 | −2 | 10 | 58 | −2 | 2 | 18 | 30 | 14 |
| 29 | −1 | 7 | 60 | −2 | 2 | 18 | 30 | 14 |
| 30 | 0 | 4 | 62 | −2 | 1 | 17 | 31 | 15 |
| 31 | 0 | 2 | 63 | −1 | 1 | 17 | 31 | 15 |

The values of the prediction samples predSamples[x][y], with x=0 . . . nTbW−1, y=0 . . . nTbH−1 are derived as follows:

If predModeIntra is greater than or equal to 34, the following ordered operations apply:

1. The reference sample array ref[x] is specified as follows:

The following applies:

ref[x]=p[−1−refIdx+x][−1−refIdx], with x=0 . . . nTbW+refIdx+1.

If intraPredAngle is less than 0, the main reference sample array is extended as follows:

ref[x]=p[−1−refIdx][−1−refIdx+Min((x*invAngle+256)>>9,nTbH)], with x=−nTbH . . . −1.

Otherwise, ref[x]=p[−1−refIdx+x][−1−refIdx], with x=nTbW+2+refIdx . . . refW+refIdx, The additional samples ref[refW+refIdx+x] with x=1 . . . (Max(1, nTbW/nTbH)*refIdx+1) are derived as follows:

ref[refW+refIdx+x]=p[−1+refW][−1−refIdx].

2. The values of the prediction samples predSamples[x][y], with x=0 . . . nTbW−1, y=0 . . . nTbH−1 are derived as follows:

The index variable iIdx and the multiplication factor iFact are derived as follows:

iIdx=(((y+1+refIdx)*intraPredAngle)>>5)+refIdx iFact=((y+1+refIdx)*intraPredAngle)&31

If cIdx is equal to 0, the following applies:
  The interpolation filter coefficients fT[j] with j=0 . . . 3 are derived as follows:

fT[j]=filterFlag?fG[iFact][j]:fC[iFact][j].

The value of the prediction samples predSamples[x][y] is derived as follows:

predSamples[x][y]=Clip1((( )+32)>>6).

Otherwise (cIdx is not equal to 0), depending on the value of iFact, the following applies:
  If iFact is not equal to 0, the value of the prediction samples predSamples[x][y] is derived as follows:

predSamples[x][y]=((32−iFact)*ref[x]+iIdx+1+
    iFact*ref[x+iIdx+2]+16)>>5.

Otherwise, the value of the prediction samples predSamples[x][y] is derived as follows:

predSamples[x][y]=ref[x+iIdx+1].

Otherwise (predModeIntra is less than 34), the following ordered operations apply:
    The reference sample array ref[x] is specified as follows:
    The following applies:

ref[x]=p[−1−refIdx][−1−refIdx+x], with x=0 . . . nTbH+refIdx+1;

If intraPredAngle is less than 0, the main reference sample array is extended as follows:

ref[x]=p[−1−refIdx+Min((x*invAngle+256)>>9,
    nTbW)][−1−refIdx], with x=−nTbW . . . −1.

Otherwise, ref[x]=p[−1−refIdx][−1−refIdx+x], with x=nTbH+2+
    refIdx . . . refH+refIdx.

The additional samples ref[refH+refIdx+x] with x=1 . . . (Max(1, nTbH/nTbW)*refIdx+1) are derived as follows:

ref[refH+refIdx+x]=p[−1+refH][−1−refIdx].

The values of the prediction samples predSamples[x][y], with x=0 . . . nTbW−1, y=0 . . . nTbH−1 are derived as follows:
The index variable iIdx and the multiplication factor iFact are derived as follows:

iIdx=(((x+1+refIdx)*intraPredAngle)>>5)+refIdx iFact=((x+1+refIdx)*intraPredAngle)& 31

If cIdx is equal to 0, the following applies:
  The interpolation filter coefficients fT[j] with j=0 . . . 3 are derived as follows:

fT[j]=filterFlag?fG[iFact][j]:fC[iFact][j].

The value of the prediction samples predSamples[x][y] is derived as follows:

predSamples[x][y]=Clip1((( )+32)>>6).

Otherwise (cIdx is not equal to 0), depending on the value of iFact, the following applies:
  If iFact is not equal to 0, the value of the prediction samples predSamples[x][y] is derived as follows:

predSamples[x][y]((32−iFact)*ref[y+iIdx+1]+
    iFact*ref[y+iIdx+2]+16)>>5;

Otherwise, the value of the prediction samples predSamples[x][y] is derived as follows:

predSamples[x][y]=ref[y+iIdx+1].

Embodiments below describe a mechanism to terminate PDPC for oblique directional modes, when a derived value of the variable nScale is less than 0. For these embodiments, Section 8.4.5.2.14 "Position-dependent intra prediction sample filtering process" can be rewritten as follows:

Embodiment 1

Specification of INTRA_ANGULAR2 . . . INTRA_ANGULAR66 intra prediction modes
  Inputs to this process are:
  the intra prediction mode predModeIntra,
  a variable nTbW specifying the transform block width,
  a variable nTbH specifying the transform block height,
  a variable refW specifying the reference samples width,
  a variable refH specifying the reference samples height,
  the predicted samples predSamples[x][y], with x=0 . . . nTbW−1, y=0 . . . nTbH−1,
  the neighbouring samples p[x][y], with x=−1, y=−1 . . . refH−1 and x=0 . . . refW−1, y=−1.
  Outputs of this process are the modified predicted samples predSamples[x][y] with x=0 . . . nTbW−1, y=0 . . . nTbH−1.
  The variable nScale is derived as follows:
    If predModeIntra is greater than INTRA_ANGULAR50, nScale is set equal to Min(2, Log 2(nTbH)−Floor(Log 2(3*invAngle−2))+8), using invAngle as specified in clause 8.4.5.2.12.
    Otherwise, if predModeIntra is less than INTRA_ANGULAR18, not equal to INTRA_PLANAR and not equal to INTRA_DC, nScale is set equal to Min(2, Log 2(nTbW)−Floor(Log 2(3*invAngle−2))+8), using invAngle as specified in clause 8.4.5.2.12.
    Otherwise, nScale is set to ((Log 2(nTbW)+Log 2(nTbH)−2)>>2).
  If the value of nScale is less than 0, process 8.4.5.2.14 is terminated, and outputs of this process are set equal to the input predicted samples predSamples[x][y], with x=0 . . . nTbW−1, y=0 . . . nTbH−1.
  The reference sample arrays mainRef[x] and sideRef[y], with x=0 . . . refW−1 and y=0 . . . refH−1 are derived as follows:

mainRef[x]=p[x][−1]

sideRef[y]=p[−1][y]

The variables refL[x][y], refT[x][y], wT[y], and wL[x] with x=0 . . . nTbW−1, y=0 . . . nTbH−1 are derived as follows:
    If predModeIntra is equal to INTRA_PLANAR or INTRA_DC, the following applies:

refL[x][y]=p[−1][y]

refT[x][y]=p[x][−1]

wT[y]=32>>((y<<1)>>nScale)

wL[x]=32>>((x<<1)>>nScale)

Otherwise, if predModeIntra is equal to INTRA_ANGULAR18 or INTRA_ANGULAR50, the following applies:

refL[x][y]=p[−1][y]−p[−1][−1]+predSamples[x][y]

refT[x][y]=p[x][−1]−p[−1][−1]+predSamples[x][y]

wT[y]=(predModeIntra==INTRA_ANGULAR18)?
32>>((y<<1)>>nScale):0 wL[x]=(predModeIntra==INTRA_ANGULAR50)?
32>>((x<<1)>>nScale):0

Otherwise, if predModeIntra is less than INTRA_ANGULAR18, the following ordered operations apply:
The variables dXInt[y] and dX[x][y] are derived as follows using invAngle as specified in clause 8.4.5.2.12 depending on intraPredMode:

dXInt[y]=((y+1)*invAngle+256)>>9 dX[x][y]=x+dXInt[y]

The variables refL[x][y], refT[x][y], wT[y], and wL[x] are derived as follows:

refL[x][y]=0 refT[x][y]=(y<(3<<nScale)?mainRef[dX[x][y]]:0 wT[y]=32>>((y<<1)>>nScale)

wL[x]=0

Otherwise, if predModeIntra is greater than INTRA_ANGULAR50, the following ordered operations apply:
The variables dYInt[x] and dY[x][y] are derived as follows using invAngle as specified in clause 8.4.5.2.12 depending on intraPredMode:

dYInt[x]=((x+1)*invAngle+256)>>9 dY[x][y]=y+dYInt[x]

The variables refL[x][y], refT[x][y], wT[y], and wL[x] are derived as follows:

refL[x][y]=(x<(3<<nScale)?sideRef[dY[x][y]]:0 refT[x][y]=0 wT[y]=0 wL[x]=32>>((x<<1)>>nScale).

The values of the modified predicted samples predSamples[x][y], with x=0 ... nTbW−1, y=0 ... nTbH−1 are derived as follows:

predSamples[x][y]=Clip1((refL[x][y]*wL[x]+refT[x][y]*wT[y]+(64−wL[x]−wT[y])*predSamples[x][y]+32)>>6).

Embodiment 2

Specification of INTRA_ANGULAR2 ... INTRA_ANGULAR66 intra prediction modes
Inputs to this process are:
the intra prediction mode predModeIntra,
a variable nTbW specifying the transform block width,
a variable nTbH specifying the transform block height,
a variable refW specifying the reference samples width,
a variable refH specifying the reference samples height,
the predicted samples predSamples[x][y], with x=0 ... nTbW−1, y=0 ... nTbH−1,
the neighbouring samples p[x][y] with x=−1, y=−1 and x=0 ... refW−1, y=−1.
Outputs of this process are the modified predicted samples predSamples[x][y] with x=0 ... nTbW−1, y=0 ... nTbH−1.
The variable nScale is derived as follows:
If predModeIntra is equal to INTRA_PLANAR, INTRA_DC, INTRA_ANGULAR18, or INTRA_ANGULAR50, nScale is set to ((Log 2(nTbW)+Log 2(nTbH)−2)>>2).

Otherwise, nScale is set equal to Min(2, Log 2(predModeIntra>INTRA_ANGULAR50? nTbH: nTbW)−Floor(Log 2(3*invAngle−2))+8), using invAngle as specified in clause 8.4.5.2.12. If the value of nScale is less than 0, process 8.4.5.2.14 is terminated, and outputs of this process are set equal to the input predicted samples predSamples[x][y], with x=0 ... nTbW−1, y=0 ... nTbH−1.
The reference sample arrays mainRef[x] and sideRef[y], with x=0 ... refW−1 and y=0 ... refH−1 are derived as follows:

mainRef[x]=p[x][−1]

sideRef[y]=p[−1][y]

The variables refL[x][y], refT[x][y], wT[y], and wL[x] with x=0 ... nTbW−1, y=0 ... nTbH−1 are derived as follows:
If predModeIntra is equal to INTRA_PLANAR or INTRA_DC, the following applies:

refL[x][y]=p[−1][y]

refT[x][y]=p[x][−1]

wT[y]=32>>((y<<1)>>nScale)

wL[x]=32>>((x<<1)>>nScale)

Otherwise, if predModeIntra is equal to INTRA_ANGULAR18 or INTRA_ANGULAR50, the following applies:

refL[x][y]=p[−1][y]−p[−1][−1]+predSamples[x][y]

refT[x][y]=p[x][−1]−p[−1][−1]+predSamples[x][y]

wT[y]=(predModeIntra==INTRA_ANGULAR18)
?32>>((y<<1)>>nScale):0 wL[x]=(predModeIntra==INTRA_ANGULAR50)
?32>>((x<<1)>>nScale):0

Otherwise, if predModeIntra is less than INTRA_ANGULAR18, the following ordered operations apply:
1. The variables dXInt[y] and dX[x][y] are derived as follows using invAngle as specified in clause 8.4.5.2.12 depending on intraPredMode:

dXInt[y]=((y+1)*invAngle+256)>>9 dX[x][y]=x+dXInt[y]

2. The variables refL[x][y], refT[x][y], wT[y], and wL[x] are derived as follows:

refL[x][y]=0 refT[x][y]=(y<(3<<nScale)?mainRef[dX[x][y]]:0 wT[y]=32>>((y<<1)>>nScale)

wL[x]=0

Otherwise, if predModeIntra is greater than INTRA_ANGULAR50, the following ordered operations apply:
1. The variables dYInt[x] and dY[x][y] are derived as follows using invAngle as specified in clause 8.4.5.2.12 depending on intraPredMode:

dYInt[x]=((x+1)*invAngle+256)>>9 dY[x][y]=y+dYInt[x]

2. The variables refL[x][y], refT[x][y], wT[y], and wL[x] are derived as follows:

refL[x][y]=(x<(3<<nScale)?sideRef[dY[x][y]]:0 refT[x][y]=0 wT[y]=0 wL[x]=32>>((x<<1)>>nScale).

The values of the modified predicted samples predSamples[x][y], with x=0 . . . nTbW−1, y=0 . . . nTbH−1 are derived as follows:

predSamples[x][y]=Clip1((refL[x][y]*wL[x]+refT[x][y]*wT[y]+(64−wL[x]−wT[y])*predSamples[x][y]+32)>>6).

Embodiment 3

Specification of INTRA_ANGULAR2 . . . INTRA_ANGULAR66 intra prediction modes

Inputs to this process are:
the intra prediction mode predModeIntra,
a variable nTbW specifying the transform block width,
a variable nTbH specifying the transform block height,
a variable refW specifying the reference samples width,
a variable refH specifying the reference samples height,
the predicted samples predSamples[x][y], with x=0 . . . nTbW−1, y=0 . . . nTbH−1,
the neighbouring samples p[x][y] with x=−1, y=−1 and x=0 . . . refW−1, y=−1.

Outputs of this process are the modified predicted samples predSamples[x][y] with x=0 . . . nTbW−1, y=0 . . . nTbH−1.

The variable nScale is derived as follows:
If predModeIntra is equal to INTRA_PLANAR, INTRA_DC, INTRA_ANGULAR18, or INTRA_ANGULAR50, nScale is set to ((Log 2(nTbW)+Log 2(nTbH)−2)>>2).
Otherwise, nScale is set equal to Min(2, Log 2(nTbS)−Floor(Log 2(3*invAngle−2))+8), using nTbS equal to predModeIntra>INTRA_ANGULAR50?nTbH:nTbW and invAngle as specified in clause 8.4.5.2.12. If the value of nScale is less than 0, process 8.4.5.2.14 is terminated, and outputs of this process are set equal to the input predicted samples predSamples[x][y], with x=0 . . . nTbW−1, y=0 . . . nTbH−1.

The reference sample arrays mainRef[x] and sideRef[y], with x=0 . . . refW−1 and y=0 . . . refH−1 are derived as follows:

mainRef[x]=p[x][−1]

sideRef[y]=p[−1][y]

The variables refL[x][y], refT[x][y], wT[y], and wL[x] with x=0 . . . nTbW−1, y=0 . . . nTbH−1 are derived as follows:

If predModeIntra is equal to INTRA_PLANAR or INTRA_DC, the following applies:

refL[x][y]=p[−1][y]

refT[x][y]=p[x][−1]

wT[y]=32>>((y<<1)>>nScale)

wL[x]=32>>((x<<1)>>nScale)

Otherwise, if predModeIntra is equal to INTRA_ANGULAR18 or INTRA_ANGULAR50, the following applies:

refL[x][y]=p[−1][y]−p[−1][−1]+predSamples[x][y]

refT[x][y]=p[x][−1]−p[−1][−1]+predSamples[x][y]

wT[y]=(predModeIntra==INTRA_ANGULAR18)?32>>((y<<1)>>nScale):0 wL[x]=(predModeIntra==INTRA_ANGULAR50)?32>>((x<<1)>>nScale):0

Otherwise, if predModeIntra is less than INTRA_ANGULAR18, the following ordered operations apply:
1. The variables dXInt[y] and dX[x][y] are derived as follows using invAngle as specified in clause 8.4.5.2.12 depending on intraPredMode:

dXInt[y]=((y+1)*invAngle+256)>>9 dX[x][y]=x+dXInt[y]

2. The variables refL[x][y], refT[x][y], wT[y], and wL[x] are derived as follows:

refL[x][y]=0 refT[x][y]=(y<(3<<nScale)?mainRef[dX[x][y]]:0 wT[y]=32>>((y<<1)>>nScale)

wL[x]=0

Otherwise, if predModeIntra is greater than INTRA_ANGULAR50, the following ordered operations apply:
1. The variables dYInt[x] and dY[x][y] are derived as follows using invAngle as specified in clause 8.4.5.2.12 depending on intraPredMode:

dYInt[x]=((x+1)*invAngle+256)>>9 dY[x][y]=y+dYInt[x]

2. The variables refL[x][y], refT[x][y], wT[y], and wL[x] are derived as follows:

refL[x][y]=(x<(3<<nScale)?sideRef[dY[x][y]]:0 refT[X][Y]=0 wT[y]=0 wL[x]=32>>((x<<1)>>nScale).

The values of the modified predicted samples predSamples[x][y], with x=0 . . . nTbW−1, y=0 . . . nTbH−1 are derived as follows:

predSamples[x][y]=Clip1((refL[x][y]*wL[x]+refT[x][y]*wT[y]+(64−wL[x]−wT[y])*predSamples[x][y]+32)>>6).

Other embodiments are a harmonization of PDPC with ISP (intra subpartition coding mode also known as intra prediction with subpartitions). In clause 8.4.5.2.5 "General intra sample prediction" of the current VVC specification draft (document JVET-P2001-vE: B. Bross, J. Chen, S. Liu, Y.-K. Wang, "Versatile Video Coding (Draft 7)," output document JVET-P2001 of the 16th JVET meeting, Geneva, Switzerland), the variables refW and refH are defined as follows:

General Intra Sample Prediction

Inputs to this process are:
a sample location (xTbCmp, yTbCmp) specifying the top-left sample of the current transform block relative to the top-left sample of the current picture,
a variable predModeIntra specifying the intra prediction mode,
a variable nTbW specifying the transform block width,
a variable nTbH specifying the transform block height,
a variable nCbW specifying the coding block width,
a variable nCbH specifying the coding block height,
a variable cIdx specifying the colour component of the current block.

Outputs of this process are the predicted samples predSamples[x][y], with x=0 . . . nTbW−1, y=0 . . . nTbH−1.

The variables refW and refH are derived as follows:

If IntraSubPartitionsSplitType is equal to ISP_NO_SPLIT or cIdx is not equal to 0, the following applies:

ref$W=nTbW$*2 ref$H=nTbH$*2

Otherwise (IntraSubPartitionsSplitType is not equal to ISP_NO_SPLIT and cIdx is equal to 0), the following applies:

ref$W=nCbW+nTbW$.

ref$H=nCbH+nTbH$.

Hence, the length of top and left reference sample sides is defined differently when ISP is enabled (IntraSubPartitionsSplitType is not equal to ISP_NO_SPLIT and cIdx is equal to 0) or when ISP is disabled (if IntraSubPartitionsSplitType is equal to ISP_NO_SPLIT or cIdx is not equal to 0). It results in extended number of available reference samples that can be used for performing PDPC for some oblique directional intra prediction modes.

Figure 7:
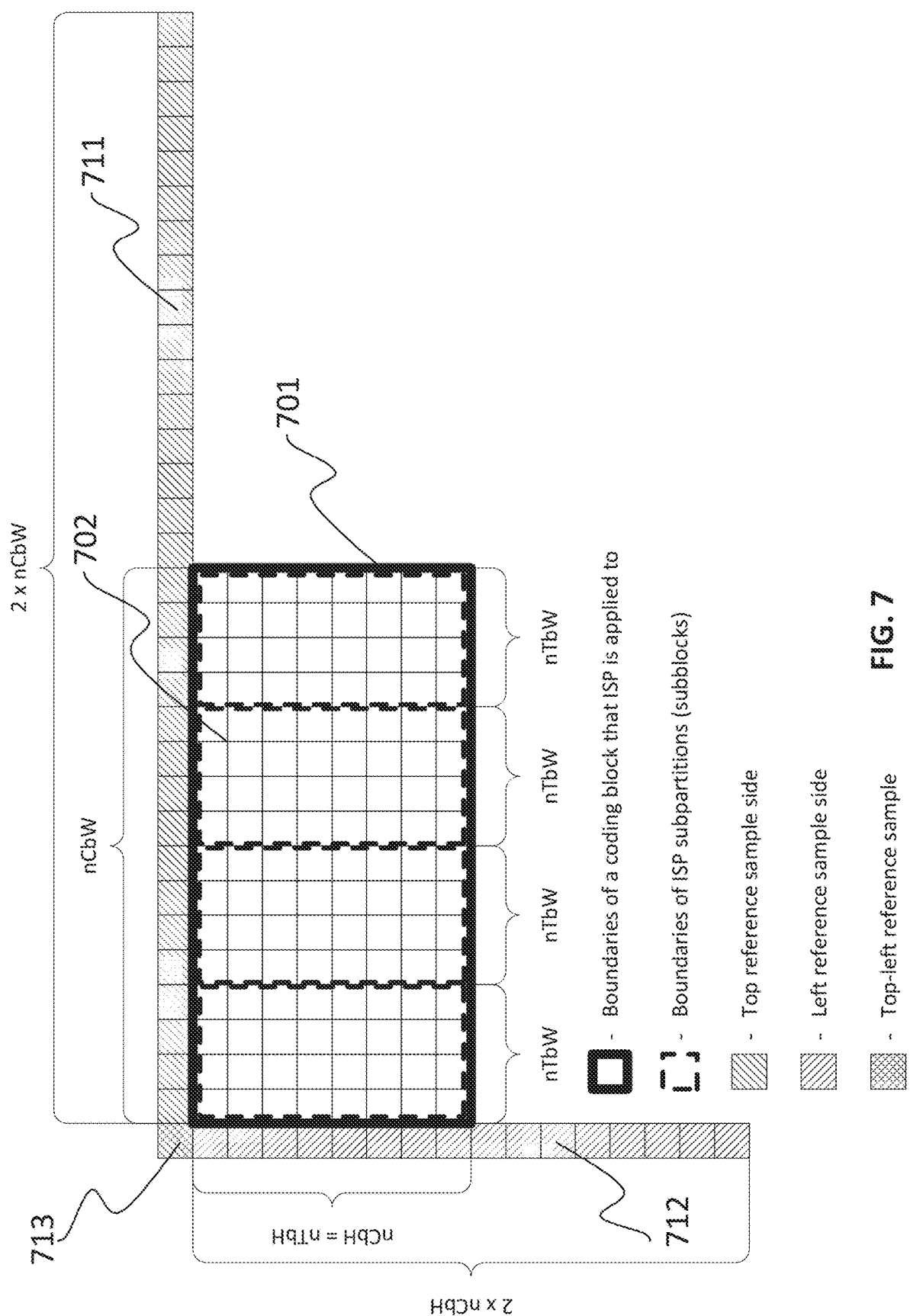
FIG. 7 is an illustration of ISP subpartitioning with vertical splitting.
Figure 8:
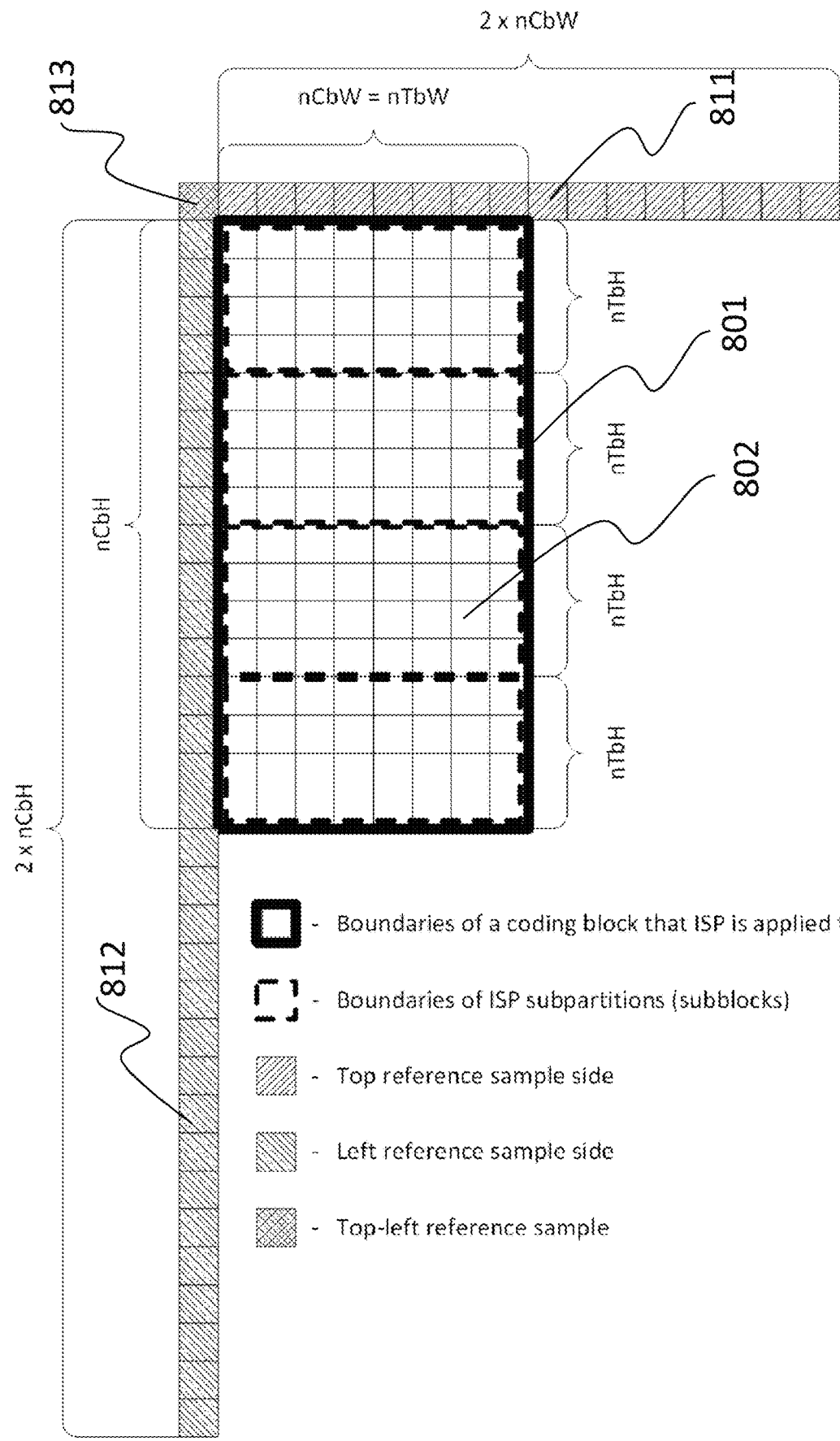
FIG. 8 is an illustration of ISP subpartitioning with horizontal splitting.

FIG. 7 and FIG. 8 illustrate two examples. Coding blocks 701 and 801 are split into 2 or 4 subpartitions also referred to as subblocks (exemplified as 702 and 802 in FIG. 7 and FIG. 8, respectively). Top row of reference samples is denoted as 711 and 811 in FIG. 7 and FIG. 8, respectively. Left column of reference samples is denoted as 712 and 812 in FIG. 7 and FIG. 8, respectively. Top-left reference sample is denoted as 713 and 813 in FIG. 7 and FIG. 8, respectively. When IntraSubPartitionsSplitType is not equal to ISP_NO_SPLIT and cIdx is equal to 0, either horizontal (ISP_HOR_SPLIT) or vertical (ISP_VER_SPLIT) splits are applied to a coding block. If vertical split (ISP_VER_SPLIT) is selected, nCbW is greater than nTbW as shown in FIG. 7. If horizontal split (ISP_HOR_SPLIT) is selected, nCbH is greater than nTbH as shown in FIG. 8. To enable PDPC for the extended subset of oblique directional modes, the formulas used to derive values of the variable nScale should be modified in Section 8.4.5.2.14 "Position-dependent intra prediction sample filtering process" as follows:

If predModeIntra is greater than INTRA_ANGULAR50, nScale is set equal to Min(2, Log 2(refH−nTbH)−Floor (Log 2(3*invAngle−2))+8), using invAngle as specified in clause 8.4.5.2.12.

Otherwise, if predModeIntra is less than INTRA_ANGULAR18, not equal to INTRA_PLANAR and not equal to INTRA_DC, nScale is set equal to Min(2, Log 2(refW−nTbW)−Floor(Log 2(3*invAngle−2))+8), using invAngle as specified in clause 8.4.5.2.12.

Thus, in the above formulas to compute the variable nScale for oblique angular modes, the coding block height nCbH and the coding block width nCbW are used instead of the transform block height nTbH and the transform block width nTbW, respectively. In the formulas above, the coding block height nCbH is calculated as (refH−nTbH) and the coding block width nCbW as (refW−nTbW). Below, relevant embodiments are shown.

Embodiment 4

Specification of INTRA_ANGULAR2 . . . INTRA_ANGULAR66 Intra Prediction Modes

Inputs to this process are:
the intra prediction mode predModeIntra,
a variable nTbW specifying the transform block width,
a variable nTbH specifying the transform block height,
a variable refW specifying the reference samples width,
a variable refH specifying the reference samples height,
the predicted samples predSamples[x][y], with x=0 . . . nTbW−1, y=0 . . . nTbH−1,
the neighbouring samples p[x][y], with x=−1, y=−1 . . . refH−1 and x=0 . . . refW−1, y=−1.

Outputs of this process are the modified predicted samples predSamples[x][y] with x=0 . . . nTbW−1, y=0 . . . nTbH−1.

The variable nScale is derived as follows:

If predModeIntra is greater than INTRA_ANGULAR50, nScale is set equal to Min(2, Log 2(refH−nTbH)−Floor (Log 2(3*invAngle−2))+8), using invAngle as specified in clause 8.4.5.2.12.

Otherwise, if predModeIntra is less than INTRA_ANGULAR18, not equal to INTRA_PLANAR and not equal to INTRA_DC, nScale is set equal to Min(2, Log 2(refW−nTbW)−Floor(Log 2(3*invAngle−2))+8), using invAngle as specified in clause 8.4.5.2.12.

Otherwise, nScale is set to ((Log 2(nTbW)+Log 2(nTbH)−2)>>2).

The reference sample arrays mainRef[x] and sideRef[y], with x=0 . . . refW−1 and y=0 . . . refH−1 are derived as follows:

mainRef[$x$]=$p$[$x$][−1]

sideRef[$y$]=$p$[−1][$y$]

The variables refL[x][y], refT[x][y], wT[y], and wL[x] with x=0 . . . nTbW−1, y=0 . . . nTbH−1 are derived as follows:

If predModeIntra is equal to INTRA_PLANAR or INTRA_DC, the following applies:

ref$L$[$x$][$y$]=$p$[−1][$y$]

ref$T$[$x$][$y$]=$p$[$x$][−1]

$wT$[$y$]=32>>(($y$<<1)>>$n$Scale)

$wL$[$x$]=32>>(($x$<<1)>>$n$Scale)

Otherwise, if predModeIntra is equal to INTRA_ANGULAR18 or INTRA_ANGULAR50, the following applies:

ref$L$[$x$][$y$]=$p$[−1][$y$]−$p$[−1][−1]+predSamples[$x$][$y$]

ref$T$[$x$][$y$]=$p$[$x$][−1]−$p$[−1][−1]+predSamples[$x$][$y$]

$wT$[$y$]=(predModeIntra==INTRA_ANGULAR18)? 32>>(($y$<<1)>>$n$Scale):0

$wL$[$x$]=(predModeIntra==INTRA_ANGULAR50)? 32>>(($x$<<1)>>$n$Scale):0

Otherwise, if predModeIntra is less than INTRA_ANGULAR18 and nScale is equal to or greater than 0, the following ordered operations apply:
1. The variables dXInt[y] and dX[x][y] are derived as follows using invAngle as specified in clause 8.4.5.2.12 depending on intraPredMode:

$$dXInt[y]=((y+1)*invAngle+256)>>9$$

$$dX[x][y]=x+dXInt[y]$$

2. The variables refL[x][y], refT[x][y], wT[y], and wL[x] are derived as follows:

$$refL[x][y]=0$$

$$refT[x][y]=(y<(3<<nScale)?mainRef[dX[x][y]]:0$$

$$wT[y]=32>>((y<<1)>>nScale)$$

$$wL[x]=0$$

Otherwise, if predModeIntra is greater than INTRA_ANGULAR50 and nScale is equal to or greater than 0, the following ordered operations apply:
1. The variables dYInt[x] and dY[x][y] are derived as follows using invAngle as specified in clause 8.4.5.2.12 depending on intraPredMode:

$$dYInt[x]=((x+1)*invAngle+256)>>9$$

$$dY[x][y]=y+dYInt[x]$$

2. The variables refL[x][y], refT[x][y], wT[y], and wL[x] are derived as follows:

$$refL[x][y]=(x<(3<<nScale)?sideRef[dY[x][y]]:0$$

$$refT[x][y]=0$$

$$wT[y]=0$$

$$wL[x]=32>>((x<<1)>>nScale)$$

Otherwise, refL[x][y], refT[x][y], wT[y], and wL[x] are all set equal to 0.

The values of the modified predicted samples predSamples[x][y], with x=0 . . . nTbW-1, y=0 . . . nTbH-1 are derived as follows:

$$predSamples[x][y]=Clip1((refL[x][y]*wL[x]+refT[x][y]*wT[y]+(64-wL[x]-wT[y])*predSamples[x][y]+32)>>6).$$

Embodiment 5 (on Top of Embodiment 1)

Specification of INTRA_ANGULAR2 . . . INTRA_ANGULAR66 Intra Prediction Modes
Inputs to this process are:
the intra prediction mode predModeIntra,
a variable nTbW specifying the transform block width,
a variable nTbH specifying the transform block height,
a variable refW specifying the reference samples width,
a variable refH specifying the reference samples height,
the predicted samples predSamples[x][y], with x=0 . . . nTbW-1, y=0 . . . nTbH-1,
the neighbouring samples p[x][y] with x=-1, y=-1 . . . refH-1 and x=0 . . . refW-1, y=-1.
Outputs of this process are the modified predicted samples predSamples[x][y] with x=0 . . . nTbW-1, y=0 . . . nTbH-1.

The variable nScale is derived as follows:
If predModeIntra is greater than INTRA_ANGULAR50, nScale is set equal to Min(2, Log 2(refH-nTbH)-Floor (Log 2(3*invAngle-2))+8), using invAngle as specified in clause 8.4.5.2.12.
Otherwise, if predModeIntra is less than INTRA_ANGULAR18, not equal to INTRA_PLANAR and not equal to INTRA_DC, nScale is set equal to Min(2, Log 2(refW-nTbW)-Floor(Log 2(3*invAngle-2))+8), using invAngle as specified in clause 8.4.5.2.12.
Otherwise, nScale is set to ((Log 2(nTbW)+Log 2(nTbH)-2)>>2).

If the value of nScale is less than 0, process 8.4.5.2.14 is terminated, and outputs of this process are set equal to the input predicted samples predSamples[x][y], with x=0 . . . nTbW-1, y=0 . . . nTbH-1.

The reference sample arrays mainRef[x] and sideRef[y], with x=0 . . . refW-1 and y=0 . . . refH-1 are derived as follows:

$$mainRef[x]=p[x][-1]$$

$$sideRef[y]=p[-1][y]$$

The variables refL[x][y], refT[x][y], wT[y], and wL[x] with x=0 . . . nTbW-1, y=0 . . . nTbH-1 are derived as follows:
If predModeIntra is equal to INTRA_PLANAR or INTRA_DC, the following applies:

$$refL[x][y]=p[-1][y]$$

$$refT[x][y]=p[x][-1]$$

$$wT[y]=32>>((y<<1)>>nScale)$$

$$wL[x]=32>>((x<<1)>>nScale)$$

Otherwise, if predModeIntra is equal to INTRA_ANGULAR18 or INTRA_ANGULAR50, the following applies:

$$refL[x][y]=p[-1][y]-p[-1][-1]+predSamples[x][y]$$

$$refT[x][y]=p[x][-1]-p[-1][-1]+predSamples[x][y]$$

$$wT[y]=(predModeIntra==INTRA\_ANGULAR18)?\\32>>((y<<1)>>nScale):0$$

$$wL[x]=(predModeIntra==INTRA\_ANGULAR50)?\\32>>((x<<1)>>nScale):0$$

Otherwise, if predModeIntra is less than INTRA_ANGULAR18, the following ordered operations apply:
1. The variables dXInt[y] and dX[x][y] are derived as follows using invAngle as specified in clause 8.4.5.2.12 depending on intraPredMode:

$$dXInt[y]=((y+1)*invAngle+256)>>9$$

$$dX[x][y]=x+dXInt[y]$$

2. The variables refL[x][y], refT[x][y], wT[y], and wL[x] are derived as follows:

$$refL[x][y]=0$$

$$refT[x][y]=(y<(3<<nScale)?mainRef[dX[x][y]]:0$$

$$wT[y]=32>>((y<<1)>>nScale)$$

$$wL[x]=0$$

Otherwise, if predModeIntra is greater than INTRA_ANGULAR50, the following ordered operations apply:

1. The variables dYInt[x] and dY[x][y] are derived as follows using invAngle as specified in clause 8.4.5.2.12 depending on intraPredMode:

$dYInt[x]=((x+1)*invAngle+256)>>9$ $dY[x][y]=y+dYInt[x]$

2. The variables refL[x][y], refT[x][y], wT[y], and wL[x] are derived as follows:

$refL[x][y]=(x<(3>>nScale)?sideRef[dY[x][y]]:0$ $refT[x][y]=0$ $wT[y]=0$ $wL[x]=32>>((x<<1)>>nScale).$ The values of the modified predicted samples predSamples[x][y], with x=0 ... nTbW−1, y=0 ... nTbH−1 are derived as follows:

$predSamples[x][y]=Clip1((refL[x][y]*wL[x]+refT[x][y]*wT[y]+(64−wL[x]−wT[y])*predSamples[x][y]+32)>>6).$ Embodiment 6 (on Top of Embodiment 2)

Specification of INTRA_ANGULAR2 ... INTRA_ANGULAR66 Intra Prediction Modes
  Inputs to this process are:
  the intra prediction mode predModeIntra,
  a variable nTbW specifying the transform block width,
  a variable nTbH specifying the transform block height,
  a variable refW specifying the reference samples width,
  a variable refH specifying the reference samples height,
  the predicted samples predSamples[x][y], with x=0 ... nTbW−1, y=0 ... nTbH−1,
  the neighbouring samples p[x][y] with x=−1, y=−1 and x=0 ... refW−1, y=−1.
  Outputs of this process are the modified predicted samples predSamples[x][y] with x=0 ... nTbW−1, y=0 ... nTbH−1.
  The variable nScale is derived as follows:
    If predModeIntra is equal to INTRA_PLANAR, INTRA_DC, INTRA_ANGULAR18, or INTRA_ANGULAR50, nScale is set to ((Log 2(nTbW)+Log 2(nTbH)−2)>>2).
    Otherwise, nScale is set equal to Min(2, Log 2(predModeIntra>INTRA_ANGULAR50?refH−nTbH:refW−nTbW)−Floor(Log 2(3*invAngle−2))+8), using invAngle as specified in clause 8.4.5.2.12. If the value of nScale is less than 0, process 8.4.5.2.14 is terminated and outputs of this process are set equal to the input predicted samples predSamples[x][y], with x=0 ... nTbW−1, y=0 ... nTbH−1.
  The reference sample arrays mainRef[x] and sideRef[y], with x=0 ... refW−1 and y=0 ... refH−1 are derived as follows:

$mainRef[x]=p[x][-1]$ $sideRef[y]=p[-1][y]$

The variables refL[x][y], refT[x][y], wT[y], and wL[x] with x=0 ... nTbW−1, y=0 ... nTbH−1 are derived as follows:
    If predModeIntra is equal to INTRA_PLANAR or INTRA_DC, the following applies:

$refL[x][y]=p[-1][y]$ $refT[x][y]=p[x][-1]$ $wT[y]=32>>((y<<1)>>nScale)$ $wL[x]=32>>((x<<1)>>nScale)$ Otherwise, if predModeIntra is equal to INTRA_ANGULAR18 or INTRA_ANGULAR50, the following applies:

$refL[x][y]=p[-1][y]-p[-1][-1]+predSamples[x][y]$ $refT[x][y]=p[x][-1]-p[-1][-1]+predSamples[x][y]$ $wT[y]=(predModeIntra==INTRA\_ANGULAR18)?32>>((y<<1)>>nScale):0.$ $wL[x]=(predModeIntra==INTRA\_ANGULAR50)?32>>((x<<1)>>nScale):0$ Otherwise, if predModeIntra is less than INTRA_ANGULAR18, the following ordered operations apply:
    1. The variables dXInt[y] and dX[x][y] are derived as follows using invAngle as specified in clause 8.4.5.2.12 depending on intraPredMode:

$dXInt[y]=((y+1)*invAngle+256)>>9$ $dX[x][y]=x+dXInt[y]$

2. The variables refL[x][y], refT[x][y], wT[y], and wL[x] are derived as follows:

$refL[x][y]=0$ $refT[x][y]=(y<(3<<nScale)?mainRef[dX[x][y]]:0$ $wT[y]=32>>((y<<1)>>nScale)$ $wL[x]=0$ Otherwise, if predModeIntra is greater than INTRA_ANGULAR50, the following ordered operations apply:
    1. The variables dYInt[x] and dY[x][y] are derived as follows using invAngle as specified in clause 8.4.5.2.12 depending on intraPredMode:

$dYInt[x]=((x+1)*invAngle+256)>>9$ $dY[x][y]=y+dYInt[x]$

2. The variables refL[x][y], refT[x][y], wT[y], and wL[x] are derived as follows:

$refL[x][y]=(x<(3<<nScale)?sideRef[dY[x][y]]:0$ $refT[x][y]=0$ $wT[y]=0$ $wL[x]=32>>((x<<1)>>nScale).$ The values of the modified predicted samples predSamples[x][y], with x=0 ... nTbW−1, y=0 ... nTbH−1 are derived as follows:

$predSamples[x][y]=Clip1((refL[x][y]*wL[x]+refT[x][y]*wT[y]+(64−wL[x]−wT[y])*predSamples[x][y]+32)>>6).$ Embodiment 7 (on Top of Embodiment 3)

Specification of INTRA_ANGULAR2 ... INTRA_ANGULAR66 Intra Prediction Modes
  Inputs to this process are:
  the intra prediction mode predModeIntra,
  a variable nTbW specifying the transform block width,
  a variable nTbH specifying the transform block height,
  a variable refW specifying the reference samples width, a variable refH specifying the reference samples height, the predicted samples predSamples[x][y], with x=0 . . . nTbW−1, y=0 . . . nTbH−1, the neighbouring samples p[x][y] with x=−1, y=−1 and x=0 . . . refW−1, y=−1.

Outputs of this process are the modified predicted samples predSamples[x][y] with x=0 . . . nTbW−1, y=0 . . . nTbH−1.

The variable nScale is derived as follows:

If predModeIntra is equal to INTRA_PLANAR, INTRA_DC, INTRA_ANGULAR18, or INTRA_ANGULAR50, nScale is set to ((Log 2(nTbW)+Log 2(nTbH)−2)>>2).

Otherwise, nScale is set equal to Min(2, Log 2(nCbS)−Floor(Log 2(3*invAngle−2))+8), using nCbS equal to predModeIntra>INTRA_ANGULAR50? refH−nTbH: refW−nTbW and invAngle as specified in clause 8.4.5.2.12. If the value of nScale is less than 0, process 8.4.5.2.14 is terminated, and outputs of this process are set equal to the input predicted samples predSamples[x][y], with x=0 . . . nTbW−1, y=0 . . . nTbH−1.

The reference sample arrays mainRef[x] and sideRef[y], with x=0 . . . refW−1 and y=0 . . . refH−1 are derived as follows:

mainRef[x]=p[x][−1]

sideRef[y]=p[−1][y]

The variables refL[x][y], refT[x][y], wT[y], and wL[x] with x=0 . . . nTbW−1, y=0 . . . nTbH−1 are derived as follows:

If predModeIntra is equal to INTRA_PLANAR or INTRA_DC, the following applies:

refL[x][y]=p[−1][y]

refT[x][y]=p[x][−1]

wT[y]=32>>((y<<1)>>nScale)

wL[x]=32>>((x<<1)>>nScale)

Otherwise, if predModeIntra is equal to INTRA_ANGULAR18 or INTRA_ANGULAR50, the following applies:

refL[x][y]=p[−1][y]−p[−1][−1]+predSamples[x][y]

refT[x][y]=p[x][−1]−p[−1][−1]+predSamples[x][y]

wT[y]=(predModeIntra==INTRA_ANGULAR18)? 32>>((y<<1)>>nScale):0 wL[x]=(predModeIntra==INTRA_ANGULAR50)? 32>>((x<<1)>>nScale):0

Otherwise, if predModeIntra is less than INTRA_ANGULAR18, the following ordered operations apply:

1. The variables dXInt[y] and dX[x][y] are derived as follows using invAngle as specified in clause 8.4.5.2.12 depending on intraPredMode:

dXInt[y]=((y+1)*invAngle+256)>>9 dX[x][y]=x+dXInt[y]

2. The variables refL[x][y], refT[x][y], wT[y], and wL[x] are derived as follows:

refL[x][y]=0 refT[x][y]=(y<(3<<nScale)?mainRef[dX[x][y]]:0 wT[y]=32>>((y<<1)>>nScale)

wL[x]=0

Otherwise, if predModeIntra is greater than INTRA_ANGULAR50, the following ordered operations apply:

1. The variables dYInt[x] and dY[x][y] are derived as follows using invAngle as specified in clause 8.4.5.2.12 depending on intraPredMode:

dYInt[x]=((x+1)*invAngle+256)>>9 dY[x][y]=y+dYInt[x]

2. The variables refL[x][y], refT[x][y], wT[y], and wL[x] are derived as follows:

refL[x][y]=(x<(3<<nScale)?sideRef[dY[x][y]]:0 refT[x][y]=0 wT[y]=0 wL[x]=32>>((x<<1)>>nScale).

The values of the modified predicted samples predSamples[x][y], with x=0 . . . nTbW−1, y=0 . . . nTbH−1 are derived as follows:

predSamples[x][y]=Clip1((refL[x][y]*wL[x]+refT[x][y]*wT[y]+(64−wL[x]−wT[y])*predSamples[x][y]+32)>>6).

Based on the disclosure provided above, the PDPC scaling parameter ("nScale") is determined by two values. One of these values is derived from the block size and the other one is derived from the value of the inverse intra prediction angle, wherein this angle is determined by intra prediction mode and block aspect ratio.

Embodiments of this disclosure are to calculate the value of the scaling parameter with respect to the intra subpartition mode.

The operations of an embodiment are as follows:

In operation 1, a size of side reference (refSide) is determined based on the intra prediction mode. Selection of the side of the block is done based on whether intra prediction mode is lower than a predetermined value. Particularly, this predetermined value could be equal to 34:

when an intra prediction mode is lower than 34, top side is used as a side reference;

otherwise, left side is used as side reference.

In operation 2, the first value (based on the size of the block) is calculated depending on the intra subpartition mode.

Figure 11:
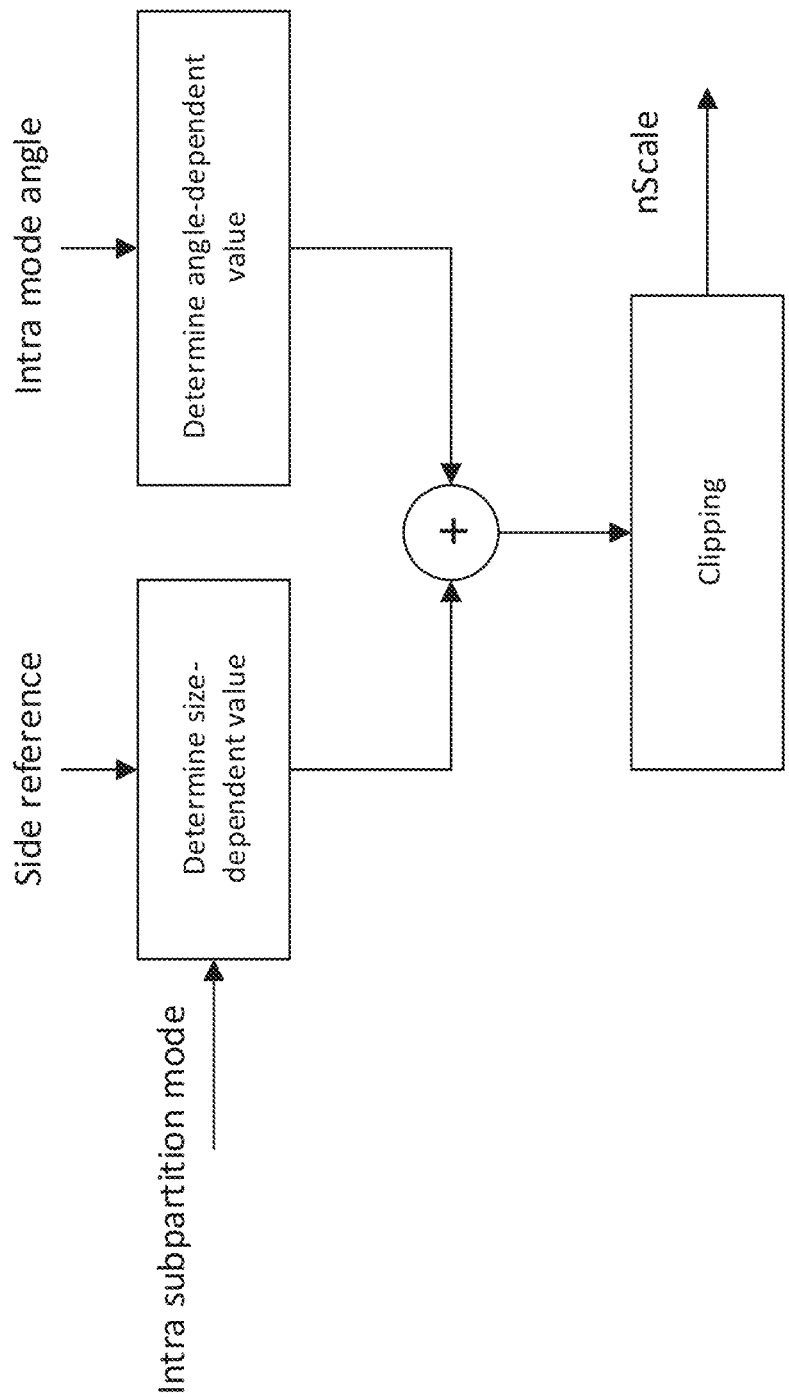
FIG. 11 is a block diagram showing an embodiment for deriving the nScale parameter.

The first value ("V1") could be derived as follows (see FIG. 11):

when a coding block (Cb) comprises a single transform block (Tb) having the same size with the coding block, the first value ("V1") is determined based on the reference side of the transform block (refSide=Log 2(nTbS));

otherwise, when a coding block (Cb) comprises several transform blocks (Tb), the first value ("V1") is determined based on the reference side of the coding block (refSide=Log 2(nCbS)).

Decision of whether a coding block (Cb) comprises a single transform block is verified using "Intra subpartition mode" variable, that is coded in the bitstream (e.g. by the means of intra subpartitions mode flag and intra subpartitions split flag syntax elements).

The Second Value is Derived as Follows:

V2=8−Floor(Log 2(3*invAngle−2))

Embodiment 8

In this embodiment, the final value of nScale is defined as follows:

$$n\text{Scale}=\min(2,V1+V2)$$

In the VVC specification, this embodiment corresponds to the following excerpt: The variable nScale is derived as follows:
- If predModeIntra is greater than INTRA_ANGULAR50, nScale is set equal to Min(2, Log 2(refH−nTbH)−Floor (Log 2(3*invAngle−2))+8), using invAngle as specified in clause 8.4.5.2.12.
- Otherwise, if predModeIntra is less than INTRA_ANGULAR18, not equal to INTRA_PLANAR and not equal to INTRA_DC, nScale is set equal to Min(2, Log 2(refW−nTbW)−Floor(Log 2(3*invAngle−2))+8), using invAngle as specified in clause 8.4.5.2.12.
- Otherwise, nScale is set to ((Log 2(nTbW)+Log 2(nTbH)−2)>>2).

Alternative excerpt of the specification (on the top of Embodiment 3) is as follows: The variable nScale is derived as follows:
- If predModeIntra is equal to INTRA_PLANAR, INTRA_DC, INTRA_ANGULAR18, or INTRA_ANGULAR50, nScale is set to ((Log 2(nTbW)+Log 2(nTbH)−2)>>2).
- Otherwise, nScale is set equal to Min(2, Log 2(nTbS)−Floor(Log 2(3*invAngle−2))+8), using nTbS equal to predModeIntra>INTRA_ANGULAR50? refH−nTbH: refW−nTbW and invAngle as specified in clause 8.4.5.2.12. If the value of nScale is less than 0, process 8.4.5.2.14 is terminated, and outputs of this process are set equal to the input predicted samples predSamples [x][y], with x=0 . . . nTbW−1, y=0 . . . nTbH−1.

Embodiment 9 (on Top of Embodiment 1)

In this embodiment, the final value of nScale is further clipped depending on whether intra subpartitioning is used.

In particular, when a block is a sub partition of a larger coding block, the following initial value of nScale is defined as:

$$n\text{Scale}=\min(2,\text{Log }2(nTbS)+V2).$$

The final value of nScale is calculated as:

$$n\text{Scale}=n\text{Scale}<0?\min(0,V1+V2):\min(2,V1+V2).$$

Figure 12:
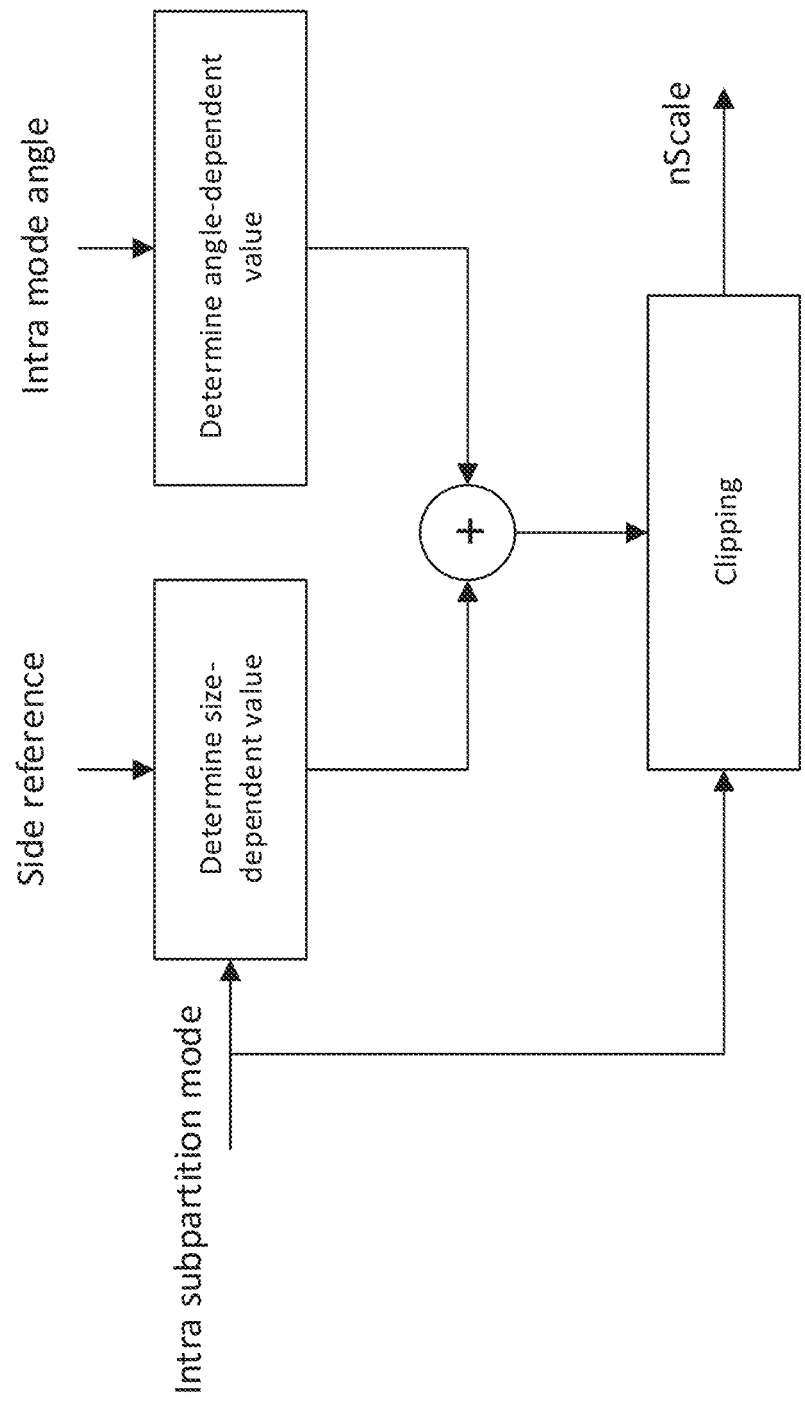
FIG. 12 is a block diagram showing another embodiment for deriving the nScale parameter.

FIG. 12 shows a flowchart for this embodiment. In this figure it is shown, that ISP flag is used to perform clipping of the obtained nScale parameter. This additional dependency of the clipping operation on ISP (as compared to the flowchart shown in FIG. 11) is represented by condition "nScale<0" given above.

In the VVC specification, this embodiment corresponds to the following excerpt: The variable nScale is derived as follows:
- If predModeIntra is greater than INTRA_ANGULAR50, nScale is set equal to Min(2, Log 2(nTbH)−Floor(Log 2(3*invAngle−2))+8), using invAngle as specified in clause 8.4.5.2.12. When refH!=2*nTbH, nScale is updated as follows:

$n\text{ScaleCb}=\text{Log }2(\text{refH}-nTbH)-\text{Floor(Log }2(3^*\text{invAngle}-2))+8n\text{Scale}=n\text{Scale}<0?\min(0, n\text{ScaleCb}):\min(2,n\text{ScaleCb})$

- Otherwise, if predModeIntra is less than INTRA_ANGULAR18, not equal to INTRA_PLANAR and not equal to INTRA_DC, nScale is set equal to Min(2, Log 2(nTbW)−Floor(Log 2(3*invAngle−2))+8), using invAngle as specified in clause 8.4.5.2.12. When refW!=2*nTbW, nScale is updated as follows:

$n\text{ScaleCb}=\text{Log }2(\text{refW}-nTbW)-\text{Floor(Log }2(3^*\text{invAngle}-2))+8n\text{Scale}=n\text{Scale}<0?\min(0, n\text{ScaleCb}):\min(2,n\text{ScaleCb})$

- Otherwise, nScale is set to ((Log 2(nTbW)+Log 2(nTbH)−2)>>2).

Alternative excerpt of the specification (on the top of Embodiment 3) is as follows: The variable nScale is derived as follows:
- If predModeIntra is equal to INTRA_PLANAR, INTRA_DC, INTRA_ANGULAR18, or INTRA_ANGULAR50, nScale is set to ((Log 2(nTbW)+Log 2(nTbH)−2)>>2).
- Otherwise, the following is performed:
  nTbS is set equal to predModeIntra>INTRA_ANGULAR50? refH−nTbH: refW−nTbW and nTbS0 equal to predModeIntra>INTRA_ANGULAR50? nTbH:nTbW
  - when nTbS==nTbS0, nScale is set equal to Min(2, Log 2(nTbS)−Floor(Log 2(3*invAngle−2))+8),
  - otherwise (nTbS!=nTbS0), the following is performed:
    a. nScaleCb=Log 2(nTbS)−Floor(Log 2(3*invAngle−2))+8
    b. nScale=Log 2(nTbS0)−Floor(Log 2(3*invAngle−2))+8
    c. nScale=nScale<0? min(0, nScaleCb):min(2, nScaleCb);
  wherein invAngle as specified in clause 8.4.5.2.12. If the value of nScale is less than 0, process 8.4.5.2.14 is terminated, and outputs of this process are set equal to the input predicted samples predSamples[x][y], with x=0 . . . nTbW−1, y=0 . . . nTbH−1.

Embodiment 10

In this embodiment, the final value of nScale is defined using comparison operation. In particular, when a block is a sub partition of a larger coding block, the following comparison operation is performed:

$$n\text{Scale}=V1<V2?-1:0.$$

In this embodiment, only two values of nScale parameter are available for the case when a block is a sub partition of a larger coding block. These values are −1 and 0.

Figure 13:
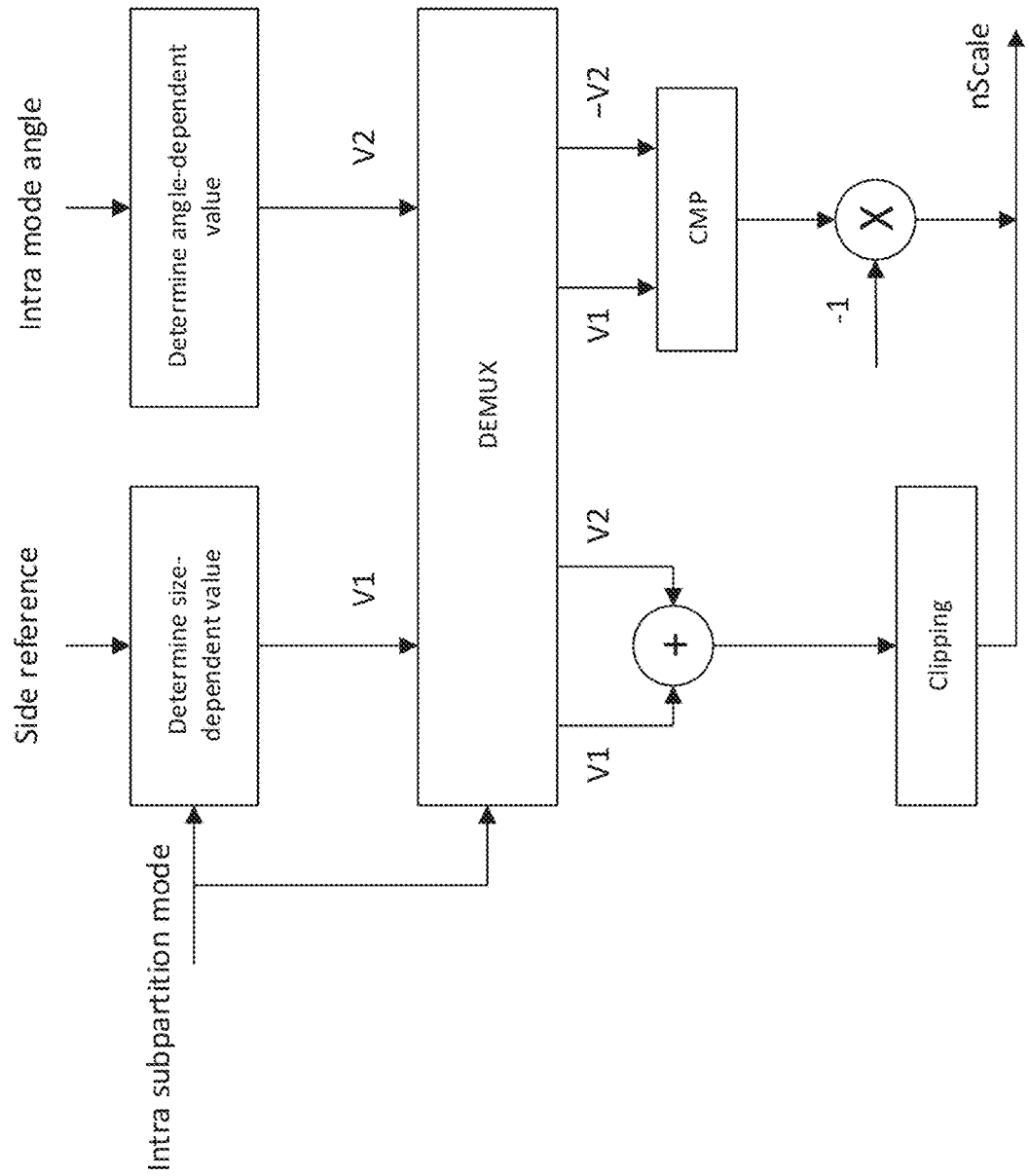
FIG. 13 is a block diagram showing an embodiment for deriving the nScale parameter.

FIG. 13 shows a flowchart for this embodiment. In this figure it is shown, that for the case of an intra subpartition, nScale parameter is obtained using comparison operation ("CMP"). The result of comparison is the nScale value is assigned to −1 or 0 value. For the non-ISP blocks, no modifications are introduced. Difference in processing in FIG. 13 is implemented using a demultiplexing operation ("DEMUX") that is controlled by the intra subpartition mode.

In the VVC specification, this embodiment corresponds to the following excerpt: The variable nScale is derived as follows:
- If predModeIntra is greater than INTRA_ANGULAR50, the following is performed:
  When refH!=2*nTbH, nScale is set equal to Log 2(refH−nTbH)<Floor(Log 2(3*invAngle−2))+8?−1: 0,
  Otherwise, nScale is set equal to Min(2, Log 2(nTbH)−Floor(Log 2(3*invAngle−2))+8), using invAngle as specified in clause 8.4.5.2.12.

Otherwise, if predModeIntra is less than INTRA_ANGULAR18, not equal to INTRA_PLANAR and not equal to INTRA_DC, the following is performed:

When refW!=2*nTbW, nScale is set equal to Log 2(refW−nTbW)<Floor(Log 2(3*invAngle−2))+8?−1:0, Otherwise, nScale is set equal to Min(2, Log 2(nTbW)−Floor(Log 2(3*invAngle−2))+8), using invAngle as specified in clause 8.4.5.2.12.

Otherwise, nScale is set to ((Log 2(nTbW)+Log 2(nTbH)−2)>>2).

Alternative excerpt of the specification (on the top of Embodiment 3) is as follows: The variable nScale is derived as follows:

If predModeIntra is equal to INTRA_PLANAR, INTRA_DC, INTRA_ANGULAR18, or INTRA_ANGULAR50, nScale is set equal to ((Log 2(nTbW)+Log 2(nTbH)−2)>>2).

Otherwise, the following is performed:

nTbS is set equal to predModeIntra>INTRA_ANGULAR50?refH−nTbH:refW−nTbW and nTbS0 equal to predModeIntra>INTRA_ANGULAR50?nTbH:nTbW if nTbS==nTbS0, nScale is set to Log 2(nTbS0)−Floor (Log 2(3*invAngle−2))+8

Otherwise, if Log 2(nTbS)<Floor(Log 2(3*invAngle−2))+8, nScale is set to −1,

Otherwise nScale is set to 0 using invAngle as specified in clause 8.4.5.2.12. If the value of nScale is less than 0, process 8.4.5.2.14 is terminated, and outputs of this process are set equal to the input predicted samples predSamples[x][y], with x=0 . . . nTbW−1, y=0 . . . nTbH−1.

Intra-prediction in VVC comprises several mechanisms that performs smoothing of the predicted signal. Position-dependent prediction combination (PDPC) that is also referenced to as "8.4.5.2.14 Position-dependent intra prediction sample filtering process" is applied after directional or non-directional (DC or PLANAR) intra prediction mode in order to apply non-linear smoothing filtering to samples that are close to the left or top side. The filtering that PDPC performs over predicted samples is recognized as smoothing (e.g. in [X. Xiu, Y.-W. Chen, H.-J. Jhu, T.-C. Ma, X. Wang, "AHG9: On signaling of PDPC enabling/disabling flag in SPS", JVET-S0136, 19th Meeting of Joint Video Experts Team (JVET) of ITU-T SG 16 WP 3 and ISO/IEC JTC 1/SC 29/WG 11]). It is also stated that this smoothing operation is not beneficial for computer-generated content (i.e., screen content). Hence, in prior art it was proposed to introduce a high-level syntax (HLS) flag (e.g., at SPS level) that controls whether PDPC is performed for intra predicted blocks or not.

In VVC, smoothing mechanisms could be disabled at block level when selecting prediction or partitioning parameters. Particularly, when ISP (intra sub-partitioning) is non-zero, or multi-reference line index is non-zero, PDPC is not performed for luminance component.

In this disclosure a signaling mechanism is proposed that is suitable for handling mixed content (both computer- and sensor-generated) using multi-level HLS flags. The core idea of the disclosure is to introduce level-dependent HLS signaling. For a syntax level (slice header, picture header, picture parameter set (PPS), sequence parameter set (SPS)), an indicator is signaled that specifies whether a smoothing mechanism is disabled completely for the slices referring to this syntax level or whether indication of smoothing mechanism' presence is performed on syntax levels that are lower that the syntax level comprising the indicator being signaled.

Distinctive feature of this disclosure is the alignment of operations to obtain intra prediction samples. In this disclosure, intra prediction samples are obtained by performing the same operations when disabling smoothing tools at block level (e.g., via ISP or MRL) and when disabling smoothing tools by HLS-flags. In accordance with the disclosure concept, if an intra prediction mechanism could not be disabled at block level (i.e. by a combination of values of syntax elements signaled for a predicted block), there would be no high-level syntax elements that disables or enables this smoothing mechanism. At some stage of video coding standard development it may be undesirable to introduce modifications to the low-level parts of codec design (and in particular, parts of the decoding process). Hence, only those HLS elements are introduced that may modify intra prediction generation in a way that no new low-level processing operations are introduced; newly introduced HLS elements just define what are the processing operations should be performed, but these processing operations should be the ones that existing low-level design is capable of to perform without its modification.

Embodiments of the proposed disclosure uses HLS flags that could be represented using terms of VVC specification draft. Semantics of these flags is as follows:

sps_pdpc_disabled_flag equal to 1 specifies that the position-dependent intra prediction process is disabled for the CLVS. sps_pdpc_disabled_flag equal to 0 specifies that the position-dependent intra prediction process may be enabled for the CLVS. When not present, the value of sps_pdpc_disabled_flag is inferred to be 0.

pps_pdpc_disabled_flag equal to 1 specifies that the position-dependent intra prediction process is disabled for pictures referring to the picture parameter set. pps_pdpc_disabled_flag equal to 0 specifies that the position-dependent intra prediction process may be enabled for pictures referring to the picture parameter set. When not present, the value of sps_pdpc_disabled_flag is inferred to be 0.

sps_pdpc_disabled_present_in_sh_flag equal to 1 specifies that the position-dependent intra prediction process is disabled or enabled for a slice depending on the value of sh_pdpc_disabled_flag specified for the slice header. sps_pdpc_disabled_present_in_sh_flag equal to 0 specifies that shp_dpc_disabled_flag is not signaled in slice header. When not present, the value of sps_pdpc_disabled_present_in_sh_flag is inferred to be 0.

pps_pdpc_disabled_present_in_sh_flag equal to 1 specifies that the position-dependent intra prediction process is disabled or enabled for a slice depending on the value of sh_pdpc_disabled_flag specified for the slice header. pps_pdpc_disabled_present_in_sh_flag equal to 0 specifies that shp_dpc_disabled_flag is not signaled in slice header. When not present, the value of pps_pdpc_disabled_present_in_sh_flag is inferred to be 0.

sps_pdpc_disabled_present_in_ph_flag equal to 1 specifies that the position-dependent intra prediction process is disabled or enabled for slices referring to a picture header depending on the value of ph_pdpc_disabled_flag specified for the picture header. sps_pdpc_disabled_present_in_ph_flag equal to 0 specifies that php_dpc_disabled_flag is not signaled in picture header. When not present, the value of sps_pdpc_disabled_present_in_ph_flag is inferred to be 0.

pps_pdpc_disabled_present_in_ph_flag equal to 1 specifies that the position-dependent intra prediction process is disabled or enabled for slices referring to a picture header depending on the value of ph_pdpc_disabled_flag specified for the picture header. pps_pdpc_disabled_present_in_ph_flag equal to 0 specifies that php_dpc_disabled_flag is not signaled in picture header. When not present, the value of pps_pdpc_disabled_present_in_ph_flag is inferred to be 0.

sh_pdpc_disabled_flag equal to 1 specifies that the position-dependent intra prediction process is disabled for the slice header. sh_pdpc_disabled_flag equal to 0 specifies that the position-dependent intra prediction process may be enabled for the slice header. When not present, the value of shp_dpc_disabled_flag is inferred to be 0, sps_pdpc_disabled_flag or pps_pdpc_disabled_flag.

ph_pdpc_disabled_flag equal to 1 specifies that the position-dependent intra prediction process is disabled for the picture header. php_dpc_disabled_flag equal to 0 specifies that the position-dependent intra prediction process may be enabled for the picture header. When not present, the value of php_dpc_disabled_flag is inferred to be 0, sps_pdpc_disabled_flag or pps_pdpc_disabled_flag.

The first embodiment provides the following combination of HLS-flags to enable or disable PDPC:

|  | Descriptor |
|---|---|
| seq_parameter_set_rbsp( ) { | |
| ... | |
|   sps_isp_enabled_flag | u(1) |
|   sps_mrl_enabled_flag | u(1) |
|   sps_mip_enabled_flag | u(1) |
|     sps_pdpc_disabled_flag | u(1) |
|   if (!sps_pdpc_disabled_flag) | |
|   { | |
|     sps_pdpc_disabled_present_in_ph_flag | u(1) |
|   } | |
| ... | |

|  | Descriptor |
|---|---|
| .... | |
| picture_header_structure( ) { | |
|   ph_gdr_or_irap_pic_flag | u(1) |
|   if( ph_gdr_or_irap_pic_flag ) | |
|     ph_gdr_pic_flag | u(1) |
|   ph_inter_slice_allowed_flag | u(1) |
|   if( ph_inter_slice_allowed_flag ) | |
|     ph_intra_slice_allowed_flag | u(1) |
|   ph_non_ref_pic_flag | u(1) |
|   ph_pic_parameter_set_id | ue(v) |
|   ph_pic_order_cnt_lsb | u(v) |
|   if( ph_gdr_or_irap_pic_flag ) | |
|     ph_no_output_of_prior_pics_flag | u(1) |
|   if( ph_gdr_pic_flag ) | |
|     ph_recovery_poc_cnt | ue(v) |
|   for( i = 0; i < NumExtraPhBits; i++ ) | |
|     ph_extra_bit[ i ] | u(1) |
|   if( sps_poc_msb_cycle_flag ) { | |
|     ph_poc_msb_cycle_present_flag | u(1) |
|     if( ph_poc_msb_cycle_present_flag ) | |
|       ph_poc_msb_cycle_val | u(v) |
|   } | |
|   if (sps_pdpc_disabled_present_in_ph_flag) | |
|   { | |
|     ph_pdpc_disabled_flag | u(1) |
|   } | |
| ... | |

Intra prediction process would comprise checking the values of corresponding high-level flags:

Inputs to this process are:
- a sample location (xTbCmp, yTbCmp) specifying the top-left sample of the current transform block relative to the top-left sample of the current picture,
- a variable predModeIntra specifying the intra prediction mode,
- a variable nTbW specifying the transform block width,
- a variable nTbH specifying the transform block height,
- a variable nCbW specifying the coding block width,
- a variable nCbH specifying the coding block height,
- a variable cIdx specifying the colour component of the current block.

Outputs of this process are the predicted samples predSamples[x][y], with x=0 . . . nTbW−1, y=0 . . . nTbH−1.

The variables refW and refH are derived as follows:
If IntraSubPartitionsSplitType is equal to ISP_NO_SPLIT or cIdx is not equal to 0, the following applies:

$$refW=nTbW*2 \quad (308)$$

$$refH=nTbH*2 \quad (309)$$

Otherwise (IntraSubPartitionsSplitType is not equal to ISP_NO_SPLIT and cIdx is equal to 0), the following applies:

$$refW=nCbW+nTbW \quad (310)$$

$$refH=nCbH+nTbH \quad (311)$$

The variable refIdx specifying the intra prediction reference line index is derived as follows:

$$refIdx=(cIdx==0?IntraLumaRefLineIdx[xTbCmp][yTbCmp]:0 \quad (312)$$

The wide angle intra prediction mode mapping process as specified in clause 8.4.5.2.6 is invoked with predModeIntra, nTbW, nTbH and cIdx as inputs, and the modified predModeIntra as output.

The variable refFilterFlag is derived as follows:
If predModeIntra is equal to 0, −14, −12, −10, −6, 2, 34, 66, 72, 76, 78, or 80, refFilterFlag is set equal to 1.
Otherwise, refFilterFlag is set equal to 0.

For the generation of the reference samples p[x][y] with x=−1−refIdx, y=−1−refIdx . . . refH−1 and x=−refIdx . . . refW−1, y=−1−refIdx, the following ordered operations apply:

1. The reference sample availability marking process as specified in clause 8.4.5.2.7 is invoked with the sample location (xTbCmp, yTbCmp), the intra prediction reference line index refIdx, the reference sample width refW, the reference sample height refH, the colour component index cIdx as inputs, and the reference samples refUnfilt[x][y] with x=−1−refIdx, y=−1−refIdx . . . refH−1 and x=−refIdx . . . refW−1, y=−1−refIdx as output.

2. When at least one sample refUnfilt[x][y] with x=−1−refIdx, y=−1−refIdx . . . refH−1 and x=−refIdx . . . refW−1, y=−1−refIdx is marked as "not available for intra prediction", the reference sample substitution process as specified in clause 8.4.5.2.8 is invoked with the intra prediction reference line index refIdx, the reference sample width refW, the reference sample height refH, the reference samples refUnfilt[x][y] with x=−1−refIdx, y=−1−refIdx . . . refH−1 and x=−refIdx . . . refW−1, y=−1−refIdx, and the colour component index cIdx as inputs, and the modified reference samples refUnfilt[x][y] with x=−1−refIdx, y=−1−refIdx . . . refH−1 and x=−refIdx . . . refW−1, y=−1−refIdx as output.

3. The reference sample filtering process as specified in clause 8.4.5.2.9 is invoked with the intra prediction reference line index refIdx, the transform block width nTbW and height nTbH, the reference sample width refW, the reference sample height refH, the reference filter flag refFilterFlag, the unfiltered samples refUnfilt[x][y] with x=−1−refIdx, y=−1−refIdx . . . refH−1 and x=−refIdx . . . refW−1, y=−1−refIdx, and the colour component index cIdx as inputs, and the reference samples p[x][y] with x=−1−refIdx, y=−1−refIdx . . . refH−1 and x=−refIdx . . . refW−1, y=−1−refIdx as output.

The intra sample prediction process according to predModeIntra applies as follows:

If predModeIntra is equal to INTRA_PLANAR, the corresponding intra prediction mode process specified in clause 8.4.5.2.10 is invoked with the transform block width nTbW, and the transform block height nTbH, and the reference sample array p as inputs, and the output is the predicted sample array predSamples.

Otherwise, if predModeIntra is equal to INTRA_DC, the corresponding intra prediction mode process specified in clause 8.4.5.2.11 is invoked with the transform block width nTbW, the transform block height nTbH, the intra prediction reference line index refIdx, and the reference sample array p as inputs, and the output is the predicted sample array predSamples.

Otherwise, if predModeIntra is equal to INTRA_LT_CCLM, INTRA_L_CCLM or INTRA_T_CCLM, the corresponding intra prediction mode process specified in clause 8.4.5.2.13 is invoked with the intra prediction mode predModeIntra, the sample location (xTbC, yTbC) set equal to (xTbCmp, yTbCmp), the transform block width nTbW and height nTbH, the colour component index cIdx, and the reference sample array p as inputs, and the output is the predicted sample array predSamples.

Otherwise, the corresponding intra prediction mode process specified in clause 8.4.5.2.12 is invoked with the intra prediction mode predModeIntra, the intra prediction reference line index refIdx, the transform block width nTbW, the transform block height nTbH, the reference sample width refW, the reference sample height refH, the coding block width nCbW and height nCbH, the reference filter flag refFilterFlag, the colour component index cIdx, and the reference sample array p as inputs, and the predicted sample array predSamples as outputs.

When all of the following conditions are true, the position-dependent prediction sample filtering process specified in clause 8.4.5.2.14 is invoked with the intra prediction mode predModeIntra, the transform block width nTbW, the transform block height nTbH, the predicted samples predSamples[x][y], with x=0 . . . nTbW−1, y=0 . . . nTbH−1, the reference sample width refW, the reference sample height refH, and the reference samples p[x][y], with x=−1, y=−1 . . . refH−1 and x=0 . . . refW−1, y=−1 as inputs, and the output is the modified predicted sample array predSamples:

sps_pdpc_disabled_flag is equal to 0 and ph_pdpc_disabled_flag is equal to 0
nTbW is greater than or equal to 4 and nTbH is greater than or equal to 4
refIdx is equal to 0 or cIdx is not equal to 0
BdpcmFlag[xTbCmp][yTbCmp][cIdx] is equal to 0
One of the following conditions is true:
predModeIntra is equal to INTRA_PLANAR
predModeIntra is equal to INTRA_DC
predModeIntra is less than or equal to INTRA_ANGULAR18
predModeIntra is greater than or equal to INTRA_ANGULAR50 and less than INTRA_LT_CCLM Alternatively, instead of condition "sps_pdpc_disabled_flag is equal to 0 and ph_pdpc_disabled_flag is equal to 0" an embodiment may use the following one: "ph_pdpc_disabled_flag is equal to 0".

In this case, semantics of ph_pdpc_disabled_flag is defined to include the clause to handle the cases when ph_pdpc_disabled_flag is not signalled:

"when ph_pdpc_disabled_flag is not present it is inferred to be equal to sps_pdpc_disabled_flag."

This and further disclosed embodiments may control PDPC being disabled or enabled just for luminance component:

When all of the following conditions are true, the position-dependent prediction sample filtering process specified in clause 8.4.5.2.14 is invoked with the intra prediction mode predModeIntra, the transform block width nTbW, the transform block height nTbH, the predicted samples predSamples[x][y], with x=0 . . . nTbW−1, y=0 . . . nTbH−1, the reference sample width refW, the reference sample height refH, and the reference samples p[x][y], with x=−1, y=−1 and x=0 . . . refW−1, y=−1 as inputs, and the output is the modified predicted sample array predSamples:

(HLS_CONDITION) or cIdx is not equal to 0
nTbW is greater than or equal to 4 and nTbH is greater than or equal to 4
refIdx is equal to 0 or cIdx is not equal to 0
BdpcmFlag[xTbCmp][yTbCmp][cIdx] is equal to 0
One of the following conditions is true:
predModeIntra is equal to INTRA_PLANAR
predModeIntra is equal to INTRA_DC
predModeIntra is less than or equal to INTRA_ANGULAR18
predModeIntra is greater than or equal to INTRA_ANGULAR50 and less than INTRA_LT_CCLM In this embodiment "HLS_CONDITION" could be defined as in Embodiment 1 ("sps_pdpc_disabled_flag is equal to 0 and ph_pdpc_disabled_flag is equal to 0") or use alternative combination of syntax elements check.

Alternatively, instead of condition "sps_pdpc_disabled_flag is equal to 0 and ph_pdpc_disabled_flag is equal to 0" an embodiment may use the following one: "ph_pdpc_disabled_flag is equal to 0".

In this case, semantics of ph_pdpc_disabled_flag is defined to include the clause to handle the cases when ph_pdpc_disabled_flag is not signalled:

"when ph_pdpc_disabled_flag is not present it is inferred to be equal to sps_pdpc_disabled_flag."

Additionally or alternatively, to picture header level signaling, slice-level indication may be used as follows:

| | Descriptor |
|---|---|
| seq_parameter_set_rbsp( ) { | |
| ... | |
| sps_isp_enabled_flag | u(1) |
| sps_mrl_enabled_flag | u(1) |
| sps_mip_enabled_flag | u(1) |
| sps_pdpc_disabled_flag | u(1) |
| if (!sps_pdpc_disabled_flag) | |
| { | |
| sps_pdpc_disabled_present_in_sh_flag | u(1) |
| } | |
| ... | |
| slice_header( ) { | |
| sh_picture_header_in_slice_header_flag | u(1) |
| if( sh_picture_header_in_slice_header_flag ) | |
| picture_header_structure( ) | |
| if( sps_subpic_info_present_flag ) | |

-continued

| | Descriptor |
|---|---|
| sh_subpic_id | u(v) |
| if( ( pps_rect_slice_flag && NumSlicesInSubpic[ CurrSubpicIdx ] > 1 ) | |
| \|\| | |
|   ( !pps_rect_slice_flag && NumTilesInPic > 1 ) ) | |
|   sh_slice_address | u(v) |
| for( i = 0; i < NumExtraShBits; i++ ) | |
|   sh_extra_bit[ i ] | u(1) |
| if( !pps_rect_slice_flag && NumTilesInPic − sh_slice_address > 1 ) | |
|   sh_num_tiles_in_slice_minus1 | ue(v) |
| if( ph_inter_slice_allowed_flag ) | |
|   sh_slice_type | ue(v) |
|   ... | |
| if(sps_pdpc_disabled_present_in_sh_flag) { | |
|   sh_pdpc_disabled_flag | u(1) |
| } | |
| ... | |

Another embodiment specifies signaling for enabling or disabling reference sample filtering.

VVC specification part for this embodiment is as follows:
The variable refFilterFlag is derived as follows:
If (predModeIntra is equal to 0, −14, −12, −10, −6, 2, 34, 66, 72, 76, 78, or 80) and not (REF_CONDITION), refFilterFlag is set equal to 1.
Otherwise, refFilterFlag is set equal to 0.

For the generation of the reference samples p[x][y] with x=−1−refIdx, y=−1−refIdx . . . refH−1 and x=−refIdx . . . refW−1, y=−1−refIdx, the following ordered operations apply:

1. The reference sample availability marking process as specified in clause 8.4.5.2.7 is invoked with the sample location (xTbCmp, yTbCmp), the intra prediction reference line index refIdx, the reference sample width refW, the reference sample height refH, the colour component index cIdx as inputs, and the reference samples refUnfilt[x][y] with x=−1−refIdx, y=−1−refIdx . . . refH−1 and x=−refIdx . . . refW−1, y=−1−refIdx as output.

2. When at least one sample refUnfilt[x][y] with x=−1−refIdx, y=−1−refIdx . . . refH−1 and x=−refIdx . . . refW−1, y=−1−refIdx is marked as "not available for intra prediction", the reference sample substitution process as specified in clause 8.4.5.2.8 is invoked with the intra prediction reference line index refIdx, the reference sample width refW, the reference sample height refH, the reference samples refUnfilt[x][y] with x=−1−refIdx, y=−1−refIdx . . . refH−1 and x=−refIdx . . . refW−1, y=−1−refIdx, and the colour component index cIdx as inputs, and the modified reference samples refUnfilt[x][y] with x=−1−refIdx, y=−1−refIdx . . . refH−1 and x=−refIdx . . . refW−1, y=−1−refIdx as output.

3. The reference sample filtering process as specified in clause 8.4.5.2.9 is invoked with the intra prediction reference line index refIdx, the transform block width nTbW and height nTbH, the reference sample width refW, the reference sample height refH, the reference filter flag refFilterFlag, the unfiltered samples refUnfilt[x][y] with x=−1−refIdx, y=−1−refIdx . . . refH−1 and x=−refIdx . . . refW−1, y=−1−refIdx, and the colour component index cIdx as inputs, and the reference samples p[x][y] with x=−1−refIdx, y=−1−refIdx . . . refH−1 and x=−refIdx . . . refW−1, y=−1−refIdx as output.

In this embodiment, placeholder "REF_CONDITION" is used. Instead of this placeholder the following checks or a combination of the following checks could be performed:
ref_filter_disable_flag is 1;
LEV_ref_filter_disable_flag is 1;
intra_smoothing_filter_disable_flag is 1;
LEV_intra_smoothing_filter_disable_flag is 1;
intra_smoothing_disable_flag is 1;
LEV_intra_smoothing_disable_flag is 1;
wherein LEV is "sps", or "pps", or "ph", or "sh" for SPS-, PPS-, picture header and slice headers, respectively.

Another embodiment specifies signaling for enabling or disabling smoothing interpolation filtering.

VVC specification part for this embodiment is as follows:
The variable filterFlag is derived as follows:
If one or more of the following conditions are true, filterFlag is set equal to 0:
refFilterFlag is equal to 1
refIdx is not equal to 0
IntraSubPartitionsSplitType is not equal to ISP_NO_SPLIT
(REF_CONDITION) is false
Otherwise, the following applies:
The variable minDistVerHor is set equal to Min(Abs (predModeIntra−50), Abs(predModeIntra−18)).
The variable intraHorVerDistThres[nTbS] is specified in a lookup table.
The variable filterFlag is derived as follows:
If minDistVerHor is greater than intraHorVerDistThres[nTbS], filterFlag is set equal to 1.
Otherwise, filterFlag is set equal to 0.
If cIdx is equal to 0, the following applies:
The interpolation filter coefficients fT[j] with j=0 . . . 3 are derived as follows:

$$fT[j]=\text{filterFlag}?fG[iFact][j]:fC[iFact][j] \qquad (339)$$

The value of the prediction samples predSamples[x][y] is derived as follows:

$$predSamples[x][y]=\text{Clip1}(((\Sigma_{i=0}^{3}fT[i]*\text{ref}[x+iIdx+i])+32)>>6) \qquad (340)$$

wherein "fG" are coefficients of smoothing filter and "fC" are coefficients of DCT-IF filter In this embodiment, placeholder "REF_CONDITION" is used. Instead of this placeholder the following checks or a combination of the following checks could be performed:
intra_smoothing_interpol_filter_disable_flag;
LEV_intra_smoothing_interpol_filter_disable_flag;
intra_smoothing_filter_disable_flag;
LEV_intra_smoothing_filter_disable_flag;
intra_smoothing_disable_flag;
LEV_intra_smoothing_disable_flag;
wherein LEV is "sps", or "pps", or "ph", or "sh" for SPS-, PPS-, picture header and slice headers, respectively.

Semantics of the flags is as follows:
LEV_intra_smoothing_disabled_flag equal to 1 specifies that non-smoothing intra interpolation filter is used (DCT IF) and reference sample filtering is not performed and PDPC is not performed for a block (or for the level indicated by "LEV_" prefix). LEV_intra_smoothing_disabled_flag equal to 0 specifies that decision on reference sample filtering and selection of intra interpolation filter being smoothing or non-smoothing and decision of whether PDPC is performed is defined by the value of intra prediction mode. When not present, the value of LEV_intra_smoothing_disabled_flag is inferred to be 0.

When "LEV" is "ph" or "sh", the last clause "When not present, the value of LEV_intra_smoothing_disabled_flag is inferred to be 0" may be formulated as follows:

"When not present, the value of LEV_intra_smoothing_disabled_flag is inferred to be equal to sps_intra_smoothing_disabled_flag"

or

"When not present, the value of LEV_intra_smoothing_disabled_flag is inferred to be equal to pps_intra_smoothing_disabled_flag".

LEV_intra_smoothing_filter_disabled_flag equal to 1 specifies that non-smoothing intra interpolation filter is used (DCT IF) and reference sample filtering is not performed for a block (or for the level indicated by "LEV_" prefix). LEV_intra_smoothing_filter_disabled_flag equal to 0 specifies that decision on reference sample filtering and selection of intra interpolation filter being smoothing or non-smoothing is defined by the value of intra prediction mode. When not present, the value of LEV_intra_smoothing_filter_disabled_flag is inferred to be 0.

When "LEV" is "ph" or "sh", the last clause "When not present, the value of LEV_intra_smoothing_filter_disabled_flag is inferred to be 0" may be formulated as follows:

"When not present, the value of LEV_intra_smoothing_filter_disabled_flag is inferred to be equal to sps_intra_smoothing_filter_disabled_flag"

or

"When not present, the value of LEV_intra_smoothing_filter_disabled_flag is inferred to be equal to pps_intra_smoothing_filter_disabled_flag".

LEV_intra_smoothing_interpol_filter_disabled_flag equal to 1 specifies that non-smoothing intra interpolation filter is used (DCT IF) for a block (or for the level indicated by "LEV_" prefix). LEV_intra_smoothing_interpol_filter_disabled_flag equal to 0 specifies that selection of intra interpolation filter being smoothing or non-smoothing is defined by the value of intra prediction mode. When not present, the value of LEV_intra_smoothing_interpol_filter_disabled_flag is inferred to be 0.

When "LEV" is "ph" or "sh", the last clause "When not present, the value of LEV_intra_smoothing_interpol_filter_disabled_flag is inferred to be 0" may be formulated as follows:

"When not present, the value of LEV_intra_smoothing_interpol_filter_disabled_flag is inferred to be equal to sps_intra_smoothing_interpol_filter_disabled_flag"

or

"When not present, the value of LEV_intra_smoothing_interpol_filter_disabled_flag is inferred to be equal to pps_intra_smoothing_interpol_filter_disabled_flag".

LEV_intra_reference_filter_disabled_flag equal to 1 specifies that reference sample filtering is not performed for a block (or for the level indicated by "LEV_" prefix). LEV_intra_reference_filter_disabled_flag equal to 0 specifies that decision on reference sample filtering and selection of intra interpolation filter being smoothing or non-smoothing is defined by the value of intra prediction mode. When not present, the value of LEV_intra_reference_filter_disabled_flag is inferred to be 0.

When "LEV" is "ph" or "sh", the last clause "When not present, the value of LEV_intra_reference_filter_disabled_flag is inferred to be 0" may be formulated as follows:

"When not present, the value of LEV_intra_reference_filter_disabled_flag is inferred to be equal to sps_intra_reference_filter_disabled_flag"

or

"When not present, the value of LEV_intra_reference_filter_disabled_flag is inferred to be equal to pps_intra_reference_filter_disabled_flag"

LEV_pdpc_disabled_flag equal to 1 specifies that PDPC is not performed for a block (or for the level indicated by "LEV_" prefix). LEV_pdpc_disabled_flag equal to 0 specifies that decision on PDPC is defined by the value of intra prediction mode. When not present, the value of LEV_pdpc_disabled_flag is inferred to be 0.

When "LEV" is "ph" or "sh", the last clause "When not present, the value of LEV_pdpc_disabled_flag is inferred to be 0" may be formulated as follows:

"When not present, the value of LEV_pdpc_disabled_flag is inferred to be equal to sps_pdpc_disabled_flag"

or

"When not present, the value of LEV_pdpc_disabled_flag is inferred to be equal to pps_pdpc_disabled_flag"

pdpc_disabled_flag equal to 1 specifies that PDPC is not performed for a block. pdpc_disabled_flag equal to 0 specifies that decision on PDPC is defined by the value of intra prediction mode. When not present, the value of pdpc_disabled_flag is inferred to be equal to sps_pdpc_disabled_flag.

Alternatively, pdpc_disabled_flag may be specified as follows:

pdpc_disabled_flag equal to 1 specifies that PDPC is not performed for a block. pdpc_disabled_flag equal to 0 specifies that decision on PDPC is defined by the value of intra prediction mode. When not present, the value of pdpc_disabled_flag is inferred to be equal to pps_pdpc_disabled_flag.

For all of the above-described syntax elements corresponding presence flags are defined. The part preceeding the "flag" suffix is appended by "_present_in_sh_flag" suffix or by "_present_in_ph_flag" suffix indicating whether corresponding above-disclosed "disabled_flag" syntax element is present in a slice header or a picture header, correspondingly. If a presence flag is not present it is inferred to 0.

sps_pdpc_disabled_present_in_sh_flag equal to 1 specifies that sh_pdpc_disabled is signalled in slice header. sps_pdpc_disabled_present_in_sh_flag equal to 0 specifies that sh_pdpc_disabled is not signalled in slice header. When sps_pdpc_disabled_present_in_sh_flag is not present it is inferred to 0.

sps_pdpc_disabled_present_in_ph_flag equal to 1 specifies that sh_pdpc_disabled is signalled in slice header. sps_pdpc_disabled_present_in_ph_flag equal to 0 specifies that sh_pdpc_disabled is not signalled in slice header. When sps_pdpc_disabled_present_in_ph_flag is not present it is inferred to 0.

Another embodiment comprise an HLS syntax for indication of whether a combination of intra smoothing methods is enabled or disabled:

|  | Descriptor |
|---|---|
| seq_parameter_set_rbsp( ) { | |
| ... | |
| sps_isp_enabled_flag | u(1) |
| sps_mrl_enabled_flag | u(1) |
| sps_mip_enabled_flag | u(1) |
| sps_intra_smoothing_disabled_flag | u(1) |
| if (!sps_intra_smoothing_disabled_flag) | |
| { | |
| sps_intra_smoothing_disabled_present_in_ph_flag | u(1) |
| } | |
| ... | |

| | Descriptor |
|---|---|
| slice_header( ) { | |
|   sh_picture_header_in_slice_header_flag | u(1) |
|   if( sh_picture_header_in_slice_header_flag ) | |
|     picture_header_structure( ) | |
|   if( sps_subpic_info_present_flag ) | |
|     sh_subpic_id | u(v) |
|   if( ( pps_rect_slice_flag && NumSlicesInSubpic[ CurrSubpicIdx ] > 1 ) | |
|   || | |
|     ( !pps_rect_slice_flag && NumTilesInPic > 1 ) ) | |
|     sh_slice_address | u(v) |
|   for( i = 0; i < NumExtraShBits; i++ ) | |
|     sh_extra_bit[ i ] | u(1) |
|   if( !pps_rect_slice_flag && NumTilesInPic − sh_slice_address > 1 ) | |
|     sh_num_tiles_in_slice_minus1 | ue(v) |
|   if( ph_inter_slice_allowed_flag ) | |
|     sh_slice_type | ue(v) |
|     ... | |
|   if(sps_intra_smoothing_disabled_present_in_sh_flag) { | |
|     sh_intra_smoothing_disabled_flag | u(1) |
|   } | |

Similar embodiment for PPS-level signaling is as follows:

| | Descriptor |
|---|---|
| pic_parameter_set_rbsp( ) { | |
|   ... | u(1) |
|   pps_intra_smoothing_disabled_flag | u(1) |
|   if (!pps_intra_smoothing_disabled_flag) | |
|   { | |
|     pps_intra_smoothing_disabled_present_in_ph_flag | u(1) |
|   } | |
|   ... | |

| | Descriptor |
|---|---|
| slice_header( ) { | |
|   sh_picture_header_in_slice_header_flag | u(1) |
|   if( sh_picture_header_in_slice_header_flag ) | |
|     picture_header_structure( ) | |
|   if( sps_subpic_info_present_flag ) | |
|     sh_subpic_id | u(v) |
|   if( ( pps_rect_slice_flag && NumSlicesInSubpic[ CurrSubpicIdx ] > 1 ) | |
|   || | |
|     ( !pps_rect_slice_flag && NumTilesInPic > 1 ) ) | |
|     sh_slice_address | u(v) |
|   for( i = 0; i < NumExtraShBits; i++ ) | |
|     sh_extra_bit[ i ] | u(1) |
|   if( !pps_rect_slice_flag && NumTilesInPic − sh_slice_address > 1 ) | |
|     sh_num_tiles_in_slice_minus1 | ue(v) |
|   if( ph_inter_slice_allowed_flag ) | |
|     sh_slice_type | ue(v) |
|     ... | |
|   if(pps_intra_smoothing_disabled_present_in_ph_flag) { | |
|     sh_intra_smoothing_disabled_flag | u(1) |
|   } | |

In another embodiment, a combination of flags is disclosed:

| | Descriptor |
|---|---|
| seq_parameter_set_rbsp( ) { | |
|   ... | |
|   sps_isp_enabled_flag | u(1) |
|   sps_mrl_enabled_flag | u(1) |
|   sps_mip_enabled_flag | u(1) |
|     sps_pdpc_disabled_flag | u(1) |
|   if (!sps_pdpc_disabled_flag) | |
|   { | |
|     sps_pdpc_disabled_present_in_sh_flag | u(1) |
|   } | |
|   ... | |
|   sps_intra_smoothing_filter_disabled_flag | u(1) |
|   if (!sps_intra_smoothing_filter_disabled_flag) | |
|   { | |
|     sps_intra_smoothing_filter_disabled_present_in_sh_flag | u(1) |
|   } | |

| | Descriptor |
|---|---|
| slice_header( ) { | |
|   sh_picture_header_in_slice_header_flag | u(1) |
|   if( sh_picture_header_in_slice_header_flag ) | |
|     picture_header_structure( ) | |
|   if( sps_subpic_info_present_flag ) | |
|     sh_subpic_id | u(v) |
|   if( ( pps_rect_slice_flag && NumSlicesInSubpic[ CurrSubpicIdx ] > 1 ) | |
|   || | |
|     ( !pps_rect_slice_flag && NumTilesInPic > 1 ) ) | |
|     sh_slice_address | u(v) |
|   for( i = 0; i < NumExtraShBits; i++ ) | |
|     sh_extra_bit[ i ] | u(1) |
|   if( !pps_rect_slice_flag && NumTilesInPic − sh_slice_address > 1 ) | |
|     sh_num_tiles_in_slice_minus1 | ue(v) |
|   if( ph_inter_slice_allowed_flag ) | |
|     sh_slice_type | ue(v) |
|     ... | |
|   if(sps_pdpc_disabled_present_in_sh_flag ) { | |
|     sh_pdpc_disabled_flag | u(1) |
|   } | |
|   ... | |
|   if(sps_intra_smoothing_filter_disabled_present_in_sh_flag) { | |
|     sh_intra_smoothing_filter_disabled_flag | u(1) |
|   } | |

In another embodiment, only SPS-level signaling may be used. For example, only SPS-level flag for reference sample filtering and smoothing interpolation filter determination may present in a bitstream syntax. The following description discloses this embodiment:

| | Descriptor |
|---|---|
| seq_parameter_set_rbsp( ) { | |
|   ... | |
|   sps_isp_enabled_flag | u(1) |
|   sps_mrl_enabled_flag | u(1) |
|   sps_mip_enabled_flag | u(1) |
|   ... | |
|   sps_intra_smoothing_filter_disabled_flag | u(1) |

Correspondingly, intra prediction processes would be specified as follows: The variable refFilterFlag is derived as follows:

If (predModeIntra is equal to 0, −14, −12, −10, −6, 2, 34, 66, 72, 76, 78, or 80) and sps_intra_smoothing_filter_disabled_flag is equal to 0, refFilterFlag is set equal to 1.

Otherwise, refFilterFlag is set equal to 0.

For the generation of the reference samples p[x][y] with x=−1−refIdx, y=−1−refIdx . . . refH−1 and x=−refIdx . . . refW−1, y=−1−refIdx, the following ordered operations apply:

4. The reference sample availability marking process as specified in clause 8.4.5.2.7 is invoked with the sample location (xTbCmp, yTbCmp), the intra prediction reference line index refIdx, the reference sample width refW, the reference sample height refH, the colour component index cIdx as inputs, and the reference samples refUnfilt[x][y] with x=−1−refIdx, y=−1−refIdx . . . refH−1 and x=−refIdx . . . refW−1, y=−1−refIdx as output.
5. When at least one sample refUnfilt[x][y] with x=−1−refIdx, y=−1−refIdx . . . refH−1 and x=−refIdx . . . refW−1, y=−1−refIdx is marked as "not available for intra prediction", the reference sample substitution process as specified in clause 8.4.5.2.8 is invoked with the intra prediction reference line index refIdx, the reference sample width refW, the reference sample height refH, the reference samples refUnfilt[x][y] with x=−1−refIdx, y=−1−refIdx . . . refH−1 and x=−refIdx . . . refW−1, y=−1−refIdx, and the colour component index cIdx as inputs, and the modified reference samples refUnfilt[x][y] with x=−1−refIdx, y=−1−refIdx . . . refH−1 and x=−refIdx . . . refW−1, y=−1−refIdx as output.
6. The reference sample filtering process as specified in clause 8.4.5.2.9 is invoked with the intra prediction reference line index refIdx, the transform block width nTbW and height nTbH, the reference sample width refW, the reference sample height refH, the reference filter flag refFilterFlag, the unfiltered samples refUnfilt[x][y] with x=−1−refIdx, y=−1−refIdx . . . refH−1 and x=−refIdx . . . refW−1, y=−1−refIdx, and the colour component index cIdx as inputs, and the reference samples p[x][y] with x=−1−refIdx, y=−1−refIdx . . . refH−1 and x=−refIdx . . . refW−1, y=−1−refIdx as output.

The variable filterFlag is derived as follows:
If one or more of the following conditions are true, filterFlag is set equal to 0:
refFilterFlag is equal to 1
refIdx is not equal to 0
IntraSubPartitionsSplitType is not equal to ISP_NO_SPLIT
sps_intra_smoothing_filter_disabled_flag is false
Otherwise, the following applies:
The variable minDistVerHor is set equal to Min(Abs(predModeIntra−50), Abs(predModeIntra−18)).
The variable intraHorVerDistThres[nTbS] is specified in a lookup table.
The variable filterFlag is derived as follows:
If minDistVerHor is greater than intraHorVerDistThres[nTbS], filterFlag is set equal to 1.
Otherwise, filterFlag is set equal to 0.
If cIdx is equal to 0, the following applies:
The interpolation filter coefficients fT[j] with j=0 . . . 3 are derived as follows:

$fT[j] = filterFlag ? fG[iFact][j] : fC[iFact][j]$ (339)

The value of the prediction samples predSamples[x][y] is derived as follows:

$predSamples[x][y] = Clip1(((\Sigma_{i=0}^{3} fT[i] * ref[x+iIdx+i]) + 32) >> 6)$ (340)

wherein "fG" are coefficients of smoothing filter and "fC" are coefficients of DCT-IF filter It is understood that in above-disclosed embodiment of single-level (SPS-level), two separate flags (i.e. sps_intra_reference_filter_disabled_flag and sps_intra_smoothing_interpol_filter_disabled_flag) may be used for switching reference sample filter and intra interpolation filter independently.

An alternative embodiment disclosed below uses only SPS-level flag for disabling PDPC, reference sample filtering and smoothing interpolation filter. The following description discloses this embodiment:

| | Descriptor |
|---|---|
| seq_parameter_set_rbsp( ) { | |
| ... | |
| sps_isp_enabled_flag | u(1) |
| sps_mrl_enabled_flag | u(1) |
| sps_mip_enabled_flag | u(1) |
| ... | |
| sps_intra_smoothing_disabled_flag | u(1) |

The variable refFilterFlag is derived as follows:
If (predModeIntra is equal to 0, −14, −12, −10, −6, 2, 34, 66, 72, 76, 78, or 80) and sps_intra_smoothing_disabled_flag is equal to 0, refFilterFlag is set equal to 1.
Otherwise, refFilterFlag is set equal to 0.
Correspondingly, intra prediction processes would be specified as follows:
For the generation of the reference samples p[x][y] with x=−1−refIdx, y=−1−refIdx . . . refH−1 and x=−refIdx . . . refW−1, y=−1−refIdx, the following ordered operations apply:

7. The reference sample availability marking process as specified in clause 8.4.5.2.7 is invoked with the sample location (xTbCmp, yTbCmp), the intra prediction reference line index refIdx, the reference sample width refW, the reference sample height refH, the colour component index cIdx as inputs, and the reference samples refUnfilt[x][y] with x=−1−refIdx, y=−1−refIdx . . . refH−1 and x=−refIdx . . . refW−1, y=−1−refIdx as output.
8. When at least one sample refUnfilt[x][y] with x=−1−refIdx, y=−1−refIdx . . . refH−1 and x=−refIdx . . . refW−1, y=−1−refIdx is marked as "not available for intra prediction", the reference sample substitution process as specified in clause 8.4.5.2.8 is invoked with the intra prediction reference line index refIdx, the reference sample width refW, the reference sample height refH, the reference samples refUnfilt[x][y] with x=−1−refIdx, y=−1−refIdx . . . refH−1 and x=−refIdx . . . refW−1, y=−1−refIdx, and the colour component index cIdx as inputs, and the modified reference samples refUnfilt[x][y] with x=−1−refIdx, y=−1−refIdx . . . refH−1 and x=−refIdx . . . refW−1, y=−1−refIdx as output.
9. The reference sample filtering process as specified in clause 8.4.5.2.9 is invoked with the intra prediction reference line index refIdx, the transform block width nTbW and height nTbH, the reference sample width refW, the reference sample height refH, the reference filter flag refFilterFlag, the unfiltered samples refUnfilt[x][y] with x=−1−refIdx, y=−1−refIdx . . . refH−1 and x=−refIdx . . . refW−1, y=−1−refIdx, and the colour component index cIdx as inputs, and the reference samples p[x][y] with x=−1−refIdx, y=−1−refIdx . . . refH−1 and x=−refIdx . . . refW−1, y=−1−refIdx as output.

The variable filterFlag is derived as follows:
If one or more of the following conditions are true, filterFlag is set equal to 0:
refFilterFlag is equal to 1
refIdx is not equal to 0
IntraSubPartitionsSplitType is not equal to ISP_NO_SPLIT
sps_intra_smoothing_disabled_flag is false
Otherwise, the following applies:
The variable minDistVerHor is set equal to Min(Abs(predModeIntra−50), Abs(predModeIntra−18)).
The variable intraHorVerDistThres[nTbS] is specified in a lookup table.
The variable filterFlag is derived as follows:
If minDistVerHor is greater than intraHorVerDistThres[nTbS], filterFlag is set equal to 1.
Otherwise, filterFlag is set equal to 0.
If cIdx is equal to 0, the following applies:
The interpolation filter coefficients fT[j] with j=0 . . . 3 are derived as follows:

$$fT[j] = \text{filterFlag} ? fG[iFact][j] : fC[iFact][j] \quad (339)$$

The value of the prediction samples predSamples[x][y] is derived as follows:

$$predSamples[x][y] = \text{Clip1}(((\Sigma_{i=0}^{3} fT[i]*\text{ref}[x+iIdx+i]) + 32) >> 6) \quad (340)$$

wherein "fG" are coefficients of smoothing filter and "fC" are coefficients of DCT-IF filter When all of the following conditions are true, the position-dependent prediction sample filtering process specified in clause 8.4.5.2.14 is invoked with the intra prediction mode predModeIntra, the transform block width nTbW, the transform block height nTbH, the predicted samples predSamples[x][y], with x=0 . . . nTbW−1, y=0 . . . nTbH−1, the reference sample width refW, the reference sample height refH, and the reference samples p[x][y], with x=−1, y=−1 and x=0 . . . refW−1, y=−1 as inputs, and the output is the modified predicted sample array predSamples:
sps_intra_smoothing_disabled_flag is false
nTbW is greater than or equal to 4 and nTbH is greater than or equal to 4
refIdx is equal to 0 or cIdx is not equal to 0
BdpcmFlag[xTbCmp][yTbCmp][cIdx] is equal to 0
One of the following conditions is true:
predModeIntra is equal to INTRA_PLANAR
predModeIntra is equal to INTRA_DC
predModeIntra is less than or equal to INTRA_ANGULAR18
predModeIntra is greater than or equal to INTRA_ANGULAR50 and less than INTRA_LT_CCLM It is understood that in above-disclosed embodiment of single-level (SPS-level), several separate flags (e.g. sps_intra_reference_filter_disabled_flag, sps_pdpc_disabled_flag and sps_intra_smoothing_interpol_filter_disabled_flag) may be used for switching reference sample filter and intra interpolation filter independently.

It is observed that disabling PDPC of 444 content has more coding gain and visual benefits as compared to 420 content. Therefore, an alternative embodiment, SPS-level signaling may present for both 444 content and 422 content, but not for 420 content.

All the above-described embodiments may be applied in condition that chroma format of the source picture is not YUV420.

This could be performed as follows:

For convenience of notation and terminology in this Specification, the variables and terms associated with these arrays are referred to as luma (or L or Y) and chroma, where the two chroma arrays are referred to as Cb and Cr; regardless of the actual colour representation method in use. The actual colour representation method in use can be indicated in syntax that is specified in VUI parameters as specified in ITU-T H.SEI|ISO/IEC 23002-7.

The variables SubWidthC and SubHeightC are specified in the table below, depending on the chroma format sampling structure, which is specified through sps_chroma_format_idc and sps_separate_colour_plane_flag. Other values of sps_chroma_format_idc, SubWidthC and SubHeightC may be specified in the future by ITU-T ISO/IEC.

Correspondingly, intra prediction processes would be specified as follows:
Correspondingly, intra prediction processes would be specified as follows:
Correspondingly, intra prediction processes would be specified as follows:

TABLE

SubWidthC and SubHeightC values derived from sps_chroma_format_idc and sps_separate_colour_plane_flag

| sps_chroma_format_idc | sps_separate_colour_plane_flag | Chroma format | SubWidthC | SubHeightC |
| --- | --- | --- | --- | --- |
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

In monochrome sampling there is only one sample array, which is nominally considered the luma array.

In 4:2:0 sampling, each of the two chroma arrays has half the height and half the width of the luma array.

In 4:2:2 sampling, each of the two chroma arrays has the same height and half the width of the luma array.

| | Descriptor |
| --- | --- |
| seq_parameter_set_rbsp( ) { | |
| ... | |
| sps_chroma_format_idc | u(2) |
| ... | |
| sps_isp_enabled_flag | u(1) |
| sps_mrl_enabled_flag | u(1) |
| sps_mip_enabled_flag | u(1) |
| if (sps_chroma_format_idc != 1) | |
| { | |
| sps_N_flag | u(1) |

| | Descriptor |
|---|---|
| if (!sps_N_flag) { | |
|   sps_N_present_in_ph_flag | u(1) |
| } | |
| } | |
| ... | |

A similar check may be introduced for the PPS level:

| | Descriptor |
|---|---|
| pic_parameter_set_rbsp( ) { | |
| ... | u(1) |
| if (sps_chroma_format_idc != 1) { | |
|   pps_N_flag | u(1) |
|   if (!pps_N_flag) { | |
|     pps_N_present_in_ph_flag | u(1) |
|   } | |
| } | |
| } | |
| ... | |

In the above-disclosed syntax, "_N_" element is one of the following:
"_pdpc_disabled_"; or
"_intra_smoothing_filter_disabled_"; or
"_intra_smoothing_disabled_"; or
"_intra_smoothing_interpol_filter_disabled"; or
"_intra_reference_filter_disabled_".

It is understood, that in previous embodiments SPS-level HLS syntax may be also specified at the PPS level.

It is understood, that in previous embodiments HLS syntax may be similarly specified for picture header and slice header. However, indication at slice header level is suggested to be more appropriate for coding video content of mixed type, i.e. a still or a moving picture comprising spatial areas of sensor-generated content (e.g. natural video) and spatial areas of computer-generated content (e.g., screen content).

Additional constraints may be provided that restrict values of the HLS-flags. For example, the following description specifies the set of constraints for SPS-level flags of the previously disclosed embodiments.

General Constraint Information Syntax

Syntax may comprise the following constraints:

| | Descriptor |
|---|---|
| general_constraint_info( ) { | |
| ... | |
|   no_pdpc_constraint_flag | u(1) |
| ... | | or/and

| | Descriptor |
|---|---|
| general_constraint_info( ) { | |
| ... | |
|   no_intra_smoothing_filter_constraint_flag | u(1) |
| ... | | or/and

| | Descriptor |
|---|---|
| general_constraint_info( ) { | |
| ... | |
|   no_intra_smoothing_constraint_flag | u(1) |
| ... | | or/and

| | Descriptor |
|---|---|
| general_constraint_info( ) { | |
| ... | |
|   no_intra_smoothing_interpol_filter_constraint_flag | u(1) |
| ... | | or/and

| | Descriptor |
|---|---|
| general_constraint_info( ) { | |
| ... | |
|   no_intra_reference_filter_constraint_flag | u(1) |
| ... | |

Semantics of these flags is as follows:
no_pdpc_constraint_flag equal to 1 specifies that sps_pdpc_disabled_flag shall be equal to 1.
no_pdpc_constraint_flag equal to 0 does not impose such a constraint.
no_intra_smoothing_filter_constraint_flag equal to 1 specifies that sps_intra_smoothing_filter_disabled_flag shall be equal to 1.
no_intra_smoothing_filter_constraint_flag equal to 0 does not impose such a constraint.
no_intra_smoothing_constraint_flag equal to 1 specifies that sps_intra_smoothing_disabled_flag shall be equal to 1.
no_intra_smoothing_constraint_flag equal to 0 does not impose such a constraint.
no_intra_smoothing_interpol_filter_constraint_flag equal to 1 specifies that sps_intra_smoothing_interpol_filter_disabled_flag shall be equal to 1.
no_intra_smoothing_interpol_filter_constraint_flag equal to 0 does not impose such a constraint.
no_intra_reference_filter_constraint_flag equal to 1 specifies that sps_intra_reference_filter_disabled_flag shall be equal to 1.
no_intra_reference_filter_constraint_flag equal to 0 does not impose such a constraint.

These constraints provide possibility to identify the set of tools that is required to decode a bitstream. Typically, these parameters are signaled as a part of video parameter set (VPS) in order to specify the set of similar constraints for several bitstreams associated with this VPS.

Figure 14:
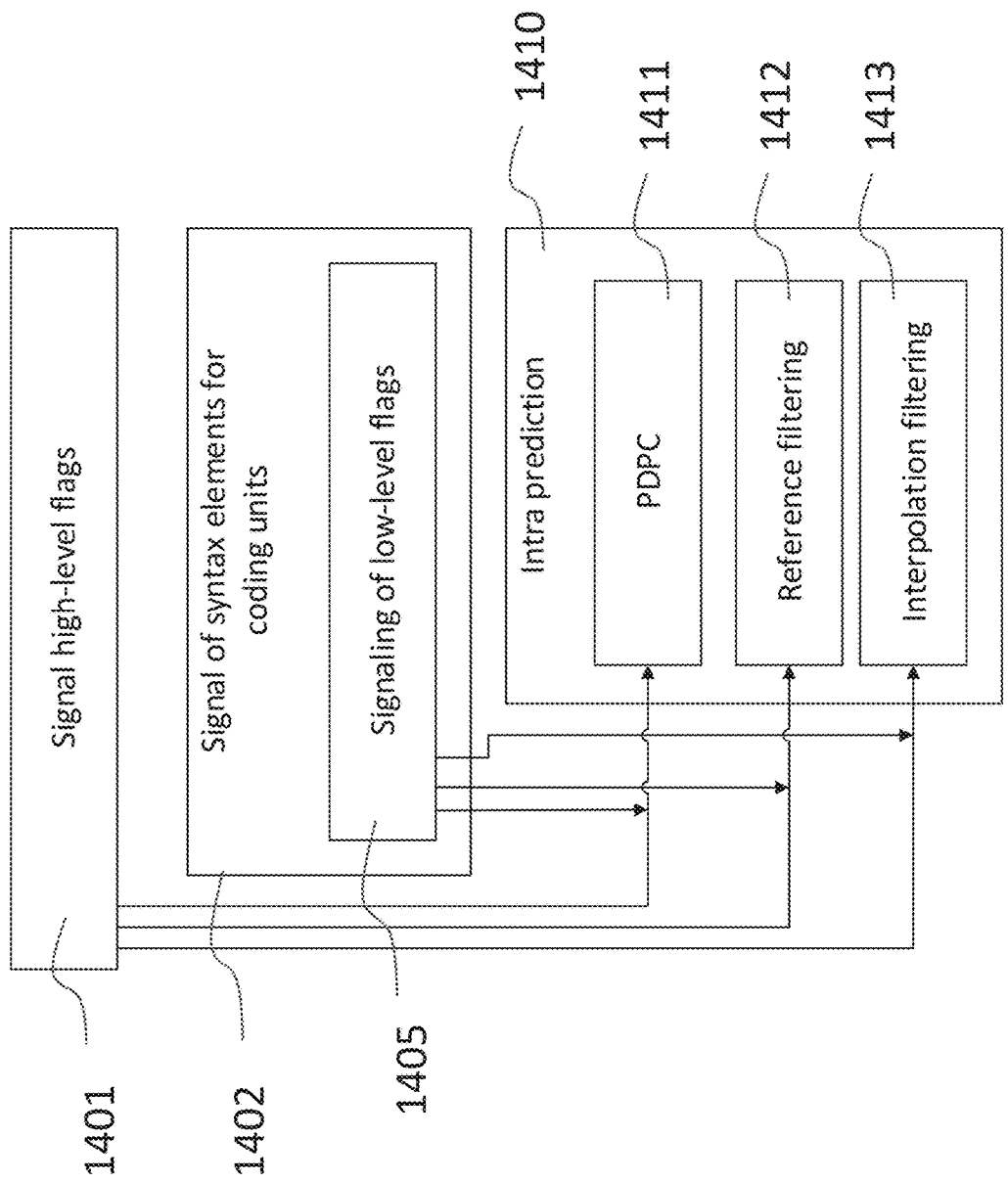
FIG. 14 illustrates a flowchart of a method according to an embodiment of the disclosure.

Operations of the present disclosure are shown in FIG. 14.

The first operation of signaling of HLS flags, operation 1401, may comprise the following parts:
signaling of a first set of high-level indicators that are signaled on slice-level or higher, wherein each of the high-level indicators determines signaling for an intra prediction smoothing mechanism which is enabled or disabled by an indicator of the set of low-level indicators; and
signaling of a second set of high-level indicators, wherein each of the high-level indicators belonging to the second set determines the presence of at least one of the corresponding high-level indicators of the first set, and wherein the values of corresponding high-level indicators of the first set are inferred to zero when the value signaled by high-level indicator of the second set is zero.

The second set of high-level indicators may comprise SPS, PPS and PH flags that are specified in the disclosed embodiments and that determine the presence of other ("first set") indicators.

The first set of high-level indicators may comprise SPS, PPS and PH and slice-level flags that are specified in the disclosed embodiments and that determine whether an intra prediction smoothing mechanism is enabled or disabled.

The second operation of the disclosure of FIG. 14, operation 1405, is signaling a set of low-level indicators for the predicted block, wherein each of the indicators of the set enables or disables an intra prediction smoothing mechanism for the predicted block. These low-level indicators (i.e. syntax elements) indicate whether a block is obtained by intra subpartitioning (ISP) or prediction signal is obtained from the columns or rows of neighboring samples that are not adjacent to the predicted block (MRL index is non-zero, or refIdx is non-zero).

Figure 15:
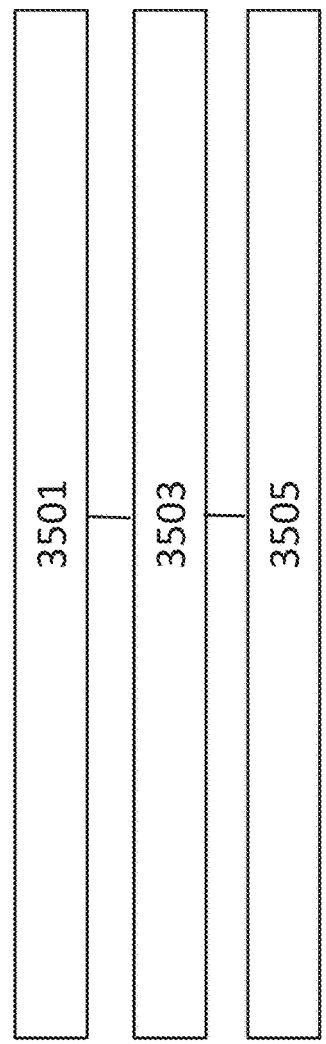
FIG. 15 illustrates a decoder according to a further embodiment of the present disclosure.

An intra prediction smoothing mechanism, operation 1410, may comprise a single item or a combination of the following items:

PDPC (1411);
reference sample filtering (1412);
smoothing interpolation filter (1413);

FIG. 15 illustrates a decoder 30 according to a further embodiment of the present disclosure.

The decoder 30 of FIG. 15 is an apparatus for decoding a video bitstream for high-level signaling with intra-prediction of a block, the apparatus 30 comprising: a first signaling unit 3501 configured to signal a set of low-level indicators for the predicted block, wherein each of the indicators of the set enables or disables an intra prediction smoothing mechanism for the predicted block; a second signaling unit 3503 configured to signal a first set of high-level indicators on a slice-level or a higher level, wherein each of the high-level indicators of the first set determines signaling for an intra prediction smoothing mechanism which is enabled or disabled by an indicator of the set of low-level indicators; and a third signaling unit 3505 configured to signal a second set of high-level indicators, wherein each of the high-level indicators of the second set determines the presence of at least one of the corresponding high-level indicators of the first set, and wherein the values of corresponding high-level indicators of the first set are inferred to be zero when the value signaled by high-level indicator of the second set is zero.

It should be understood that the first, second, and third signaling unit may be the same unit.

Figure 16:
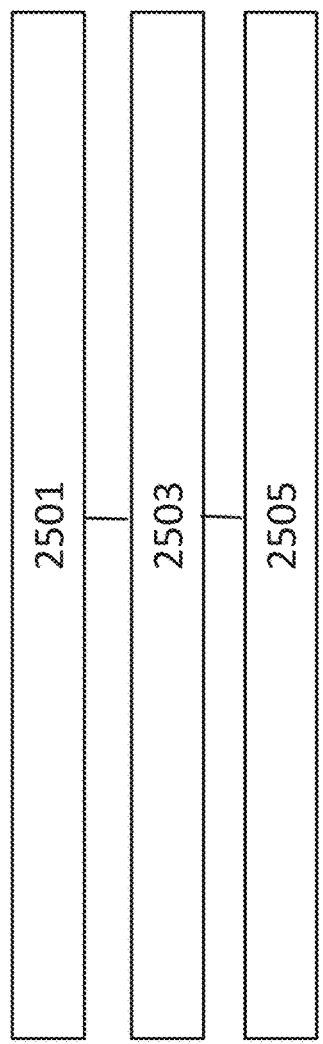
FIG. 16 illustrates an encoder according to a further embodiment of the present disclosure.

FIG. 16 illustrates an encoder 20 according to a further embodiment of the present disclosure. The encoder 20 of FIG. 16 is an apparatus for encoding a video bitstream for high-level signaling with intra-prediction of a block, the apparatus 20 comprising: a first signaling unit 2501 configured to signal a set of low-level indicators for the predicted block, wherein each of the indicators of the set enables or disables an intra prediction smoothing mechanism for the predicted block; a second signaling unit 2503 configured to signal a first set of high-level indicators on a slice-level or a higher level, wherein each of the high-level indicators of the first set determines signaling for an intra prediction smoothing mechanism which is enabled or disabled by an indicator of the set of low-level indicators; and a third signaling unit 2505 configured to signal a second set of high-level indicators, wherein each of the high-level indicators of the second set determines the presence of at least one of the corresponding high-level indicators of the first set, and wherein the values of corresponding high-level indicators of the first set are inferred to be zero when the value signaled by high-level indicator of the second set is zero.

It should be understood that the first, second, and third signaling unit may be the same unit.

The following provides an explanation of the applications of the encoding method as well as the decoding method as shown in the above-mentioned embodiments, and a system using them.

Figure 9:
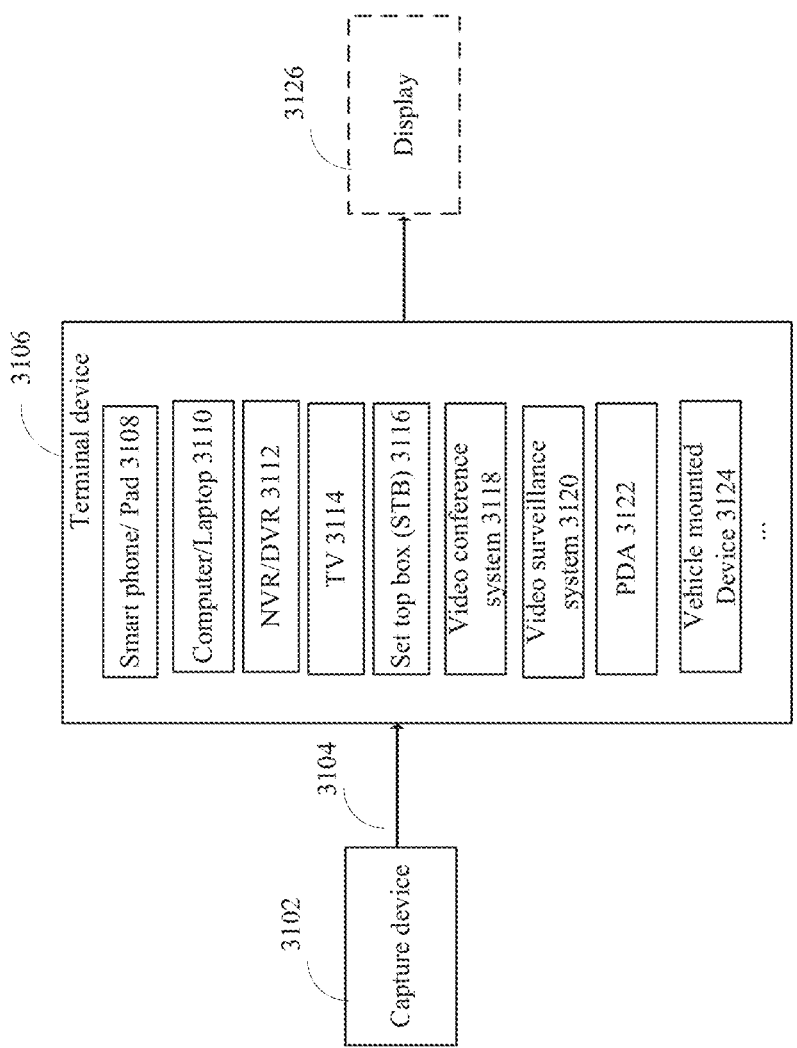
FIG. 9 is a block diagram showing an example structure of a content supply system 3100, which realizes a content delivery service.

FIG. 9 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

Figure 10:
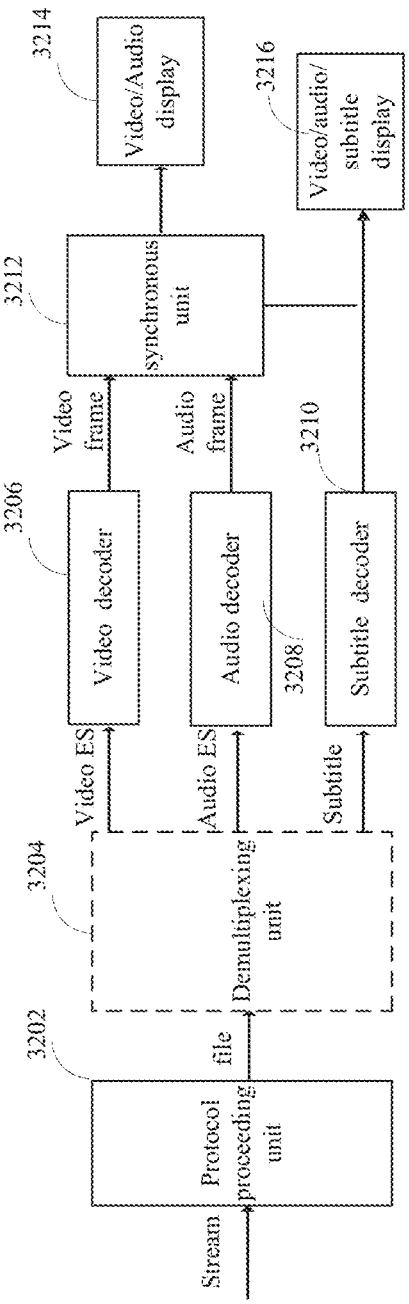
FIG. 10 is a block diagram showing a structure of an example of a terminal device.

When each device in this system performs encoding or decoding, the picture encoding device or the picture decoding device, as shown in the above-mentioned embodiments, can be used. FIG. 10 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above-mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 10) before feeding it to the synchronous unit 3212. Similarly, the audio frame may store in a buffer (not shown in FIG. 10) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present disclosure is not limited to the above-mentioned system, and either the picture encoding device or the picture decoding device in the above-mentioned embodiments can be incorporated into other system, for example, a car system.

Mathematical Operators

The mathematical operators used in this application are similar to those used in the C programming language. However, the results of integer division and arithmetic shift operations are defined more precisely, and additional operations are defined, such as exponentiation and real-valued division. Numbering and counting conventions generally begin from 0, e.g., "the first" is equivalent to the 0-th, "the second" is equivalent to the 1-th, etc.

Arithmetic Operators

The following arithmetic operators are defined as follows:
+ Addition
− Subtraction (as a two-argument operator) or negation (as a unary prefix operator)

Multiplication, including matrix multiplication $x^y$ Exponentiation. Specifies x to the power of y. In other contexts, such notation is used for superscripting not intended for interpretation as exponentiation.

/ Integer division with truncation of the result toward zero. For example, 7/4 and −7/−4 are truncated to 1 and −7/4 and 7/−4 are truncated to −1.

÷ Used to denote division in mathematical equations where no truncation or rounding is intended.

$$\frac{x}{y}$$

Used to denote division in mathematical equations where no truncation or rounding is intended.

$$\sum_{i=x}^{y} f(i)$$

The summation of f(i) with i taking all integer values from x up to and including y.

% y Modulus. Remainder of x divided by y, defined only for integers x and y with x>=0 and y>0.

Logical Operators

The following logical operators are defined as follows:
x && y Boolean logical "and" of x and y
x||y Boolean logical "or" of x and y
! Boolean logical "not"
x ? y: z If x is TRUE or not equal to 0, evaluates to the value of y; otherwise, evaluates to the value of z.

Relational Operators

The following arithmetic operators are defined as follows:
> Greater than
>= Greater than or equal to
< Less than
<= Less than or equal to
== Equal to
!= Not equal to When a relational operator is applied to a syntax element or variable that has been assigned the value "na" (not applicable), the value "na" is treated as a distinct value for the syntax element or variable. The value "na" is considered not to be equal to any other value.

Bit-Wise Operators

The following bit-wise operators are defined as follows:
& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^ A Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

Assignment Operators

The following arithmetic operators are defined as follows:

= Assignment operator

++ Increment, i.e., x++ is equivalent to x=x+1; when used in an array index, evaluates to the value of the variable prior to the increment operation.

−− Decrement, i.e., x−− is equivalent to x=x−1; when used in an array index, evaluates to the value of the variable prior to the decrement operation.

+= Increment by amount specified, i.e., x+=3 is equivalent to x=x+3, and x+=(−3) is equivalent to x=x+(−3).

−= Decrement by amount specified, i.e., x−=3 is equivalent to x=x−3, and x−=(−3) is equivalent to x=x−(−3).

Range Notation

The following notation is used to specify a range of values:

x=y . . . z x takes on integer values starting from y to z, inclusive, with x, y, and z being integer numbers and z being greater than y.

Mathematical Functions

The following mathematical functions are defined:

$$Abs(x) = \begin{cases} x; x >= 0 \\ -x; x < 0 \end{cases}$$

A sin(x) the trigonometric inverse sine function, operating on an argument x that is in the range of −1 to 1.0, inclusive, with an output value in the range of −π÷2 to π÷2, inclusive, in units of radians A tan(x) the trigonometric inverse tangent function, operating on an argument x, with an output value in the range of −π÷2 to π÷2, inclusive, in units of radians $$Atan2(y, x) = \begin{cases} Atan\left(\frac{y}{x}\right); x > 0 \\ Atan\left(\frac{y}{x}\right) + \pi; x < 0 \&\& y >= 0 \\ Atan\left(\frac{y}{x}\right) - \pi; x < 0 \&\& y < 0 \\ +\frac{\pi}{2}; x == 0 \&\& y >= 0 \\ -\frac{\pi}{2}; \text{otherwise} \end{cases}$$

Ceil(x) the smallest integer greater than or equal to x.

$$Clip1_Y(x) = Clip3(0, (1 \ll BitDepth_Y) - 1, x)$$

$$Clip1_C(x) = Clip3(0, (1 \ll BitDepth_C) - 1, x)$$

$$Clip3(x, y, z) = \begin{cases} x; z < x \\ y; z > y \\ z; \text{otherwise} \end{cases}$$

Cos(x) the trigonometric cosine function operating on an argument x in units of radians.

Floor(x) the largest integer less than or equal to x.

$$GetCurrMsb(a, b, c, d) = \begin{cases} c + d; b - a >= d/2 \\ c - d; a - b > d/2 \\ c; \text{otherwise} \end{cases}$$

Ln(x) the natural logarithm of x (the base-e logarithm, where e is the natural logarithm base constant 2.718 281 828 . . . ).

Log 2(x) the base-2 logarithm of x.

Log 10(x) the base-10 logarithm of x.

$$Min(x, y) = \begin{cases} x; x <= y \\ y; x > y \end{cases}$$

$$Max(x, y) = \begin{cases} x; x >= y \\ y; x < y \end{cases}$$

Round(x)=Sign(x)*Floor(Abs(x)+0.5)

$$Sign(x) = \begin{cases} 1; x > 0 \\ 0; x == 0 \\ -1; x < 0 \end{cases}$$

Sin(x) the trigonometric sine function operating on an argument x in units of radians Sqrt(x)=$\sqrt{x}$ Swap(x, y)=(y, x)

Tan(x) the trigonometric tangent function operating on an argument x in units of radians Order of Operation Precedence When an order of precedence in an expression is not indicated explicitly by use of parentheses, the following rules apply:

Operations of a higher precedence are evaluated before any operation of a lower precedence.

Operations of the same precedence are evaluated sequentially from left to right.

The table below specifies the precedence of operations from highest to lowest; a higher position in the table indicates a higher precedence.

For those operators that are also used in the C programming language, the order of precedence used in this Specification is the same as used in the C programming language.

TABLE

| Operation precedence from highest (at top of table) to lowest (at bottom of table) |
|---|
| operations (with operands x, y, and z) |
| "x++", "x− −" |
| "!x", "−x" (as a unary prefix operator) |
| $x^y$ |

TABLE-continued

Operation precedence from highest (at top of table) to lowest (at bottom of table)

operations (with operands x, y, and z)

"x∗y", "x/y", "x÷y", $"\frac{x}{y}"$, "x % y"

"x + y", "x − y" (as a two-argument operator), $$"\sum_{i=x}^{y} f(i)"$$

"x << y", "x >> y"
"x < y", "x <= y", "x > y", "x >= y"
"x == y", "x != y"
"x & y"
"x | y"
"x && y"
"x || y"
"x ? y : z"
"x . . . y"
"x = y", "x += y", "x −= y"

Text Description of Logical Operations

In the text, a statement of logical operations as would be described mathematically in the following form:

```
if( condition 0)
   statement 0
else if( condition 1 )
   statement 1
...
else /* informative remark on remaining condition */
   statement n
``` may be described in the following manner:
   . . . as follows/ . . . the following applies:
   If condition 0, statement 0
   Otherwise, if condition 1, statement 1
   . . .
   Otherwise (informative remark on remaining condition), statement n.

Each "If . . . Otherwise, if . . . Otherwise, . . . " statement in the text is introduced with " . . . as follows" or " . . . the following applies" immediately followed by "If . . . ". The last condition of the "If . . . Otherwise, if . . . Otherwise, . . . " is always an "Otherwise, . . . ". Interleaved "If . . . Otherwise, if . . . Otherwise, . . . " statements can be identified by matching " . . . as follows" or " . . . the following applies" with the ending "Otherwise, . . . ".

In the text, a statement of logical operations as would be described mathematically in the following form:

```
if( condition 0a && condition 0b)
   statement 0
else if( condition 1a || condition 1b)
   statement 1
else
   statement n
``` may be described in the following manner:
   . . . as follows/ . . . the following applies:
   If all of the following conditions are true, statement 0:
      condition 0a
      condition 0b
   Otherwise, if one or more of the following conditions are true, statement 1:
      condition 1a
      condition 1b
   . . .
   Otherwise, statement n In the text, a statement of logical operations as would be described mathematically in the following form:

```
if( condition 0)
   statement 0
if( condition 1 )
   statement 1
``` may be described in the following manner:
   When condition 0, statement 0
   When condition 1, statement 1.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory, or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. In addition, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. In addition, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The present disclosure provides the following further aspects.

1. An aspect of a method of high-level signaling for a video coding method with intra-prediction of a block, the method comprising: signaling a set of low-level indicators for the predicted block, wherein each of the indicators of the set enables or disables an intra prediction smoothing mechanism for the predicted block; a first set of high-level indicators that are signaled on slice-level or higher, wherein each of the high-level indicators determines signaling for an intra prediction smoothing mechanism which is enabled or disabled by an indicator of the set of low-level indicators; and a second set of high-level indicators, wherein each of the high-level indicators belonging to the second set determines the presence of at least one of the corresponding high-level indicators of the first set, and wherein the values of corresponding high-level indicators of the first set are inferred to zero when the value signaled by high-level indicator of the second set is zero.

2. A method of aspect 1, the method comprising any combination of intra prediction smoothing mechanisms: smoothing reference filter; smoothing interpolation filter; and position-dependent intra prediction sample filtering (as named in 8.4.5.2.14).

3. A method of any of the previous aspects, wherein a low-level or a high-level indicator enables or disables position-dependent intra prediction sample filtering just for luma samples of the block (and does not disable this filtering for at least one chroma component of the block).

4. A method of any of the previous aspects, wherein determining of the signaling for an intra prediction smoothing mechanism comprises: presence of the corresponding low-level indicators for the predicted block in dependence on the value of the high-level indicator; and inferring the value of low-level indicator to disable corresponding intra prediction smoothing mechanism for all the predicted blocks of the level of the high-level indicator, when the value signaled by high-level indicator is zero.

5. A method of any of the previous aspects, wherein determining of the signaling for an intra prediction smoothing mechanism comprises: inferring the value of low-level indicator to disable corresponding intra prediction smoothing mechanism for all the predicted blocks of the level of the high-level indicator, when the value signaled by high-level indicator is zero.

5A. A method of any of the previous aspects wherein the values of high-level indicators of both sets are inferred to 0 when chroma format of the coded picture is equal to YUV422.

6. An aspect of a method of coding implemented by a decoding device, comprising: Obtaining a first flag by parsing a video bitstream, wherein the first flag enables or disables an intra prediction smoothing mechanism for the predicted block; Performing the intra prediction smoothing mechanism for the predicted block on condition that the first flag does not disable the intra prediction smoothing mechanism for the predicted block.

6A. The method of aspect 6, wherein the value of first flag is inferred to 0 when chroma format of the coded picture is equal to YUV422.

7. The method of aspect 6, wherein the first flag is a SPS-level or PPS level flag, the performing the intra prediction smoothing mechanism for the predicted block on condition that the first flag does not disable the intra prediction smoothing mechanism for the predicted block comprising: obtaining a second flag by parsing a video bitstream on condition that the first flag does not disable the intra prediction smoothing mechanism for the predicted block, wherein the second flag determines the presence a third flag, wherein the third flag enables or disables an intra prediction smoothing mechanism for the predicted block and the third flag is at slice header level or picture header level; obtaining the third flag by parsing a video bitstream on condition that the second flag determines the third flag is present in the video bitstream; performing the intra prediction smoothing mechanism for the predicted block on condition that the third flag does not disable the intra prediction smoothing mechanism for the predicted block.

8. An aspect of an encoder comprising processing circuitry for carrying out the method according to any one of aspects 1 to 7.

9. An aspect of a computer program product comprising program code for performing the method according to any one of the preceding aspects when executed on a computer or a processor.

10. An aspect of a decoder, comprising: one or more processors; and a non-transitory computer-readable storage medium coupled to the processors and storing programming for execution by the processors, wherein the programming, when executed by the processors, configures the decoder to carry out the method according to any one of the preceding aspects.

11. An aspect of a non-transitory computer-readable medium carrying a program code which, when executed by a computer device, causes the computer device to perform the method of any one of the preceding aspects.

12. A non-transitory storage medium which includes an encoded bitstream decoded by an image decoding device, the bit stream being generated by dividing a frame of a video signal or an image signal into a plurality blocks, and including a plurality of syntax elements, wherein the plurality of syntax elements comprises a first flag, a second flag or a third flag according to any one of the preceding claims.

What is claimed is:

1. A method of high-level signaling for a video coding method with intra prediction of a block, the method comprising:
   signaling a set of low-level indicators for a predicted block, wherein each of the set of low-level indicators enables or disables an intra prediction smoothing mechanism for the predicted block;
   signaling a first set of high-level indicators on a slice-level or a higher level, wherein each of the first set of high-level indicators determines signaling for the intra prediction smoothing mechanism, which is enabled or disabled by one of the set of low-level indicators; and
   signaling a second set of high-level indicators, wherein each of the second set of high-level indicators determines presence of at least one of a corresponding high-level indicators of the first set of high-level indicators, and wherein values of the corresponding high-level indicators of the first set of high-level indicators are inferred to be zero when a value signaled by a high-level indicator of the second set of high-level indicators is zero, wherein the set of low-level indicators are at a lower syntax level lower than that of the first set of high-level indicators or the second set of high-level indicators.

2. The method of claim 1, wherein the intra prediction smoothing mechanism comprises any combination of:
   a smoothing reference sample filter;
   a smoothing interpolation filter; and
   position-dependent intra prediction sample, PDPC, filtering.

3. The method according to claim 2, wherein the smoothing interpolation filter is one element of a set of interpolation filters, wherein the set of interpolation filters comprises two 4-tap filters.

4. The method according to claim 3, wherein the one of the two 4-tap filters is a smoothing filter and the other one of the two 4-tap filters is a Discrete Cosine Transform Interpolation Filter (DCT-IF); wherein using the smoothing filter or else using the DCT-IF filter is decided upon the value of a corresponding flag being 0 or one.

5. The method of claim 1, wherein each of the low-level indicators of the set of low-level indicators or the high-level indicators of the first set or the second set enables or disables position-dependent intra prediction sample filtering only for luma samples of the block, but does not disable position-dependent intra prediction sample filtering for at least one chroma component of the block.

6. The method of claim 1, wherein the determining of the signaling for the intra prediction smoothing mechanism comprises:
   indicating presence of the corresponding low-level indicators for the predicted block in dependence on the value of the high-level indicator; and
   inferring the value of low-level indicator to disable a corresponding intra prediction smoothing mechanism for all the predicted blocks of the level of the high-level indicator, when the value signaled by high-level indicator is zero;
   or
   wherein the determining of the signaling for the intra prediction smoothing mechanism comprises:
   inferring the value of low-level indicator to disable a corresponding intra prediction smoothing mechanism for all the predicted blocks of the level of the high-level indicator, when the value signaled by high-level indicator is zero.

7. The method of claim 1, wherein the values of high-level indicators of the first set and the second set are inferred to zero when chroma format of a coded picture is equal to YUV422.

8. The method of claim 1, wherein the high level indicators are high level syntax (HLS) flags, wherein a first set of HLS flags comprises one or more of a sequence parameter set (SPS) flag, a picture parameter set (PPS) flag, a picture header (PH) flag, or a slice-level flag, or
   wherein a second set of HLS flags comprises one or more of a sequence parameter set (SPS) flag, a picture parameter set (PPS) flag, a picture header (PH) flag, or a slice-level flag.

9. A method of coding implemented by a decoding device, comprising:
   obtaining a first flag by parsing a video bitstream, wherein the first flag enables or disables an intra prediction smoothing mechanism for a predicted block; and
   performing the intra prediction smoothing mechanism for the predicted block on condition that the first flag does not disable the intra prediction smoothing mechanism for the predicted block, wherein performing the intra prediction smoothing mechanism comprises:
   obtaining a second flag by parsing a video bitstream on condition that the first flag does not disable the intra prediction smoothing mechanism for the predicted block, wherein the second flag determines a presence of a third flag, wherein the third flag enables or disables an intra prediction smoothing mechanism for the predicted block and the third flag is at slice header level or picture header level.

10. The method of claim 9, wherein a value of first flag is inferred to 0 when chroma format of a coded picture is equal to YUV422.

11. The method of claim 9, wherein the first flag is a SPS-level or PPS level flag, and wherein the performing the intra prediction smoothing mechanism for the predicted block on condition that the first flag does not disable the intra prediction smoothing mechanism for the predicted block further comprises:
   obtaining the third flag by parsing a video bitstream on condition that the second flag determines the third flag is present in the video bitstream; and
   performing the intra prediction smoothing mechanism for the predicted block on condition that the third flag does not disable the intra prediction smoothing mechanism for the predicted block.

12. An encoder, comprising:
   at least one processor; and
   one or more memories coupled to the at least one processor and storing program instructions for execution by the at least one processor to cause the encoder to:
   signal a set of low-level indicators for a predicted block, wherein each of the set of low-level indicators enables or disables an intra prediction smoothing mechanism for the predicted block;
   signal a first set of high-level indicators on a slice-level or a higher level, wherein each of the first set of high-level indicators determines signaling for the intra prediction smoothing mechanism which is enabled or disabled by one of the set of low-level indicators; and
   signal a second set of high-level indicators, wherein each of the second set of high-level indicators determines presence of at least one of a corresponding high-level indicators of the first set of high-level indicators, and wherein values of the corresponding high-level indicators of the first set of high-level indicators are inferred to be zero when a value signaled by a high-level indicator of the second set of high-level indicators is zero; wherein the set of low-level indicators are at a lower syntax level lower than that of the first set of high-level indicators or the second set of high-level indicators.

13. The encoder of claim 12, wherein the intra prediction smoothing mechanism comprises any combination of:
   a smoothing reference sample filter;
   a smoothing interpolation filter; and
   position-dependent intra prediction sample, PDPC, filtering.

14. The encoder according to claim 13, wherein the smoothing interpolation filter is one element of a set of interpolation filters, wherein the set of interpolation filters comprises two 4-tap filters.

15. The encoder according to claim 14, wherein the one of the two 4-tap filters is a smoothing filter and the other one of the two 4-tap filters is a Discrete Cosine Transform Interpolation Filter (DCT-IF); wherein using the smoothing filter or else using the DCT-IF filter is decided upon the value of a corresponding flag being 0 or one.

16. The encoder of claim 12, wherein each of the low-level indicators of the set of low-level indicators or the high-level indicators of the first set or the second set enables or disables position-dependent intra prediction sample filtering only for luma samples of the block, but does not disable position-dependent intra prediction sample filtering for at least one chroma component of the block.

17. The encoder of claim 16, wherein the program instructions for execution by the at least one processor further cause the encoder further to:
   infer the value of low-level indicator to disable a corresponding intra prediction smoothing mechanism for all the predicted blocks of the level of the high-level indicator, when the value signaled by high-level indicator is zero;
   or
   indicate presence of the corresponding low-level indicators for the predicted block in dependence on the value of the high-level indicator; and
   infer the value of low-level indicator to disable a corresponding intra prediction smoothing mechanism for all the predicted blocks of the level of the high-level indicator, when the value signaled by high-level indicator is zero.

18. The encoder of claim 12, wherein the values of high-level indicators of the first set and the second set are inferred to zero in case chroma format of a coded picture is equal to YUV422.

19. The encoder of claim 12, wherein the high-level indicators are high level syntax (HLS) flags, wherein a first set of HLS flags comprises one or more of a sequence parameter set (SPS) flag, a picture parameter set (PPS) flag, a picture header (PH) flag, or a slice-level flag, or wherein a second set of HLS flags comprises one or more of a sequence parameter set (SPS) flag, a picture parameter set (PPS) flag, a picture header (PH) flag, or a slice-level flag.

20. A decoder, comprising:
   at least one processor; and
   one or more memories coupled to the at least one processor and storing program instructions for execution by the at least one processor to cause the decoder to:
   obtain a first flag by parsing a video bitstream, wherein the first flag enables or disables an intra prediction smoothing mechanism for a predicted block; and
   perform the intra prediction smoothing mechanism for the predicted block on a condition that the first flag does not disable the intra prediction smoothing mechanism for the predicted block, wherein performing the intra prediction smoothing comprises:
      obtaining a second flag by parsing a video bitstream on condition that the first flag does not disable the intra prediction smoothing mechanism for the predicted block, wherein the second flag determines a presence of a third flag, wherein the third flag enables or disables an intra prediction smoothing mechanism for the predicted block and the third flag is at slice header level or picture header level.

* * * * *